United States Patent
McDonald et al.

(10) Patent No.: US 12,067,440 B2
(45) Date of Patent: Aug. 20, 2024

(54) SYSTEMS AND METHODS FOR GENERATING SECURE TAGS

(71) Applicant: Laava ID Pty Ltd, Surry Hills (AU)

(72) Inventors: Iain James McDonald, Vaucluse (AU); Patrick Rene Philippe Michel, Mosman (AU); Anthony Surtees, Watsons Bay (AU); Morgan Lean, Erskineville (AU)

(73) Assignee: Laava ID Pty Ltd, Surry Hills (AU)

( * ) Notice: Subject to any disclaimer, the term of this patent is extended or adjusted under 35 U.S.C. 154(b) by 0 days.

(21) Appl. No.: 18/065,319

(22) Filed: Dec. 13, 2022

(65) Prior Publication Data
US 2023/0342582 A1 Oct. 26, 2023

Related U.S. Application Data

(63) Continuation of application No. 17/249,550, filed on Mar. 4, 2021, now Pat. No. 11,544,519, which is a (Continued)

(51) Int. Cl.
*G06K 19/08* (2006.01)
*G06K 19/07* (2006.01)
(Continued)

(52) U.S. Cl.
CPC ........... *G06K 19/145* (2013.01); *G06K 19/07* (2013.01); *G06K 19/18* (2013.01);
(Continued)

(58) Field of Classification Search
CPC ...... G06K 19/145; G06K 19/07; G06K 19/18; G06K 19/06037; G06K 19/06046;
(Continued)

(56) References Cited

U.S. PATENT DOCUMENTS 4,874,936 A 10/1989 Chandler et al.
5,189,292 A 2/1993 Batterman et al.
(Continued)

FOREIGN PATENT DOCUMENTS

CN 102081748 B * 2/2013
EP 0 575 989 A2 12/1993
(Continued)

OTHER PUBLICATIONS

CN 102081748B—Barcode Pattern And Barcode Group Pattern A Node Matrix And Node Connection Line And Generated Identification Method, 11 Pages. (Year: 2023).*
(Continued)

*Primary Examiner* — Tuyen K Vo
(74) *Attorney, Agent, or Firm* — Finnegan, Henderson, Farabow, Garrett & Dunner, LLP

(57) ABSTRACT

Systems and methods are provided for decoding secure tags using an authentication server and secure tag reader. The system can include at least one processor and at least one non-transitory memory. The memory can contain instructions that, when executed by the at least one processor, cause the secure tag reader to perform operations. The operations can include detecting a potential secure tag in an image and generating a normalized secure tag image using the image and a stylesheet. The operations can further include providing an identification request to an authentication server, the identification request including the normalized secure tag image. The operations can additionally include receiving rules for decoding tag data encoded into the secure tag as tag feature options and decoding the tag data using the received rules.

20 Claims, 51 Drawing Sheets

Related U.S. Application Data continuation of application No. 16/736,524, filed on Jan. 7, 2020, now Pat. No. 10,970,615, which is a continuation of application No. 16/528,150, filed on Jul. 31, 2019, now Pat. No. 10,565,490, which is a continuation of application No. 16/299,981, filed on Mar. 12, 2019, now Pat. No. 10,474,945, which is a continuation of application No. PCT/IB2018/000915, filed on Jul. 20, 2018.

(60) Provisional application No. 62/535,201, filed on Jul. 20, 2017.

(51) Int. Cl.
  *G06K 19/14* (2006.01)
  *G06K 19/18* (2006.01)
  *G06Q 10/0833* (2023.01)
  *G06Q 30/00* (2023.01)
  *G06Q 30/018* (2023.01)
  *H04L 9/08* (2006.01)

(52) U.S. Cl.
  CPC ......... *G06Q 10/0833* (2013.01); *G06Q 30/00* (2013.01); *G06Q 30/018* (2013.01); *H04L 9/0861* (2013.01); *H04L 2209/805* (2013.01)

(58) Field of Classification Search
  CPC ....... G06K 19/06168; G06K 19/06178; G06K 19/10; G06Q 10/0833; G06Q 30/00; G06Q 30/018; H04L 9/0861; H04L 2209/805; G06F 21/44
  See application file for complete search history.

(56) References Cited

U.S. PATENT DOCUMENTS

| | | | |
|---|---|---|---|
| 5,609,424 | A | 3/1997 | Sakuragi et al. |
| 5,706,417 | A | 1/1998 | Adelson |
| 5,774,639 | A | 6/1998 | Schildkraut et al. |
| 5,798,514 | A | 8/1998 | Domanik |
| 6,186,405 | B1 | 2/2001 | Yoshioka |
| 6,601,772 | B1 | 8/2003 | Rubin et al. |
| 7,074,478 | B2 | 7/2006 | Abraham |
| 7,089,420 | B1 | 8/2006 | Durst et al. |
| 7,216,232 | B1 | 5/2007 | Cox et al. |
| 7,270,277 | B1 | 9/2007 | Koziol |
| 7,533,044 | B2 * | 5/2009 | Scott ............ G06Q 20/20 705/65 |
| 7,997,504 | B2 | 8/2011 | Walmsley et al. |
| 8,011,596 | B2 | 9/2011 | Longacre, Jr. |
| 8,020,776 | B2 | 9/2011 | Tompkin et al. |
| 8,297,510 | B1 | 10/2012 | Yakshtes et al. |
| 8,534,567 | B2 | 9/2013 | Kiliccote |
| 8,560,823 | B1 | 10/2013 | Aytek et al. |
| 8,727,209 | B1 | 5/2014 | Shih et al. |
| 9,053,364 | B2 | 6/2015 | Mercolino |
| 9,213,931 | B1 * | 12/2015 | Annan ................ G06K 19/06 |
| 9,256,881 | B2 | 2/2016 | Engels et al. |
| 9,331,856 | B1 | 5/2016 | Song |
| 9,626,609 | B1 | 4/2017 | Ferguson |
| 9,697,446 | B2 | 7/2017 | Perret et al. |
| 9,710,741 | B2 | 7/2017 | Nosaka |
| 9,846,814 | B1 | 12/2017 | Fraser |
| 10,552,848 | B2 | 2/2020 | Soborski |
| 2002/0012445 | A1 | 1/2002 | Perry |
| 2003/0009350 | A1 | 1/2003 | Melick et al. |
| 2005/0010776 | A1 | 1/2005 | Kenen et al. |
| 2005/0071044 | A1 | 3/2005 | Yonge et al. |
| 2005/0121525 | A1 | 6/2005 | Montanari |
| 2005/0171868 | A1 | 8/2005 | Healy et al. |
| 2006/0007255 | A1 | 1/2006 | Chen |
| 2006/0037502 | A1 | 2/2006 | Warther |
| 2006/0050961 | A1 | 3/2006 | Thiyagarajah |
| 2006/0059201 | A1 | 3/2006 | Watanabe |
| 2006/0124722 | A1 | 6/2006 | Williams et al. |
| 2006/0230276 | A1 | 10/2006 | Nochta |
| 2007/0094591 | A1 | 4/2007 | Etgen et al. |
| 2007/0109100 | A1 | 5/2007 | Jett et al. |
| 2007/0158412 | A1 | 7/2007 | Kang et al. |
| 2007/0278316 | A1 | 12/2007 | Hovis |
| 2008/0017722 | A1 | 1/2008 | Snyder et al. |
| 2008/0052281 | A1 | 2/2008 | Liberty et al. |
| 2008/0128496 | A1 | 6/2008 | Bertranou et al. |
| 2009/0045911 | A1 | 2/2009 | Bauchot et al. |
| 2010/0193590 | A1 | 8/2010 | Komatsu et al. |
| 2010/0251134 | A1 | 9/2010 | Van Seggelen et al. |
| 2011/0274275 | A1 | 11/2011 | Seitz |
| 2012/0006894 | A1 | 1/2012 | Pruden et al. |
| 2012/0023335 | A1 | 1/2012 | Bals et al. |
| 2012/0048936 | A1 | 3/2012 | Jang |
| 2012/0102391 | A1 | 4/2012 | Lee et al. |
| 2012/0207349 | A1 | 8/2012 | Murphy |
| 2012/0229843 | A1 | 9/2012 | Golle et al. |
| 2012/0254051 | A1 | 10/2012 | Gao et al. |
| 2012/0254052 | A1 | 10/2012 | Gao et al. |
| 2012/0324340 | A1 | 12/2012 | Arkhipov |
| 2013/0007598 | A1 | 1/2013 | Draper et al. |
| 2013/0185623 | A1 * | 7/2013 | Wicker ............... H04L 63/1466 715/234 |
| 2013/0262316 | A1 * | 10/2013 | Hruska ............. G06Q 20/3572 705/67 |
| 2014/0094965 | A1 | 4/2014 | Silverbrook et al. |
| 2014/0201094 | A1 | 7/2014 | Herrington et al. |
| 2014/0263674 | A1 | 9/2014 | Cerveny |
| 2015/0134552 | A1 | 5/2015 | Engels et al. |
| 2015/0147585 | A1 | 5/2015 | Schwarze et al. |
| 2015/0182932 | A1 | 7/2015 | Trau |
| 2015/0262051 | A1 | 9/2015 | Yoshida |
| 2016/0098250 | A1 | 4/2016 | Gross et al. |
| 2016/0098723 | A1 | 4/2016 | Feeney |
| 2016/0098730 | A1 | 4/2016 | Feeney |
| 2016/0224680 | A1 | 8/2016 | Maynard, II et al. |
| 2016/0314475 | A1 | 10/2016 | Nudel et al. |
| 2017/0046806 | A1 | 2/2017 | Haldenby et al. |
| 2017/0187777 | A1 | 6/2017 | Kim |
| 2017/0251255 | A1 | 8/2017 | Deshpande et al. |

FOREIGN PATENT DOCUMENTS

| | | |
|---|---|---|
| EP | 0 706 146 A2 | 8/1995 |
| JP | 2009-151700 | 7/2009 |
| JP | 2009-163720 | 7/2009 |
| RU | 2003131888 A * | 4/2005 |
| WO | WO 2013061468 A1 | 5/2013 |
| WO | WO 2016202827 A1 | 12/2016 |
| WO | WO 2017027648 A1 | 2/2017 |

OTHER PUBLICATIONS

RU 2003131888A—Encoding Symbol and Method for Its Printing, 3 pages. (Year: 2023).*
Extended European Search Report in EP Application No. 18834540.9 dated Jun. 25, 2021 (9 pgs.).
Huang et al., "Data Matrix Code Location Based on Finder Pattern Detection and Bar Code Border Fitting", Mathematical Problems in Engineering, vol. 2012, Article ID 515296 (13 pgs.).
International Search Report and Written Opinion, mailed Mar. 20, 2019, issued in corresponding International Application No. PCT/IB2018/000915 filed Jul. 20, 2018 (26 pages).
Office Action issued in Japanese Application No. 2020-524694 on Sep. 1, 2022 (10 pgs.).
Rhodes III, "Can blockchain secure supply chains, improve operations and solve humanitarian issues?", Jan. 18, 2017, Blog (/en-us/blog/)>Internet of Things (/en-us/blog/topics/internet-of-things/) (4 pgs.).

* cited by examiner

The app is able to determine the level of authenticity and represent a probability of authentication in some circumstances where it is less than 100%

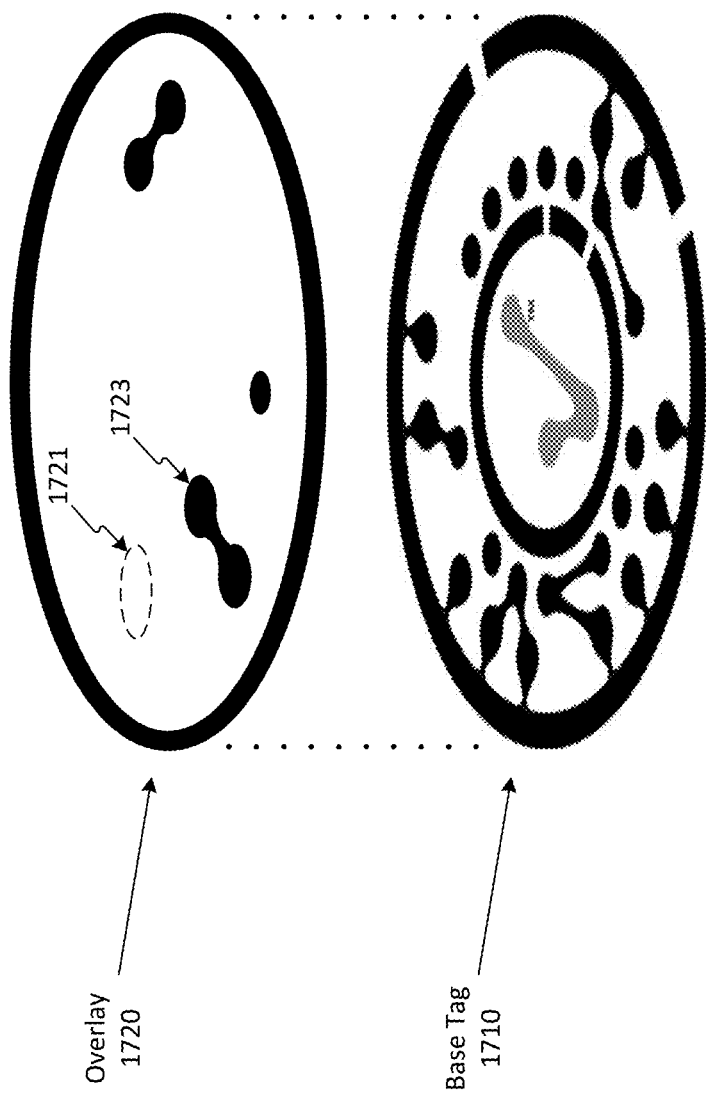

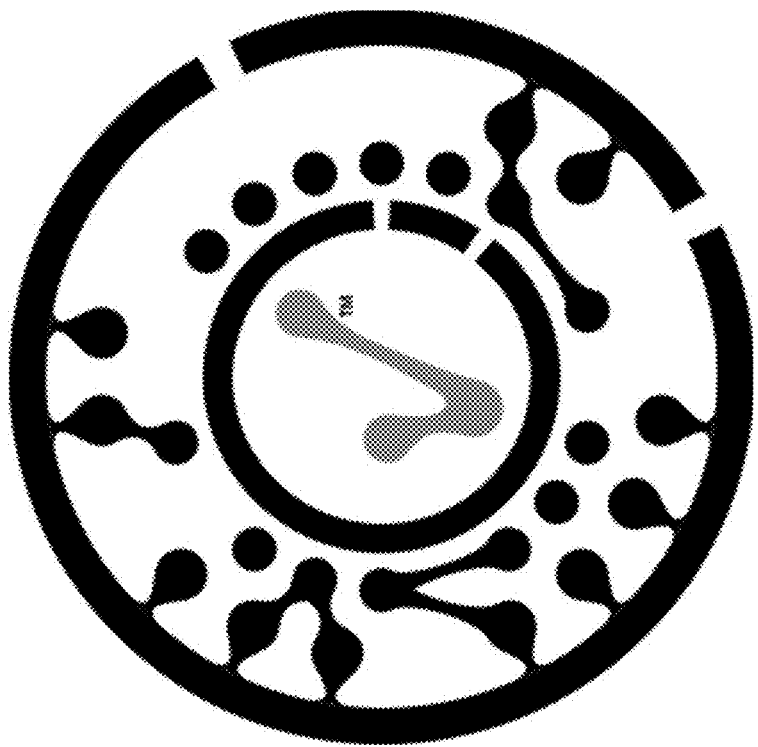

```
{ "hubRadius": 0.2,
  "spokeCount": 20,
  "hubGraphicUrl": "./assets/images/laava_tick.png",
  "hubGraphicDataUrl": "data:image/
  "hubGraphicPadding": 0,
  [dot connector key-value pairs]
  [inner ring connector key-value pairs]
  [outer ring connector key-value pairs]
  "tagResolution": 1000,
  "dots": [
    {
      "ringRadius": 0.29, "dotRadius": 0.03,
      "radialShift": 0, "minCount": 9,"maxCount": 15
    },
    {
      "ringRadius": 0.38,"dotRadius": 0.035,
      "radialShift": 0.5, "minCount": 10, "maxCount": 15
    }
  ],
  "rings": [
    {
      "width": 0.04,"gapSize": 0.3, "minCount": 1,
      "maxCount": 4
    },
    {
      "width": 0.05,"gapSize": 0.3,"minCount": 1,
      "maxCount": 4
    }
  ],
  "orientationBreaks": false}
```

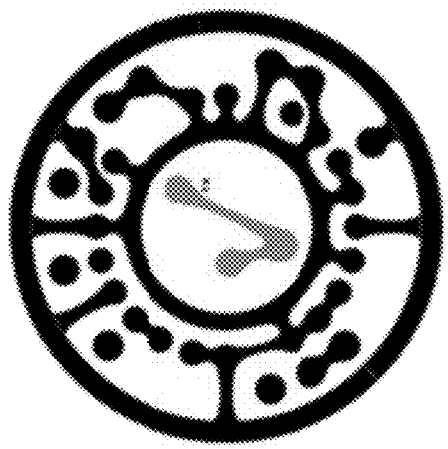# 2501
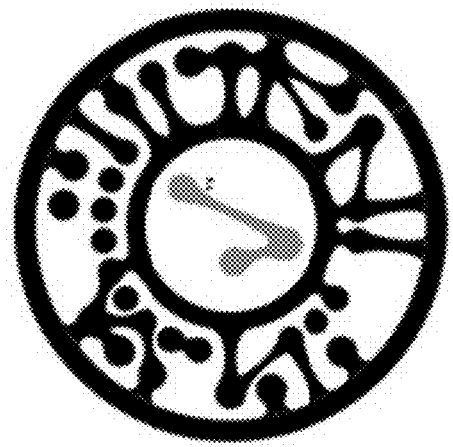# 2511
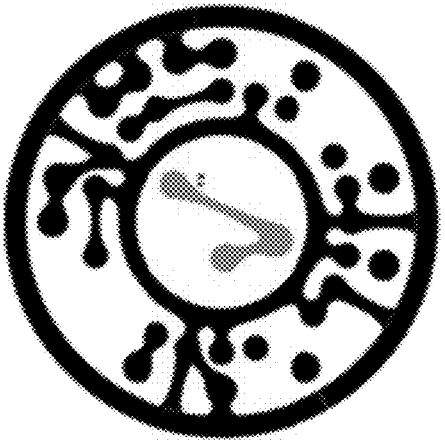# 2503
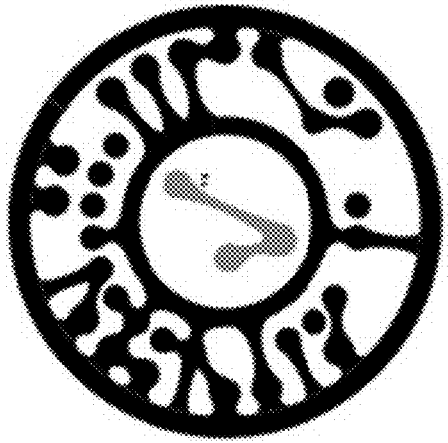# 2513
Fig. 25A
Fig. 25B
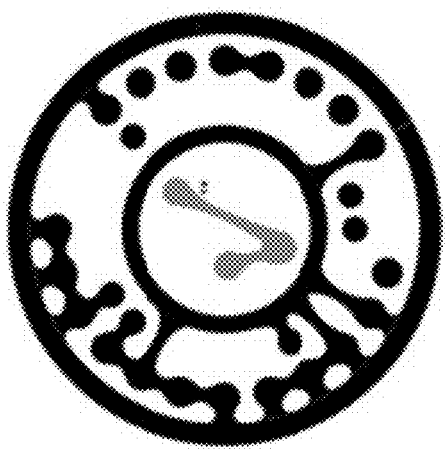# 2505
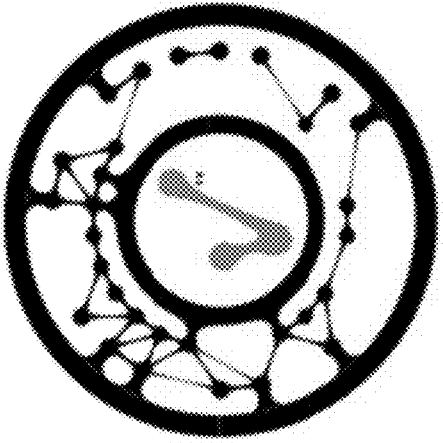# 2515

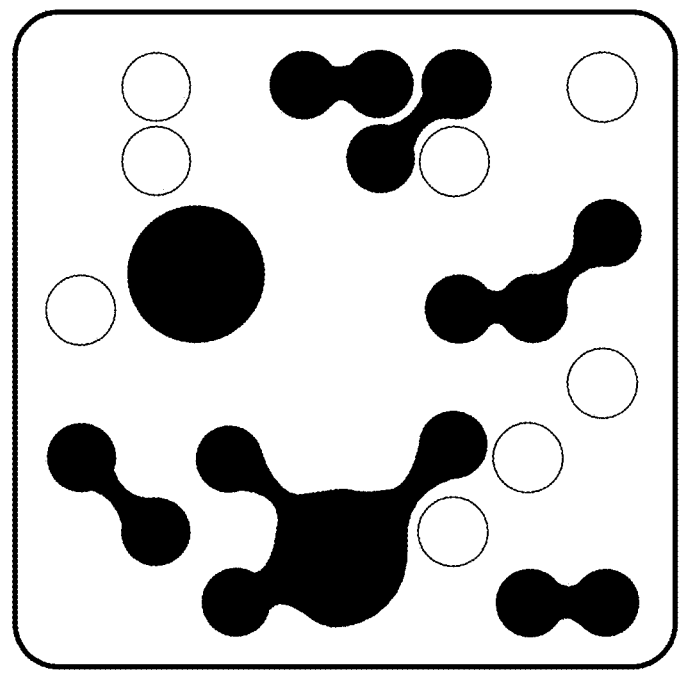
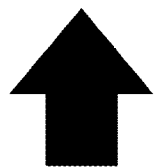
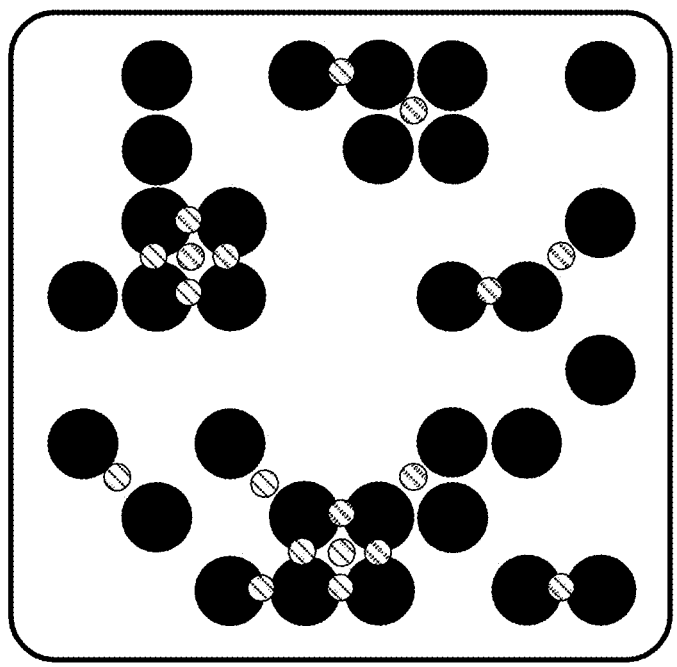
Fig. 27E

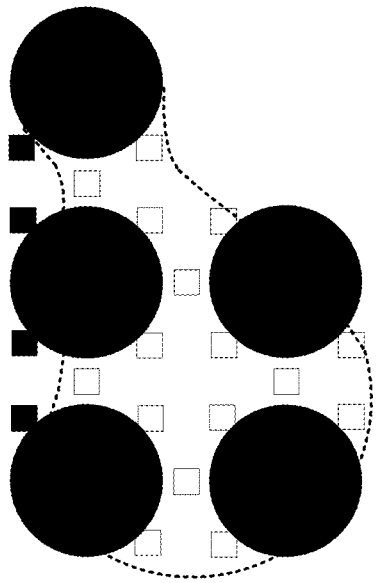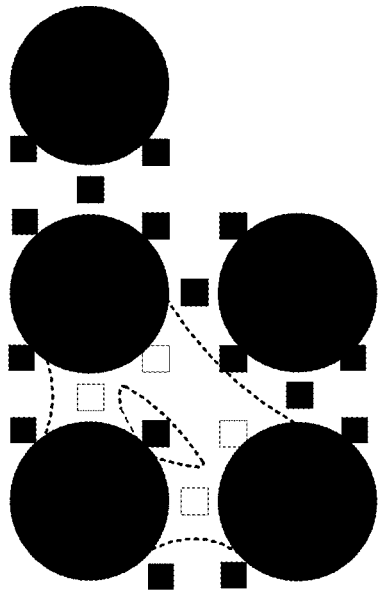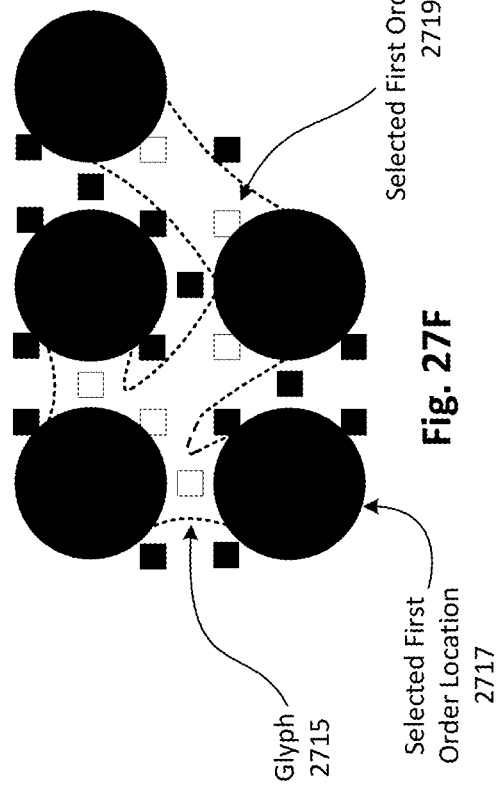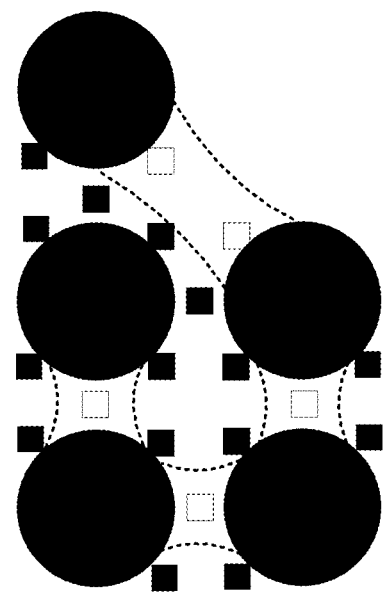

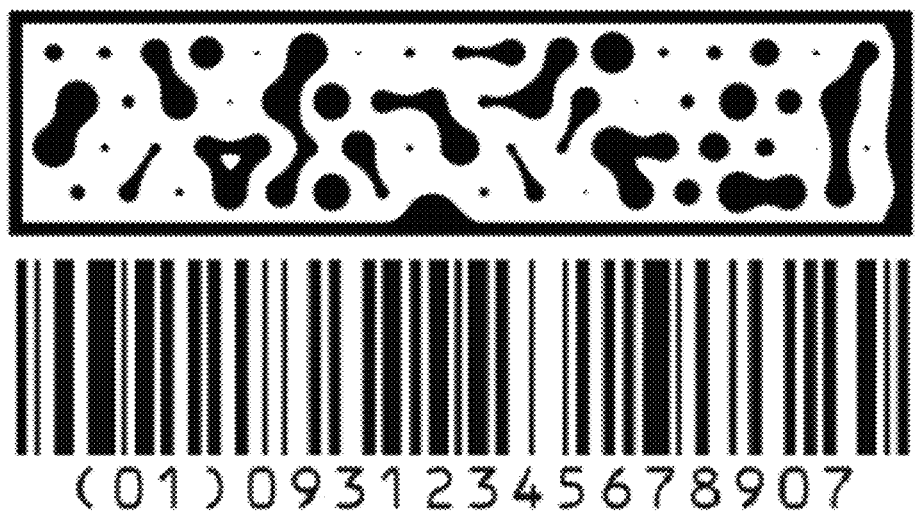
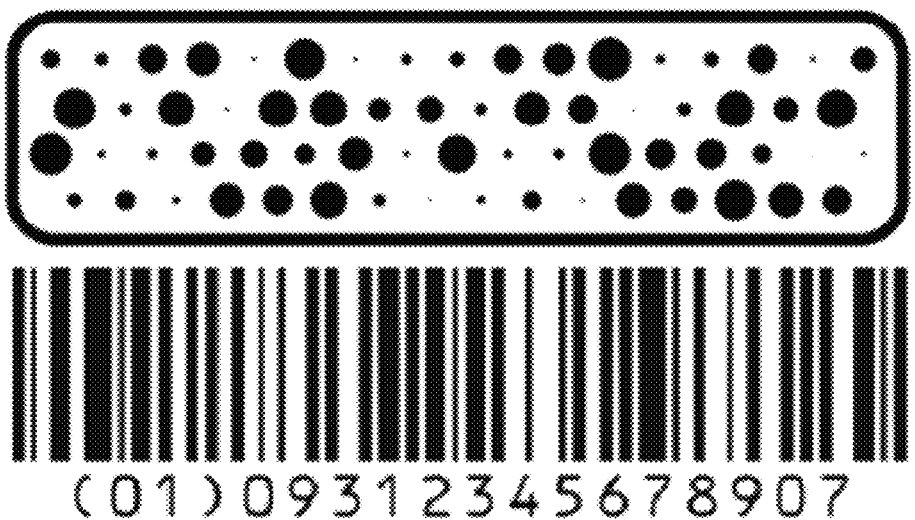
Fig. 28C

SYSTEMS AND METHODS FOR GENERATING SECURE TAGS

RELATED APPLICATIONS

This application is a Continuation of U.S. Utility application Ser. No. 17/249,550, filed Mar. 4, 2021, now U.S. Pat. No. 11,544,519, which is a Continuation of U.S. Utility application Ser. No. 16/736,524, filed Jan. 7, 2020, now U.S. Pat. No. 10,970,615, which is a Continuation of U.S. Utility application Ser. No. 16/528,150, filed Jul. 31, 2019, now U.S. Pat. No. 10,565,490, which is a Continuation of U.S. Utility application Ser. No. 16/299,981, filed Mar. 12, 2019, now U.S. Pat. No. 10,474,945, which is a Continuation of International Application No. PCT/IB2018/000915, filed Jul. 20, 2018, which claims the benefit of priority of U.S. Provisional Patent Application No. 62/535,201, filed Jul. 20, 2017, each of which is incorporated herein by reference in its entirety.

BACKGROUND

Authentication of things currently causes many problems for brands, merchants, and consumers. Existing inventory tracking approaches leave brands vulnerable to counterfeiting, vulnerable to sales through unauthorized channels ("grey market"), struggling with supply chain management issues, and dealing with issues connecting with end users (e.g., tracking and verifying sales, managing product recalls, and performing aftersales services). Retailers and resellers deal with similar problems, such as, for example, identifying counterfeits, accessing information about products, and managing relationships with customers (e.g., managing returns, receipts, customer support, special offers or discounts, and customer relationship management). Consumers may also face problems with existing systems, including difficulties identifying counterfeit products, receiving accurate information about products, managing warranties, redemption from proof of purchase, product registration, and reselling the products as authentic.

Traditional tags, such as barcodes and QR codes, suffer from a variety of weaknesses. For example, traditional tags are mainly used for object of stock-keeping unit (SKU) identification and are typically read-only. Additionally, stored information is freely accessible to readers as stored binary encoded data. The information can only be written into a traditional tag using a single method. When reading a tag, it must be oriented in a particular direction. Furthermore, traditional tags typically contain fixed sizes of information. These tags can be easily reused and reproduced. Traditional tags also contain security risks, as QR codes have been used in the past for virus/malware transmission.

SUMMARY

The secure tags disclosed herein solve many issues faced by brands, merchants, and consumers surrounding the authentication of individual things. These secure tags can allow individual objects to connect to the blockchain or similar database, allowing for individual verification. Every individual product has a unique secure tag which is never repeated, providing the ability for individual item identification instead of SKU identification. The individual item identification allows for proof of authenticity, as the secure tags can be used to verify each individual item. This form of unique identification is possible in part due to high definition resolution smartphones with large computational power and online connectivity, digital printing, and blockchain and secure database technology.

The unique secure tags of this disclosure provide significant advantages over existing QR codes and barcodes, with the only similarity being that each has a binary base ID layer. Unlike traditional tags, the secure tags each contain a unique, discreet key, have dynamic and flexible areas of storage, are integrated with digital ledgers, and contain numerous other advantages. For example, the secure tags are not limited to one shape or forms—they can exist in multiple design states to fit the need of the customer. In addition, the secure tags can exist across many form factors, such as, for example digital, printed, engraved, and animated forms. Another advantage of the secure tags is that they are readable by various optical devices, including smartphones, vastly expanding the number of users who can scan a tag.

The secure tags contain both binary and analogue information, meaning they can be read in multiple ways. The unique design of the secure tags allows large amount of binary to be encoded into the tags and also allows for visual "fingerprints," which don't return data but can be used to authenticate secure tags with the blockchain. The secure tags can have additional layers of authenticity, such as by pairing and/or sequencing a secure tag with another secure tag, or by using information within the proximity of the secure tag (i.e., proximity fingerprinting). Different levels of access can be provided to different users across the supply chain. For example, a customer can be given access to see certain information about the authenticity, safety, and proof of warranty, while the retailer can be given access to see certain information about the product data, customer data, and product tracking. The ease of use and effectiveness of the secure tags allow them to be useful in an endless number of cases, helping reduce authentication of things issues across the supply chain.

The disclosed embodiment includes an authentication server for interacting with secure tags. The authentication server can include at least one processor and at least one non-transitory memory containing instructions that, when executed by the at least one processor, causes the authentication server to perform operations which can include receiving a tag identification request including a tag image; identifying a secure tag in the received tag image using a stored hash of an image of a secure tag generated using a stylesheet; generating tag data using the received tag image and decoding rules for decoding tags generated using the stylesheet; and providing the tag data in response to the request.

In some embodiments, identifying the secure tag using the stored hash and the received tag image can further include generating a hash of the received tag image and determining if a difference between the stored has and the generated hash satisfies a threshold criterion. Generating the hash of the received tag image can further include converting the received tag image into an image having a predetermined number of pixels. The predetermined number of pixels can be greater than or equal to 64 pixels and less than or equal to 1,048,576 pixels. The stored hash can be used to identify the secure tag can be a perceptual hash, and the difference between the stored hash and the generated hash can be the hamming distance. In addition, the received tag image can be a vector image file; and generating the hash of the received image can include rasterizing at least a portion of the vector graphics files.

In some embodiments, identifying the secure tag in the received tag image can include generating a hash of the received tag image; selecting first secure tags using differences between the generated hash and stored hashes of images of the first secure tags; generating a second hash of a predetermined segment of the received tag image; and selecting the secure tag from the first secure tags using differences between the generated second hash and stored second hashes of the predetermined portion of the images of the first secure tags. In other embodiments, identifying the secure tag in the received tag image can include generating hashes of progressively smaller segments of the received tag image.

In other embodiments, identifying the secure tag in the received tag can include generating a hash of the received tag image; generating a second hash of a first segment of the received tag image corresponding to a first predetermined segment of the secure tag; determining a difference between the generated hash and a stored hash of an image of the secure tag does not satisfy a threshold criterion; selecting the secure tag using a difference between the generated second hash and a stored second hash of an image of the first predetermined segment of the secure tag; generating a third hash corresponding to a second predetermined segment of the secure tag; and validating the secure tag using a difference between the generated third hash and a stored third hash of an image of the second predetermined segment of the secure tag. In certain aspects, the third hash can be generated over a second segment of the received tag image corresponding to the second predetermined segment of the secure tag. In other aspects, the third hash can be generated over a second received tag image corresponding to the second predetermined segment of the secure tag.

In other embodiments, identifying the secure tag in the received tag image can include comparing hashes of images of predetermined segments of the secure tag to hashes of segments of one or more received tag images including the received tag image, the segments of the one or more received tag images corresponding to the predetermined segments of the secure tag, and selecting the secure tag based on the comparison. The comparison can include determining segment distances between the hashes of the images of the predetermined segments of the secure tag and the corresponding hashes of segments of the one or more received tag images, and at least one of an overall distance using the segment distances or a count of segment distances satisfying a threshold criterion. The operations can further include determining a confidence value using a number of the hashes of the images of the predetermined segments of the secure tag, a count of segment distances satisfying the threshold criterion, and the segment distances. In addition, one or more of the received tag images can include a first image depicting at least some of a tag at a first level of detail and a second image depicting at least some of the tag at a second level of detail greater than the first level of detail.

In some embodiments, the operations can further include receiving the stored hash of the image from a private system; providing a decoding request to the private system, the decoding request including an identifier of the secure tag; and wherein the decoding rules can be received from the private system in response to the decoding request.

In some embodiments, the tag identification request can include an authorization key; the decoding request can include an authorization key; and the decoding rules can correspond to the authorization key. In other embodiments, the tag identification request can be received from a client device, and the operations can further include receiving public decoding rules for decoding a public portion of a tag generated using the stylesheet; and providing the public decoding rules to the client device. In other embodiments still, the decoding rules can enable decoding of a subset of tag features defined by the stylesheet. In other embodiments still, the decoding rules can enable decoding of a portion of the secure tag defined by the stylesheet.

In some embodiments, the decoding rules can include first decoding rules enabling decoding of at least one of a first portion of the secure tag defined by the stylesheet or a first subset of tag features defined by the stylesheet, and second decoding rules enabling decoding of at least one of a second portion of the secure tag or a second subset of the tag features. In addition, generating tag data using the received tag image and the decoding rules can include generating first tag data using the first decoding rules, and generating second tag data using the first tag data and the second decoding rules.

In some embodiments, the operations can further include tracking tag identification requests. In other embodiments, the operations can further include storing tag identification request information. In other embodiments still, the operations can further include providing instructions to update a distributed database to reflect tag data.

The disclosed embodiment includes a system for generating a secure tag. The system for generating a secure tag can include at least one processor, and at least one non-transitory memory containing instructions that, when executed by the at least one processor, cause an authentication server to perform operations which can include receiving a stylesheet describing a class of secure tags; obtaining a numeric seed; generating a secure tag layout using the numeric seed and the stylesheet, the secure tag layout specifying a combination of tag feature options based on the numeric seed and stylesheet; receiving tag data; generating a secure tag encoding the tag data by selecting the tag feature options according to values of the tag data; generating a perceptual hash of the secure tag; storing the hash and an identifier for the secure tag in a database; and providing a secure tag.

In some embodiments, the secure tag layout can specify reference portions that indicate one or more referenced locations in the secure tag layout for encoding data. In other embodiments, the secure tag layout can specify unreferenced portions in the secure tag layout for encoding data. In other embodiments still, the secure tag layout can specify junk portions in the secure tag layout for encoding random data. In other embodiments still, the secure tag layout can specify key portions in the secure tag layout for encoding cryptographic keys.

In some embodiments, the tag feature options can include the presence or absence of a tag feature at a position specified by the secure tag layout. In other embodiments, the tag feature options can include a size, color, or shape of a tag feature. In other embodiments still, the tag feature options can include a deviation from a position specified by the secure tag layout. In other embodiments still, the tag feature options can include a number of tag features present at a position specified by the secure tag layout.

In some embodiments, the tag feature options can include the presence of spline encoding on the tag feature. The spline encoding can include a tag feature edge extending a varying distance from a reference point or line. The varying distance can encode one or more spatially multiplexed tag data values. In addition, the varying distance can encode repeats of the one or more spatially multiplexed tag data values.

In some embodiments, the tag feature options can include the presence of microstructures on the tag feature. In other embodiments, the tag features can include rims and the tag feature options for the rims include rim breaks, rim deformations, and rim connections. In other embodiments still, tag features can include rim breaks and the tag feature options for the rim breaks include rim break edge shapes. In other embodiments still, the tag features can include connections between predetermined types of tag features and the tag feature options for the connections include connection width and connection asymmetry. In other embodiments still, the tag features can include connections between tag features and the tag feature options for the connections include connection width and connection asymmetry.

In some embodiments, generating the secure tag encoding the tag data by selecting the tag feature options can include selecting first tag feature options according to values of first tag data, the selection of the first tag feature options creating second tag feature options, and selecting the second tag feature options according to values for second tag data. In addition, the first tag feature options can include the presence or absence of points, the second tag feature options can include the presence or absence of connections between points present according to the values of the first tag data, and third tag feature options encoding third tag data can include the width of connections present according to the values of the second tag data. In other embodiments, generating the secure tag encoding the tag data by selecting the tag feature options according to values of the tag data can include encrypting the tag data with a cryptographic key; selecting the tag feature options according to values of the encrypted tag data; and encoding the cryptographic key into the secure tag.

In some embodiments, the secure tag can include a vector graphics file. In other embodiments, providing the secure tag can include rasterizing the secure tag. In other embodiments still, providing the secure tag can include labeling an object with the secure tag or incorporating the secure tag into a digital product. In other embodiments still, the operations can further include checking the generated hash for collisions with hashes for other secure tags before providing the tag data. In other embodiments still, the stylesheet can include a public portion for generating portions of the secure tag layout for encoding public data and a private portion for generating portions of the secure tag layout for encoding private data. In other embodiments still, the operations can further include generating perceptual hashes of differing segments of the secure tag at multiple levels of detail; and storing the perceptual hashes of differing segments of the secure tag in the database.

In some embodiments, the tag data can include one or more identifiers for one or more other secure tags. The first identifier of the one or more identifiers can further include a perceptual hash of a first secure tag of the one or more other secure tags. In other embodiments, the tag data can include an identifier for a multifactor identification item. The multifactor identification item can further include an authentication credential or a perceptual hash of an image. In certain aspects, he image depicts a portion of an object labeled with the tag. In other aspects, the image depicts a person associated with the tag. In other embodiments, providing the tag can include printing the tag on a substrate, at least a first portion of the tag printed in fluorescent ink.

The disclosed embodiment includes a secure tag reader. The secure tag reader can include at least one or more processors, and at least one non-transitory memory containing instructions that, when executed by the at least one processor, cause the secure tag reader to perform operations which can include detecting a potential secure tag in an image; generating a normalized secure tag image using the image and a stylesheet; providing an identification request to an authentication server, the identification request including the normalized secure tag image; receiving rules for decoding tag data encoded into the secure tag as tag feature options; and decoding the tag data using the received rules. In some embodiments, the image can be received from a scanner of the secure tag reader. In other embodiments, the scanner can be a camera.

In some embodiments, detecting the potential secure tag in the image can include determining a size of the potential secure tag satisfies a size constraint retrieved from the stylesheet. In other embodiments, the potential secure tag can be detected using at least one of geometric feature detection, kernel-based feature detection, template matching, or a convolutional neural network. Detecting a potential secure tag in the image using geometric feature detection can further include thresholding the image to generate a binary-valued image; detecting geometric features using target parameter values retrieved from the stylesheet in in the binary-valued image; and determining a reference point of the potential secure tag using the geometric features. In addition, the geometric features can include concentric ellipses and the reference point can include a focus of the concentric ellipses.

In some embodiments, generating a normalized image of the potential secure tag can include converting the image to a black and white or greyscale image. In other embodiments, generating a normalized image of the potential secure tag can include flattening the image using an image warp transform and target parameter values retrieved from the stylesheet. Flattening the image using an image warp transform can further include correcting at least one of fisheye distortion, barrel distortion, or angular distortion. Additionally, the target parameter values can include an inner or outer tag rim shape. In other embodiments still, generating a normalized image of the potential secure tag can include detecting image gaps by determining tag feature options for potential image gaps and comparing the tag feature option values to target parameter values. The target parameter values can include an inner or outer tag rim thickness and diameter ratio or an inner or outer tag rim thickness and tag rim break width ratio. In other embodiments still, generating a normalized image of the potential secure tag can include determining an orientation of a tag feature and rotating the image based on the determined orientation of the tag feature and a target parameter value retrieved from the stylesheet. The tag feature can be a center logo and the target parameter value can include a center logo orientation.

In some embodiments, the normalized image of the potential secure tag can include a vector graphics image. In other embodiments, the image includes multiple potential secure tags, and the identification request can include a stream of vector graphics images corresponding to the multiple potential secure tags. In other embodiments still, the identification request includes a public key of the secure tag reader, and at least a portion of the identification request is encrypted with a private key of the secure tag reader. In other embodiments still, generating a normalized secure tag image using the image can include providing instructions to display the image and an indication highlighting the potential secure tag on a user interface of the secure tag reader; receiving instructions to generate a second, zoomed-in image of the potential secure tag; and generating the normalized image from the second, zoomed-in image of the potential secure tag.

In some embodiments, the operations can further include providing instructions to display the image and an indication highlighting the potential secure tag on a user interface of the secure tag reader; receiving a selection of the potential secure tag; and providing instructions to display the secure tag data on a user interface of the secure tag reader. The indication highlighting the potential secure tag can be a bounding box surrounding the potential secure tag in the image.

In some embodiments, the publicly available portion of the stylesheet can provide rules for decoding public tag data encoded into the secure tag as tag feature options. The public tag data can further include at least one of an address of an authentication server, a product type, a brand name, an inventory number, or an error correction code.

The disclosed embodiment includes a secure tag system. The secure tag system can include at least one or more processors, and at least one non-transitory memory containing instructions that, when executed by the at least one processor, cause the secure tag system to perform operations which can include scanning a secure tag that encodes tag data as a selection of potential tag feature options; interacting with an authentication server to decode the secure tag; and receiving state information for the secure tag stored in a distributed database, the state information indicating a validity status of the tag.

In some embodiments, interacting with an authentication server to decode the secure tag can include providing an image of the secure tag to the authentication server. In other embodiments, interacting with an authentication server to decode the secure tag can include providing a perceptual hash of the secure tag to the authentication server. In other embodiments still, interacting with an authentication server to decode the secure tag can include providing an authentication key to the authentication server. The state information can be received from the authentication server, the state information dependent on the authentication key. In other embodiments still, interacting with the authentication server to decode the secure tag can further include receiving decoding instructions from the authentication server, the decoding instructions indicating the tag feature options encoding the tag data; and generating the tag data using the decoding instructions, the tag data including a tag identifier. In addition, receiving the state information for the secure tag from a distributed database further can further include providing an authentication key to an oracle; and the state information received can depend on the authentication key. In certain aspects, the authentication key can correspond to a manufacturer and the state information can include at least one of tracking information, sales information, customer data, usage information, activation information, or location information. In other aspects, the authentication key can correspond to a distributor and the state information can include at least one of authenticity information, destination information, or manufacturer information. In other aspects, the authentication key can correspond to a retailer and the state information can include at least one of authenticity information, transactional information, product information, or tracking information. In other aspects, the authentication key can correspond to a purchaser and the state information can include at least one of authenticity information, product information, or ownership information.

In some embodiments, the operations can further include providing updated state information for the secure tag for storage in the distributed database. The updated state information for the secure tag can further be provided to an oracle for writing into the distributed database together with an authentication key. In addition, the updated state information for the secure tag can indicate that the secure tag is invalid. In other embodiments, the updated state information can include updated accessibility options for the state information. In other embodiments still, the state information for the secure tag can indicate at least one of tracking information, sales information, customer data, usage information, activation information, location information, authenticity information, destination information, updated manufacturer information, transactional information, product data, or proof of ownership information. In other embodiments still, the state information for the secure tag can indicate a pairing between the secure tag and another secure tag.

The disclosed embodiment includes a secure tag system. The secure tag system can include at least one processor, and at least one non-transitory memory containing instructions that, when executed by the at least one processor, cause the secure tag system to perform operations which can include receiving a transaction request concerning a product associated with a first secure tag that encodes first tag data as a selection of potential first secure tag feature options; generating a second secure tag concerning the product that encodes second tag identification data as a selection of potential second secure tag feature options, the second tag data including an identifier of the first secure tag and an identifier of a purchaser; receiving an indication of a transfer of ownership to the purchaser; and creating an entry for the second secure tag in a database, the created entry indicating the transfer of ownership.

In some embodiments, the product can include a digital product. The first secure tag is can further be embedded into the digital product or displayed together with the digital product. In other embodiments, the product can include a physical product. The first secure tag can further label the physical product.

In some embodiments, the operations can further include updating an entry for the first secure tag in the database. The entry is can be further updated to indicate at least one of the transfer of ownership, an identifier of the second tag, transaction information concerning the transfer of ownership, or a validity status of the first secure tag. In other embodiments, the identifier of the first secure tag can include a hash of at least some of the first tag data. In other embodiments still, generating the second secure tag can include decoding the first secure tag to retrieve the first tag data. In other embodiments still, the second secure tag can be generated using a stylesheet associated with the first secure tag. In other embodiments still, the second secure tag can be generated using a unique numerical seed.

In some embodiments, the database can be a distributed database; and creating the entry for the second secure tag in the database can include providing an authentication key and an identifier of the second tag to an oracle for writing to a blockchain.

The disclosed embodiment includes a server for interacting with secure tags. The server for interacting with secure tags can include at least one processor, and at least one non-transitory memory containing instructions that, when executed by the at least one processor, cause the server to perform operations which can include receiving a request concerning a first secure tag that encodes first tag data as a selection of potential first secure tag feature options, the first tag data including stored contextual information; decoding the stored contextual information; receiving contextual information; authenticating the request using the received contextual information and the stored contextual information; and providing an indication of successful authentication in response to the request.

In some embodiments, the stored contextual information can include at least one of an authentication credential, a biometric identifier, a sound file, a tag identifier, or a perceptual hash of an image. The biometric identifier can further include a fingerprint or voiceprint. In certain aspects, the first secure tag can label an item and the image can depict a portion of the item. Additionally, the labeled item can be an identification card; and the portion of the item is an identification photo on the identification card. In other aspects, first secure tag can label an item and the image can depict a person associated with the item or a texture of the item.

In some embodiments, authenticating the request can include determining that the received contextual information and the stored contextual information satisfy a similarity criterion. Satisfaction of the similarity criterion can further depend upon a hamming distance between the received contextual information and the stored contextual information. In other embodiments, the operations can further include requesting the contextual information; and the received contextual information can be received in response to the request.

In some embodiments, the indication of successful authentication can include at least some of the first tag data. In other embodiments, the indication of successful authentication can include decoding instructions for at least some of the first tag data. In other embodiments still, the indication of successful authentication can include status information retrieved from a distributed database. In other embodiments still, the status information can be retrieved from a distributed database using an oracle.

The disclosed embodiment includes a two-part label. The two-part label can include a substrate labeled with a first secure tag that encodes first tag data as a selection of potential first secure tag feature options; and an overlay detachably adhered to the substrate, the overlay including transparent portions and opaque portions aligned with the first secure tag, the first secure tag and aligned opaque portions encoding second tag data as a selection of potential second secure tag feature options. In some embodiments, the potential first secure tag feature options can differ from the potential second secure tag feature options. In other embodiments, the aligned opaque portions can obscure selected potential first secure tag feature options. In other embodiments still, the aligned opaque portions can select potential first secure tag feature options. In other embodiments still, the potential first secure tag feature options can include the presence or absence of tag features at positions specified by a first secure tag layout. In addition, the potential second secure tag feature options can include the presence or absence of tag features at positions specified by a second secure tag layout, the second secure tag layout differing from the first secure tag layout.

The disclosed embodiment includes a method for generating a two-part label. The method for generating a two-part label can include generating a first secure tag that encodes first tag data as a selection of potential first secure tag feature options using the first tag data, a first numeric seed, and a first stylesheet; generating a second secure tag that encodes second tag data as a selection of potential second secure tag feature options using the second tag data, a second numeric seed, and a second stylesheet; determining a difference image between the first secure tag and the second secure tag; labelling a substrate with the first secure tag; and detachably adhering an overlay to the substrate, the overly labelled with the difference image and aligned with the first secure tag.

In some embodiments, the overlay may obscure portions of the first secure tag absent from the second secure tag. In other embodiments, the overlay can depict portions of the second secure tag absent from the first secure tag. In other embodiments still, the overlay can transmit portions of the second secure tag present in the first secure tag. In other embodiments still, the substrate can include a consumer good. The first secure tag can correspond to a post-purchase status of the consumer good and the second secure tag can correspond to a pre-purchase status of the consumer good.

The disclosed embodiment includes a method for providing documents. The method for providing documents can include generating a first secure tag paired to a document, the first secure tag encoding an identifier of the document using a selection of potential tag feature options; receiving, from a first device, an access request for the document; providing, to the first device, the first secure tag; receiving, from a second device, a confirmation request including a secure tag image; comparing the first secure tag to the secure tag image; and providing the document to the first device based on the comparison. In certain aspects, the identifier of the document can include a hash of the document. In addition, the second device can be a mobile device.

In some embodiments, comparing the first secure tag to the secure tag image can include generating a perceptual hash of the first secure tag; generating a perceptual hash of the secure tag image; and determining a difference between the stored perceptual hash and the generated perceptual hash satisfies a threshold criterion. In other embodiments, comparing the first secure tag to the secure tag image can include generating a perceptual hash of the secure tag image; selecting first secure tags using differences between the generated perceptual hash and stored perceptual hashes of images of the first secure tags; generating a second perceptual hash of a predetermined segment of the secure tag image; and selecting the first secure tag from the first secure tags using differences between the generated second perceptual hash and stored second perceptual hashes of the predetermined portion of the images of the first secure tags.

In some embodiments, the confirmation request can include a confirmation request identifier, and providing the document to the first device based on the comparison can further include generating a second secure tag paired to the request, the second secure tag encoding the confirmation request identifier using a selection of potential tag feature options; and watermarking the document with the second secure tag.

In some embodiments, the method can further include determining that the receipt of the secure tag image satisfies an authentication criterion. In certain aspects, the authentication criteria can concern a number of confirmation requests associated with the first secure tag. In other aspects, the authentication criteria can concern an elapsed time since the provision of the first secure tag to the first device. In other aspects still, the authentication criteria can concern a geographic origin of the confirmation request. In other aspects still, the confirmation request can include a confirmation request identifier; and the authentication criteria can concern the confirmation request identifier. In addition, the authentication criteria can be satisfied when an access identifier of the access request matches a confirmation identifier of the confirmation request.

The disclosed embodiment includes a system for generating mutable secure tags. The system for generating mutable secure tags can include at least one processor, and at least one non-transitory memory containing instructions that, when executed by the at least one processor, cause the system to perform operations which can include generating a first secure tag encoding tag data as a selection of tag feature options according to values of the tag data; receiving, from a scanner of a second device, a request including a sequence of tag images, the sequence of tag images including a first tag image; authenticating the request using the first secure tag and the first tag image; and providing an indication of the authentication of the request. In certain aspect, the scanner can be a camera. In other aspects, the trigger can be a rollover or click event.

In some embodiments, the operations can further include providing instructions to display, on a display of a first device, a sequence of tags including the first secure tag. In certain aspects, providing instructions to display a sequence of tags including the first secure tag can include embedding the sequence of tags into a digital product. In other aspects, the instructions can provide for displaying the sequence of tags of the display of the first device in response to a trigger.

In some embodiments, authenticating the request can include comparing one or more perceptual hashes of the first secure tag to one or more corresponding hashes of the first tag image. In other embodiments, authenticating the request can include matching multiple secure tags including the first secure tag to multiple corresponding tag images, including the first tag image. The authentication can further require matching the multiple secure tags to the multiple corresponding tag images according to a predetermined order of appearance. In other embodiments still, authenticating the sequence of tags can include junk tags.

In some embodiments, the indication of the authentication of the request can include at least some of the tag data. In other embodiments, the indication of the authentication of the request can include decoding instructions for decoding at least some of the first tag data. In other embodiments still, the indication of the authentication of the request can include status information retrieved from a database. In other embodiments still, the database can be a distributed database; and the status information is retrieved from a distributed database using an oracle.

The disclose embodiment includes a method for tracking a product. The method for tracking a product can include labeling the product with a computer-readable secure tracking tag that encodes product identification data as a selection of tag feature options based on a combination of a numeric seed and a stylesheet. In some embodiments, the tag feature options can include the presence or absence of a tag feature at a position specified by the combination of the numeric seed and the stylesheet. In other embodiments, the tag feature options can include a size, color, or shape of a tag feature. In other embodiments still, the tag feature options can include a deviation from a position specified by the combination of the numeric seed and the stylesheet. In other embodiments still, the tag feature options include a number of tag features present at a position specified by the combination of the numeric seed and the stylesheet.

In some embodiments, the tag feature options include the presence of spline encoding on the tag feature. The spline encoding can further include a tag feature edge extending a varying distance from a reference point or line. In addition, the varying distance can encode one or more spatially multiplexed tag data values, and the varying distance can encode repeats of the one or more spatially multiplexed tag data values. In other embodiments, the tag feature options can include the presence of microstructures on the tag feature. In other embodiments still, the tag features can include rims and the tag feature options for the rims include rim breaks, rim deformations, and rim connections. In other embodiments still, the tag features can include rim breaks and the tag feature options for the rim breaks include rim break edge shapes. In other embodiments still, the tag features can include connections between predetermined types of tag features and the tag feature options for the connections can include connection width and connection asymmetry. In other embodiments still, the tag features can include connections between tag features and the tag feature options for the connections can include connection width and connection asymmetry. In other embodiments still, the tag features can include a center logo and the tag feature options can include a displacement of the center logo from a center point of the secure tag.

In some embodiments, the method can further include generating the computer-readable secure tracking tag. In certain aspects, generating the computer-readable secure tracking tag can further include selecting first tag feature options according to first values of the product identification data, the selection of the first tag feature options creating second tag feature options, and selecting the second tag feature options according to second values of the product identification data. The first tag feature options can further include the presence or absence of points, the second tag feature options can include the presence or absence of connections between points present according to the first values, and third tag feature options encoding third values of the product identification data can include the width of connections present according to the second values. In other aspects, generating the computer-readable secure tracking tag can further include encrypting at least a portion of the product identification data with a cryptographic key; selecting first tag feature options according to values of the encrypted portion of the product identification data; and encoding the cryptographic key into the computer-readable secure tracking tag.

In some embodiments, the computer-readable secure tracking tag can include a vector graphics file and labeling the product with a computer-readable secure tracking tag can include rasterizing the vector graphics file. In other embodiments, the method can further include providing identification information for the computer-readable secure tracking tag to an authentication server. The method can further include generating a hash of the computer-readable secure tracking tag and checking the hash for collisions with hashes of other computer-readable secure tracking tags before providing the identification information to the authentication server.

The disclosed embodiment includes a label for tracking a product. The label for tracking a product can include a substrate printed with a computer-readable secure tracking tag that encodes product identification data as a selection of tag feature options based on a combination of a numeric seed and a stylesheet. In some embodiments, the tag feature options can include the presence or absence of a tag feature at a position specified by the combination of the numeric seed and the stylesheet. In other embodiments, the tag feature options can include a size, color, or shape of a tag feature. In other embodiments still, the tag feature options can include a deviation from a position specified by the combination of the numeric seed and the stylesheet. In other embodiments still, the tag feature options can include a number of tag features present at a position specified by the combination of the numeric seed and the stylesheet.

In some embodiments, the tag feature options can include the presence of spline encoding on the tag feature. The spline encoding can further include a tag feature edge extending a varying distance from a reference point or line. In addition, the varying distance can encode one or more spatially multiplexed tag data values, the varying distance can encode repeats of the one or more spatially multiplexed tag data values. In other embodiments, the tag feature options can include the presence of microstructures on the tag feature. In other embodiments still, the tag features can include rims and the tag feature options for the rims can include rim breaks, rim deformations, and rim connections. In other embodiments still, the tag features can include rim breaks and the tag feature options for the rim breaks can include rim break edge shapes. In other embodiments still, the tag features can include connections between predetermined types of tag features and the tag feature options for the connections can include connection width and connection asymmetry. In other embodiments still, the tag features can include connections between tag features and the tag feature options for the connections can include connection width and connection asymmetry. In other embodiments still, the tag features can include a center logo and the tag feature options can include a displacement of the center logo from a center point of the secure tag.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings are not necessarily to scale or exhaustive. Instead, emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings:

FIG. 17 depicts an exemplary overlay tag.

FIG. 24A depicts an exemplary secure tag.

FIG. 24B depicts portions of a graphics file corresponding to the exemplary secure tag.

FIG. 25A depicts secure tags generated using the same style sheet and different data.

FIG. 25B depicts secure tags generated using different style sheets and the same data.

FIGS. 27A-27J depicts generation of an exemplary secure tag.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence, nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

Figure 1:
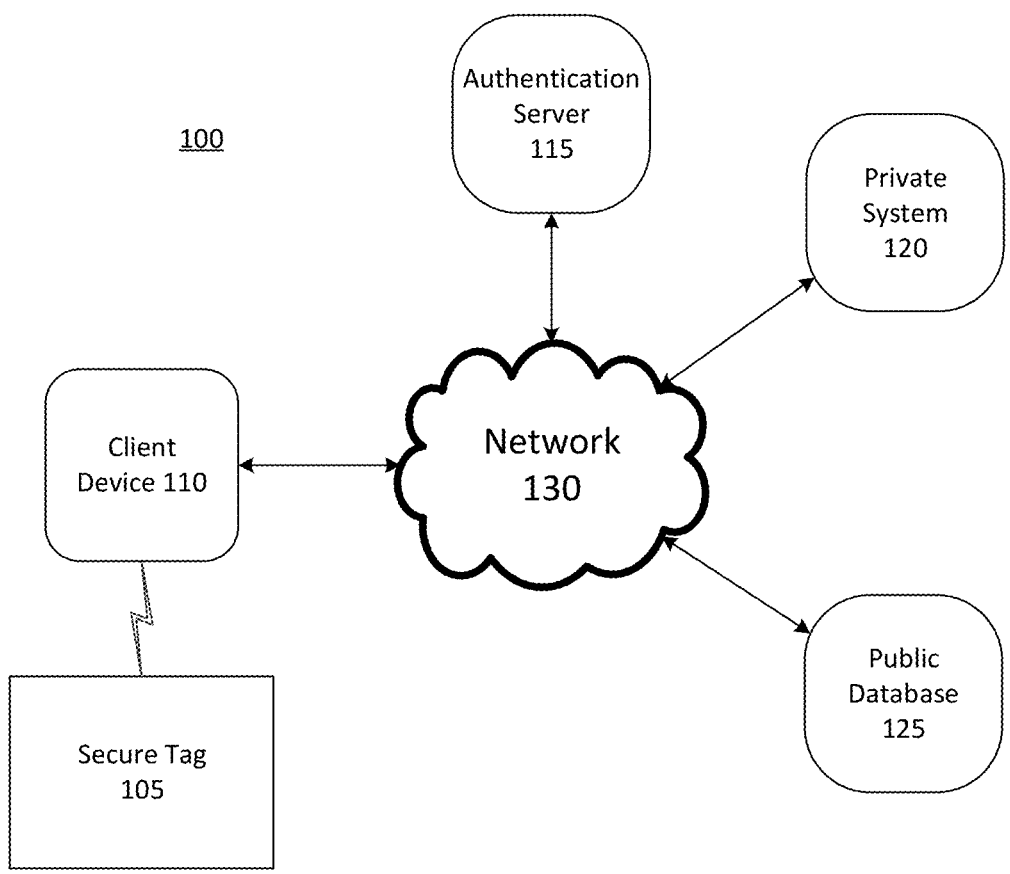
FIG. 1 depicts an exemplary system for interacting with secure tags.

FIG. 1 depicts an exemplary system 100 for interacting with secure tags. This exemplary system can include a secure tag 105, a client device 110, a validation server 115, a private system 120, and a public database 125. Components of system 100 can be configured to communicate using network 130. In some embodiments, secure tag 105 can be decoded using an image of the secure tag, a stylesheet, and a numeric seed. This information can be distributed between private system 120 and client device 110 to reduce the possibility that an attacker able to compromise either of these systems can decode the secure tag. For example, private system 120 can be configured to store the stylesheet and the numeric seed, while client device 110 can be configured to obtain an image of secure tag 105. In some embodiments, authentication server 115 can be configured to perform decoding, obtaining an image of secure tag 105 from client device 110 and decoding instructions from private system 120. In this manner, system can distribute the information necessary to decode secure tag 105 while ensuring that decoding occurs on a secure system (authentication server 115).

Secure tag 105 can be a tag configured to label a product. The product can be a physical product (e.g., a shoe) or a digital product (e.g. a website or video steam). As described herein, the product can be configured to encode tag data using a selection of tag feature options. The potential tag feature options for selection can depend on a stylesheet and a numeric seed. In this manner, a stylesheet can define a class of similar secure tags, while differing numeric seeds can ensure that each tag remains unique.

Client device 110 may comprise a mobile device including a scanner. For example, client device 110 may be a mobile phone, such as a smartphone, a tablet computer or a portable computer. As an additional example, client device 110 can be an optical scanner, such as a handheld optical scanner (e.g., a SIMATIC or MOTOROLA optical scanner). Client device 110 can be configured to generate images of secure tag 105 and provide those images to authentication server 115.

Authentication server 115 may include one or more computing systems, such as servers, general purpose computers, or mainframe computers. Authentication server 115 may be standalone, or it may be part of a subsystem, which may be part of a larger system. For example, authentication server 115 may include distributed servers that are remotely located and communicate over a public network (e.g., network 130) or a dedicated private network. In some embodiments, authentication server 115 may be configured for communication with components of system 100 over network 130. In some aspects authentication server 115 may comprise one or more containers or virtual machines hosted on a cloud computing environment, such as Amazon Web Services.

Authentication server 115 can be configured to identify secure tags based on images received from client device 110 and decoding instructions received from private system 120, or another system. Authentication server 115 can be configured to interact with public database 130 to read or write status information concerning identified tags. In some embodiments, authentication server 115 can be configured to interact with public database 130 indirectly, through an oracle (e.g., when public database 130 is the Ethereum blockchain). Authentication server 115 can be configured to provide decoded tag information or certain decoding instructions to client device 110 in response to identification requests.

Private system 120 may include one or more computing systems, such as servers, general purpose computers, or mainframe computers. Private system 120 may be standalone, or it may be part of a subsystem, which may be part of a larger system. For example, private system 120 may include distributed servers that are remotely located and communicate over a public network (e.g., network 130) or a dedicated private network. In some embodiments, private system 120 may be configured for communication with components of system 100 over network 130. In some aspects private system 120 may comprise one or more containers or virtual machines hosted on a cloud computing environment, such as Amazon Web Services.

Private system 120 can be configured to generate secure tags for use by system 100. In some embodiments, private system 120 can be configured to store stylesheet information and numeric seeds for creating secure tags. Consistent with disclosed embodiments, private system 120 can be configured to respond to requests from authentication server 115. The requests can include secure tag identifiers. Private system 120 can be configured to provide decoding instructions for the secure tag corresponding to the secure tag identifiers. The decoding instructions can include at least some of the stylesheets and the numeric seed, in some embodiments. The decoding instructions can include specific correspondences between tag feature options of the secure tag and tag data.

Public database 125 can include one or more databases hosted by computing devices (e.g., laptops, desktops, workstations, servers, general purpose computers, mainframe computers, cloud computing platforms). Public database 125 can be a distributed database. For example, public database 125 can be a blockchain database. In some embodiments, public database 125 can be the Ethereum blockchain, or a similar smart contracts blockchain.

Figure 2:
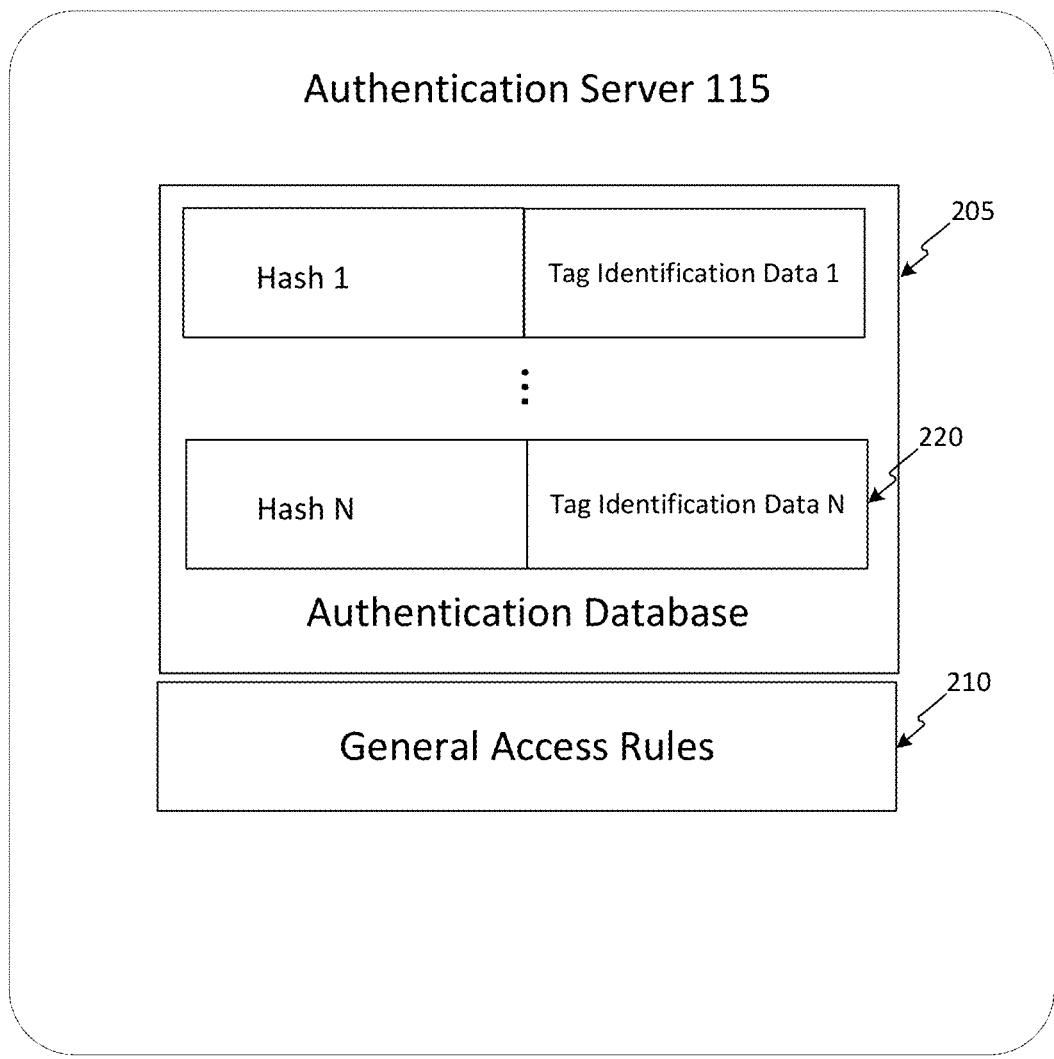
FIG. 2 depicts an exemplary schematic of an authentication server for interacting with secure tags.

FIG. 2 depicts an exemplary schematic of an authentication server for interacting with secure tags, consistent with disclosed embodiments. Authentication server 115 can be configured to include authentication database 205 in some aspects. Authentication database 205 can include records 220 in various aspects. In some embodiments, the records can associate one or more hashes of secure tags with tag identification data. In various embodiments, in addition to the authentication database, authentication server 115 can be configured to include general access rules. The general access rules can include application key requirements, authentication credential requirements, session token requirements, or similar restrictions on accessing the authentication server.

Figure 3:
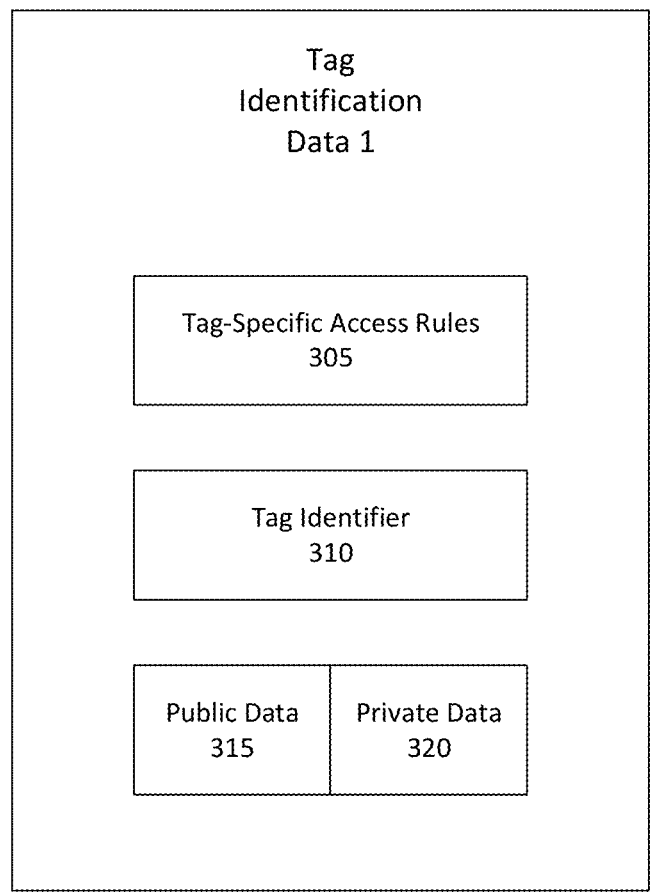
FIG. 3 depicts an exemplary schematic of tag data.

FIG. 3 depicts an exemplary schematic of tag identification data, consistent with disclosed embodiments. In some embodiments, tag identification data can include tag-specific access rules 305. For example, a particular secure tag may require a specific application key for decoding. As an additional example, another secure tag may not require any specific application key for decoding. Some secure tags may include time, geographic location, local network, or user-based access rules. Authentication server 115 can be configured to enforce these access rules by rejecting identification requests that fail to satisfy secure tag specific access rules 305 for that secure tag. In some embodiments, tag identification data can include a tag identifier 310. In some aspects tag identifier 310 can be specific to a particular secure tag. For example, tag identifier 310 can be a hash of the information encoded in the secure tag. As an additional example, tag identifier 310 can be a perceptual hash of the secure tag. In such embodiments, authentication server 115 may be configured to merely store the tag identifiers 310, rather than storing hashes associated with the tag identifiers. In various embodiments, the tag identifier can store public data 315 and private data 320. Public data 315 can include metadata concerning interactions with the secure tag that an operator of authentication server 115 wishing to make publicly available, such as tracking data or location data. Private data 320 can include metadata concerning interactions with the secure tag that an operator of authentication server 115 wishing to restrict access to, such manufacturing data or customer data collected by manufacturers, distributors, or and retailers. While public data can be provided in response to any inquiry, authentication server 115 can restrict access to private data. For example, authentication server 115 can be configured to provide private data 320 in response to identification requests including the appropriate application key or authentication credential. The amount and type of private data 320 provided can depend on the application key or authentication credential received. In some embodiments, authentication server 115 can be configured to store links to at least one of the tag-specific access rules 305, tag identifier 310, public data 315, or private data 320. For example, at least some of this information can be stored in public database 130, or another database. Whether links or the actual tag-specific access rules 305, tag identifier 310, public data 315, or private data 320 is stored on authentication server 115 can depend on performance and security concerns.

Figure 4:
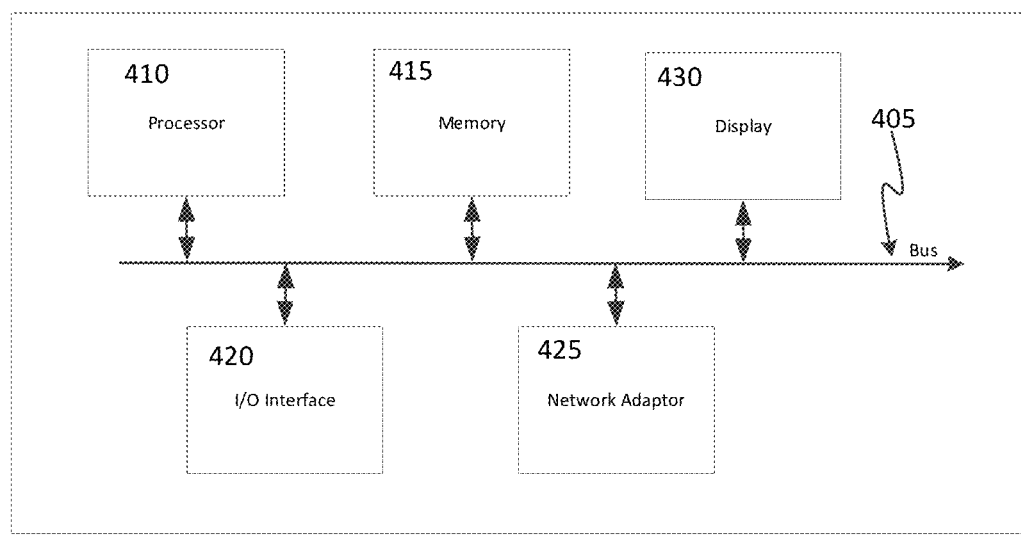
FIG. 4 depicts an exemplary diagram illustrating components of an exemplary computing device generally suitable for implementing the disclosed system and methods.

FIG. 4 depicts an exemplary diagram illustrating components of an exemplary computing device generally suitable for implementing the disclosed system and methods. According to some embodiments, the exemplary device may include a processor 410, memory 415, I/O interface(s) 420, and network adapter 425. These units may communicate with each other via bus 405, or wirelessly. The components shown in FIG. 4 may reside in a single device or multiple devices.

Processor 410 may be one or more microprocessors, central processing units, or graphics processing units performing various methods in accordance with disclosed embodiments. Memory 415 may include one or more computer hard disks, random access memory, removable storage, or remote computer storage. In various embodiments, memory 415 stores various software programs executed by processor 410. I/O interfaces 420 may include keyboard, a mouse, an audio input device, a touch screen, or similar human interface device. Network adapter 425 enables the exemplary device to exchange information with components of FIG. 1 over network 130. In various embodiments, network adapter 425 may be configured to support wireless or wired networks. In certain aspects, network adapter 425 may be configured with modules for supporting one or more local area networks, personal area networks, or near field networks. In some aspects, network adapter 425 may be configured with hubs for supporting computer busses. For example, network adapter 425 may be configured with one or more USB hubs.

Figure 5:
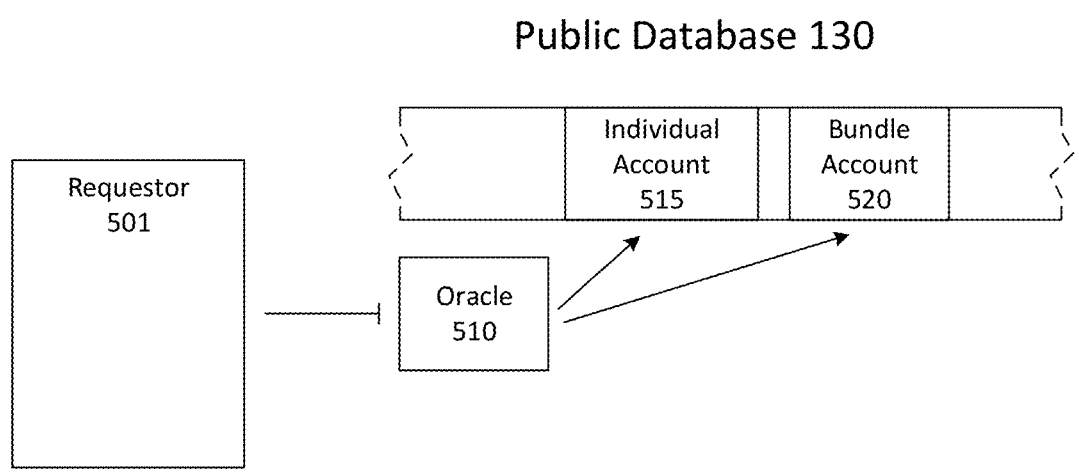
FIG. 5 depicts an exemplary schematic of a database for storing tag information.

FIG. 5 depicts an exemplary schematic of a database for storing tag information. In some embodiments, public database can include individual accounts 515 and bundle accounts 520. Consistent with disclosed embodiments, high-value items can have status information store in individual accounts (e.g., houses, jewelry, cars, or the like) while multiple low-value items can have status information stored in a single bundle accounts (e.g., shoes, cloths, personal electronics, digital products such as movies, or the like). In some aspects, each transaction involving a secure tag of a high-value item can be written to public database 130, while groups of transactions involving low-value items can be stored in a private database and periodical written to the corresponding bundle account 520. In some embodiments, when public database 130 is a distributed database, requestor 501 (e.g., authentication server 115) must interact with an oracle 510 in order to read and write information to the public database. In various aspects, the requestor and the oracle can be combined into a single program (e.g., authentication server 115 can serve as both requestor 501 and oracle 510). In some embodiments, users of system 100 can be able to read information from public database 130, directly, without having to contact authentication server 115. For example system 100 can include a portal for reading information concerning secure tags that is contained in public database 130.

Figure 6:
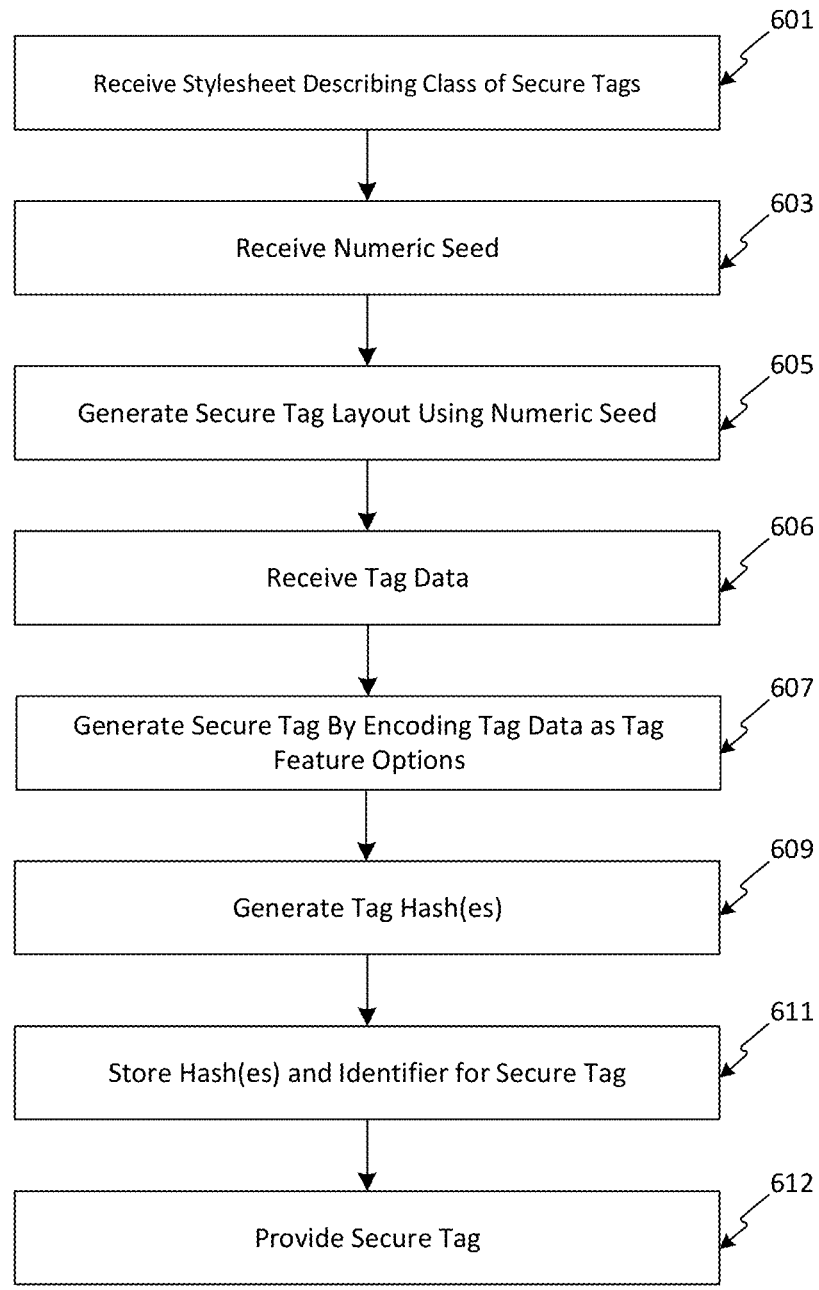
FIG. 6 depicts a flowchart illustrating an exemplary process of tag generation.

FIG. 6 depicts a flowchart illustrating an exemplary process 600 of secure tag generation, consistent with disclosed embodiments. Though described below as performed by private system 120, process 600 can be performed in some embodiments by authentication server 115 or another system. Process 600 can include receiving the numeric seed and stylesheet necessary to generate a secure tag, generating a secure tag layout, generating a secure tag using the secure tag layout and tag data, registering the secure tag with authentication server 115, and providing the tag in an appropriate form for the product to be tracked. In this manner, an identifier unique to the product can be generated that encodes tag data as a selection of tag feature options.

After starting, process 600 can proceed to step 601. In step 601, private system 120 can receive a stylesheet. The stylesheet can describe a class of secure tags. In some embodiments, the class of secure tags and be similar in appearance, purpose, or use. For example, a stylesheet can describe a class of secure tags used by a particular manufacturer (e.g., a shoe manufacturer) to label a particular product (e.g., a model of shoe). In some embodiments, a manufacturer can use the same stylesheet to generate secure tags for instances of the same product. This can allow the manufacturer to achieve a degree of visual uniformity among the secure tags used to label a product while ensuring that each individual tag remains unique.

A stylesheet can define tag data locations, tag features, and tag feature options usable by secure tags in this class. In some aspects, spatial options (e.g., tag feature sizes, tag feature positions within the secure tag, and the like) can be defined by normalized values, such as ratios and angles. As a nonlimiting example, a stylesheet can be configured to define a first diameter option for a point can be 10% of the distance from a center of the secure tag to the outer edge of the secure tag, while a second diameter option for the point can be 15% of the distance from the center of the secure tag to the outer edge of the secure tag. As a second nonlimiting example, a stylesheet can be configured to define potential tag feature locations according to a radial coordinate frame with an origin at the center of the tag. A particular potential tag feature location could be 5 degrees clockwise from an orientation line and 50% of the distance from the center point to the edge of the tag. As another example, a break in a rim of the tag could be twice as wide as the width of the tag. The width of the rim of the tag could be defined, in turn, as a fraction of the distance from a center point to the edge of the tag. In this way, the stylesheet can be used to define a set of constraints on tag features that can be used to authenticate a tag, independent of whether the tag can be decoded.

The stylesheet can describe potential mappings of data to tag feature options, consistent with disclosed embodiments. For example, the stylesheet can describe a correspondence between particular tag feature options and particular bits of a binary number. In some aspects, the stylesheet can describe a correspondence between particular values of tag feature options and particular values of bits of the binary number. For example, when a tag feature option has a particular value (or a particular range of values, or a value selected from a particular set of potential values), the corresponding bit of the binary number can have a value of 1. When the tag feature option has a different particular value (or a different particular range of values, or a value selected from a different particular set of potential values), the corresponding bit of the binary number can have a value of 0. In various aspects, the stylesheet can describe alternative options for secure tag layout and the correspondences between tag feature options and tag data values. In some aspects, the stylesheet can describe a potential for tag features to exist or not exist at a particular location. For example, the stylesheet can identify locations in the secure tag at which dots may be present, or locations in a rim of the secure tag at which breaks may be present. These options can be mutually exclusive. For example, according to a first option, a particular portion of a secure tag can be reserved for tag data, while according to a second option, that particular portion of the secure tag can be reserved for a reference to another portion of the secure tag, and according to a third option, that particular portion of the secure tag can be filled with random tag features intended to thwart unauthorized tag decoding.

In some embodiments, the stylesheet can be configured with data and/or instructions for selecting between multiple secure tag layout options (e.g., layout options, options for tag data to tag feature option correspondences, the presence or absence of tag features at particular locations, etc.) This selection process can depend on randomly generated numbers. For example, the stylesheet can be configured to select between a first use for a particular location in a secure tag (e.g., storing data) and a second use for the particular location in a secure tag (e.g., storing junk values) according the value of a randomly generated number. The stylesheet can be configured to use a vector of such randomly generated numbers to particular secure tag layout (including, for example, specific layout options, options for tag data to tag feature option correspondences, the presence or absence of tag features at particular locations, etc.) The stylesheet can also be configured with a vector of parameters. For example, the stylesheet can be configured to select a first correspondence between tag data and tag feature options when the value of a randomly generated number exceeds the value of a parameter $\alpha$ and select a second correspondence between tag data and tag feature options otherwise. To continue this example, the stylesheet can be configured to select a first location in the secure tag for encoding tag data when the value of another randomly generated number exceeds the value of a parameter $\beta$ and select a second location in the secure tag for encoding tag data otherwise. In this example, a and R are parameters of the stylesheet. These parameters may take default values or may take values received from a user or retrieved from another system or configuration file.

In some embodiments, a stylesheet can be configured to contain parameters for how the tag is to look, minimum, maximum values and tolerances for preset, variable or randomly generated features. A stylesheet can be configured to generate different secure tag layouts depending on the intended use of the secure tag (e.g., the intended size of the secure tag, as a small tag may be more difficult to read using a cellphone camera, the intended resolution of the printed secure tag, the intended color and surface finish of the secure tag). In some embodiments, private system 120 can be configured to provide a configuration tool enabling the generation, export, and storage of stylesheets.

Private system 120 can be configured to generate random numbers for use by the stylesheet in creating a secure tag layout. The random numbers can be generated using a pseudorandom number generator. In some aspects, the stylesheet can specify the pseudorandom number generator (e.g., by reference to a function library or web service, by encoding the pseudorandom number generator into the stylesheet, or the like). In various aspects, private system 120 can specify the pseudorandom number generator.

In some embodiments, the pseudorandom number generator can be configured to generate a sequence of random numbers dependent on an initial seed. Given the same seed, the pseudorandom number generator can be configured to generate the same sequence of pseudorandom numbers. The secure tag layout generated by the stylesheet can therefore depend on any parameters of the stylesheet and the seed, consistent with disclosed embodiments.

In various embodiments, a pseudorandom number, represented as a binary number, can provide a sequence of selections by its bits. For example, when the binary number is 00110110, the "false" option may be selected for the first two options provided by the stylesheet and the "true" option may be selected for the third option provided by the stylesheet. Multiple bits can be used to select between options having more than two choices. For example, two bits can be used to select options have four possible values.

In some embodiments, a stylesheet can include a public portion. In some aspects, system 100 can be configured to provision client devices with public portions of stylesheets. In various aspects, the public portions of stylesheets can be available at a known location (e.g., a known URL or the like). The public portion of a stylesheet can include at least some of the ratios that constrain tag feature relationships. For example, the public portion can include a ratio between the width of an outer tag rim and a diameter (or major or minor axis, or the like) of the tag. This ratio could be used to determine whether a tag was authentic, in some aspects, without any further processing. The public portion can also indicate where public tag data is located and how to decode that tag data. As a non-limiting example, the public portion of a stylesheet can indicate that a spline along the outer edge of the outer rim, beginning at a 12 o'clock position and continuing to a 6 o'clock position, encodes a SKU, a URL of the authentication server, or a known value for use in determining whether an image of the tag has been correctly processed. As the stylesheet describes a class of tags, this public portion can describe information accessible in every secure tag belonging to this class of tag.

In some embodiments, a stylesheet can include a private portion. The private portion can describe ratios, secure tag layout information, correspondences between tag data and tag feature options and the like, which can be used to encode private tag data. In some aspects, the private portion of the stylesheet can be stored by private system 120.

After starting, process 600 can proceed to step 603. In step 603 private system 120 can obtain a numeric seed. Private system 120 can be configured to generate the numeric seed using a random number generator. Private system 120 can be configured to receive the numeric seed from a user of system 100, a configuration file, or another system.

After steps 601 and 603, process 600 can proceed to step 605. In step 605, private system 120 can generating a secure tag layout using the numeric seed and the stylesheet. As described above, the stylesheet can include multiple ways to encode data as tag feature options. The selection of a particular way to encode data as tag feature options (e.g., a secure tag layout) can depend on the numeric seed.

In some embodiments, a random number generator (e.g., Gibson Research Corporation's Ultra-High Entropy Pseudo-Random Number Generator or the like) can generate one or more pseudorandom numbers using the numeric seed. These pseudorandom numbers can then be used to select ways to encode data as tag feature options. For example, when there are 32 binary options, the bit values of two 16-bit binary number can be used to select among the 32 binary options to generate the secure tag layout. As an additional example, 32 binary options may be selected based on comparing randomly generated numbers to threshold parameters. For example, private system 120 may be configured to choose a first option if the value of a randomly generated number exceeds 0.95 and to a second option otherwise. As a further option, the random number generator can be used in combination with a card shuffle algorithm to generate a sequence of binary data (e.g., the presence or absence of a sequence of 20 tag features). As a non-limiting example, private system 120 can be configured to determine a required number of tag features, determine a number of potential locations for these tag features, create an array equal in size to the number of potential locations, fill the required number of elements in the array with a value indicating the presence of the tag feature, and then shuffle the array to create a random sequence (e.g., using the Fisher-Yates shuffle algorithm or the like). In this manner, the secure tag layout can specify a combination of tag feature options based on the choice of numeric seed and stylesheet.

In some embodiments, a secure tag layout can specify at least one of referenced tag portions, reference portions, unreferenced tag portions, key portions, or junk portions. These portions can include one or more locations in a secure tag containing tag data. For example, a referenced tag portion can include one or more locations in a secure tag identified by tag data stored elsewhere on the tag. A corresponding reference portion of a secure tag can store tag data necessary for locating the referenced portion of the secure tag. Thus decoding the reference portion of the secure tag can enable the corresponding referenced portion of the secure tag to be decoded. In some embodiments, additional information may be required to decode the referenced portion of the tag. For example, the data stored in the reference portion may enable the referenced portion to be located, but additional decoding instructions or cryptographic keys may be necessary to decode the tag data at the referenced portion. As an additional example, an unreferenced portion can include one or more locations in a secure tag that is not referenced by tag data stored elsewhere in the tag. Without instructions (e.g., a relevant portion of the stylesheet), such unreferenced portions could not be identified, much less decoded. As a further example, a key portion can include one or more locations in a secure tag at which key material is stored. In some aspects, such key material can be used to decode tag data encoded into other portions of the secure tag. In various aspects, such key material can be used to request instructions for decoding other portions of the tag (e.g., such key material can include application keys or the like). A key portion can be a referenced or unreferenced portion, as described above. In some embodiments, a secure tag can include junk portions that that do not store data, or that store random data lacking semantic significance. Such junk portions ensure that an attacker cannot simply assume that all tag features have some relevant meaning, making an unauthorized attempt to decode the tag more difficult.

In some embodiments the tag portions can describe spatial areas of the secure tag. For example, a physical quadrant of the secure tag. In various embodiments, the tag portions can describe logical portions of the secure tag. For example, the secure tag can be a vector graphics file and the tag portion can be a logical division within that vector graphics file. For example, a tag portion can include an element containing SVG tags describing potential locations for dots in a secure tag in a particular order. The order of the tags in the element can describe a mapping from bits in a number to the presence or absence of the dots in the secure image, without any reference to the actual location of the dots in the secure tag.

Consistent with disclosed embodiments, a secure tag layout can include multiple different types of tag feature options. Tag feature options can include the presence or absence of a tag feature at a position specified by the secure tag layout. For example, a secure tag layout can indicate that a dot may be placed at a particular location within a secure tag. The presence of the dot at that location can indicate that a corresponding bit of tag data is set.

Tag feature options can include a size, color, or shape of a tag feature. For example, a secure tag layout can indicate that a larger dot (or first color dot, or distorted tag feature, or the like) corresponds to a set bit and a smaller dot (or second color dot, or undistorted tag feature, or the like) corresponds to a null bit.

Tag feature options can include a deviation from a position specified by the secure tag layout. For example, the secure layout can specify a relative location for a tag feature within the secure tag. Deviation from the specified location can encode values for one or more bits by the direction and magnitude of the deviations (e.g., one or more bits by deviations in the x-direction and one or more bits by deviations in the y-direction).

Tag feature options can include a number of tag features present at a position specified by the secure tag layout. For example, a number of dots present at a specified location can encode bits. As a further example, the encoding can be by a direct correspondence (e.g., the value of the bits comprises the number of dots) or by some indirect correspondence (e.g., a bit is set when there are zero to two dots present and null when there are more than two dots present).

Tag feature options can include the presence of microstructures on the tag feature. Such microstructures may include microprinted bar codes, QR codes, text or other features. In some embodiments, the microstructures can be printed such that a scanner at a first distance from the secure tag (e.g., greater than a distance between 5 and 20 cm) cannot resolve the microstructures, while a scanner at a second distance from the secure tag (e.g., less than a distance between 1 and 10 cm) can resolve the microstructures.

Tag feature options can include the presence of spline encoding on the tag feature. In some embodiments, spline encoding can include an extension or variation of a tag feature edge. This extension or variation can extend a varying distance from a reference point or line. For example, the edge of an otherwise round dot can extend a varying amount from the center of the dot, or from the circumference of the dot as specified by the tag layout. This varying distance can encode one more spatially multiplexed tag data values.

For example, a fundamental spatial frequency can be multiplexed with the binary representation of a first tag value. Thus the fundamental spatial frequency can contribute to the extension or varying of the edge at locations corresponding to set bits in the first tag value, but not at locations corresponding to null bits in the first tag value. Additional fundamental spatial frequencies can be multiplexed with binary representations of additional tag values. These fundamental spatial frequencies can differ by at least a factor of four (e.g., the first fundamental spatial frequency can have a period of $2^{12}$ micrometers, the second spatial frequency can have a period of $2^{10}$ micrometers, the third spatial frequency can have a period of $2^8$ micrometers, etc). The secure tag layout can be configured to further specify an origin and number of repeats for decoding the splines. Thus the varying distance can encode repeats of the one or more spatially multiplexed tag data values.

Tag features can include rims for the secure tags, such as an inner rim and an outer rim. Tag feature options for the rims can include rim breaks, rim deformations, and rim connections. When a rim includes rim breaks as an option, tag feature options for the rim breaks can include rim break edge shapes.

Tag features can include connections between predetermined types of tag features. For example, such connections can include connections between dots and connections between dots and rims (e.g., a connection between a dot and an inner rim or outer rim). Tag feature options for the connections can include connection width and connection asymmetry.

Tag features can include a center logo. The center logo can be used to identify a general class of tag, for example enabling a user to identify a public portion of a stylesheet that can be used to decode public data in the tag. Tag feature options for a center logo can include a displacement of the center logo from a center point of the secure tag. For example, a hash of the secure tag or a public key associated with the secure tag can be encoded by the displacement of the center logo from a center point of the secure tag.

After starting, process 600 can proceed to step 606. In step 606, private system 120 can be configured to receive tag data. The tag data can be received through a user interface from a user, from an input file, from a memory of private system 120, from another system, or the like. The tag data can include data and/or instructions. The data and/or instructions can be represented by one or more numbers. The tag data can include an identifier for a multifactor identification item. An attempt to read the tag or perform an action using the tag can include decoding the tag and comparing the identifier to other data to determine whether the read attempt or action is authenticated or authorized. For example, the multifactor identification item can include an authentication credential (e.g., a password; API key; token; hash of a password, API key, or token; or the like). As an additional example, the multifactor identification item can include contextual information, such as an image or perceptual hash of an image, or a voiceprint or hash of a sound. For example, the image can depict a portion of a product labeled with the tag. Including a perceptual hash of an image of a portion of the product labeled with the tag, private system 120 can be configured to prevent the tag from being moved to another product or the labelling of multiple products with copies of the secure tag. As an additional example, the image can depict a person associated with the secure tag. As a non-limiting example, the person can be the owner of the labeled product. In this manner, the secure tag can be used to verify ownership.

As a further example, the tag data can include one or more identifiers for one or more other secure tags. For example, a first identifier of the one or more identifiers can include a perceptual hash of a first secure tag of the one or more other secure tags. In this manner, additional tags can be paired to the present tag. In some embodiments, the authentication server can be configured to request the provision of images of these additional tags, or perceptual hashes of these additional tags, in order to authenticate or authorize a request concerning the present tag.

After step 606, process 600 can proceed to step 607. In step 607, private system 120 can generate a secure tag encoding the tag data. In some aspects, private system 120 can be configured to generate the secure tag encoding the tag data by selecting the tag feature options according to values of the tag data. For example, when the secure tag layout provides tag feature options including potential locations for multiple dots or rim breaks and the tag data includes a binary number, a dot or rim break can be present or absent depending on whether a corresponding bit of the binary number is set or null. In some embodiments, at least a portion of the tag data can be encrypted using a cryptographic key. The secure tag can then be generated by selecting the tag feature options according to values of the encrypted tag data. In some embodiments, a cryptographic key for decrypting the encrypted tag data can also be encoded into the secure tag (e.g., in a referenced or unreferenced key portion of the secure tag). In some embodiments, the secure tag can be a vector graphics file, such as a Scalable Vector Graphics file, Encapsulated PostScript file, Portable Document Format file, or the like.

After step 607, process 600 can proceed to step 609. In step 609, private system 120 can generate a perceptual hash (such as a pHash or the like) an of the secure tag. Generating a perceptual hash can include rasterizing the secure tag. For example, when the secure tag is stored as a vector graphics file, generating the perceptual hash can include converting the perceptual hash to a raster graphics file format. In some embodiments, private system 120 can be configured to check for hash collisions by comparing the generated pHash to a library of pHashes for existing secure tags. Should a hash collision exist, private system 120 can be configured to recreate the secure tag using a new numeric seed. In various embodiments, private system 120 can be configured to generate additional perceptual hashes of differing segments of the secure tag at multiple levels of detail.

After step 609, process 600 can proceed to step 611. In step 611, private system 120 can store the perceptual hash of the secure tag in a database (e.g., a database of authentication server 115). In some aspects, when private system 120 is configured to generate additional hashes of differing segments of the secure tag, these additional hashes can be stored in the database together with the perceptual hash of the overall secure tag. Private system 120 can be configured to store an identifier for the secure hash in the database together the hash(es) of the secure tag. This identifier can be configured to enable private system 120 to determine which stylesheet and numeric seed were used to generate the secure tag. For example, private system 120 can be configured to maintain a database for tracking secure tags. This database can use include secure tag identifiers as key values, an indication of the stylesheet used to generate each secure tag, and the numeric seed used to generate each secure tag. In some embodiments, this database does not include the tag data used to generate the secure tag, or the image of the secure tag. Thus an attacker able to compromise this secure database would not be able to recreate the tag data from the store identifiers, stylesheet references, and numeric seeds.

After step 611, process 600 can proceed to step 612. In step 612, private system 120 can be configured to provide the secure tag. In some embodiments, providing the secure tag can include labeling an object with the tag or incorporating the secure tag into a digital product, such as a video file or web page. For example, providing the secure tag can include providing instructions to display the secure tag on a computer screen or the like. In various embodiments, providing the tag can include printing the tag on a substrate. For example, providing the secure tag can include providing the secure tag as a vector file or as a raster file to a printing system that labels a product with the secure tag. Thus providing the secure tag can include rasterizing the secure tag. In some embodiments, the tag can be provided in multiple types of ink. For example, at least a first portion of the tag printed in fluorescent ink. This fluorescent ink may only be visible under certain lighting conditions, thereby creating additional options for encoding tag data.

In some embodiments, authentication server 115 can be configured to retrieve tag status information from a database (e.g., database 130). For example, authentication server 115 can be configured to determine whether the secure tag is still valid, has been cancelled, or includes authentication requirements concerning actions involving the secure tag (e.g., requiring the user provide an application key or authentication credential in order to perform a transaction involving the secure tag).

Figure 7:
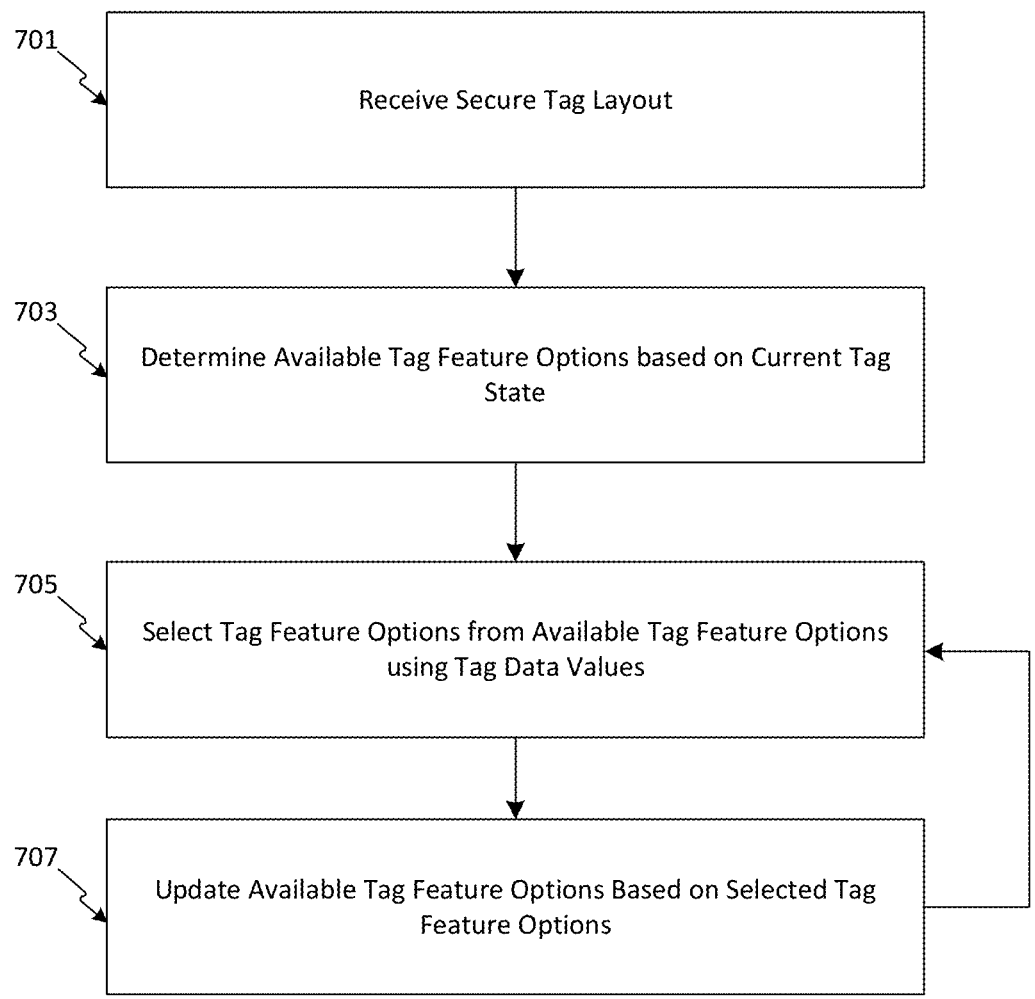
FIG. 7 depicts a flowchart illustrating an exemplary iterative encoding process.

FIG. 7 depicts a flowchart illustrating an exemplary iterative encoding process 700, consistent with disclosed embodiments. Though described below as performed by private system 120, process 700 can be performed in some embodiments by authentication server 115 or another system. Process 700 can include receiving a secure tag layout, determining available tag features based on a current tag state, selecting tag feature options use tag data values, and updating the available tag feature options based on the selected tag feature options. In this manner, items of tag data can be iteratively encoded into a secure tag, with each iteration creating the tag feature options used to encode the next item of tag data.

After starting, process 700 can proceed to step 701. In step 701, private system 120 can receive a secure tag layout. The secure tag layout can be received from a prior step in a process of generating a secure tag (e.g., step 605 of process 600), from a memory of private system 120, from another component of system 100, or from another system. The secure tag layout can include a set of potential tag feature options.

After step 701, process 700 can proceed to step 703. In step 703, private system 120 can determine available tag features based on a current tag state. For example, a secure tag layout may specify that tag features can include dots and connections between dots. The secure tag layout may specify an ordering of potential dot locations, with the position of a potential dot location in the ordering corresponding to a bit position in binary tag data. The secure tag layout may specify that the presence of a dot corresponds to a bit value of 1 and the absence of a dot corresponds to a bit value of zero. In this example, the current tag state can include these potential dot locations. The current tag state could also include additional available tag features, such as potential rim breaks or distortions.

After step 703, process 700 can proceed to step 705. In step 705, private system 120 can select tag feature options from the available tag feature options using tag data values. To continue the prior example, private system 120 can read a bit from the binary tag data and place a dot at the corresponding potential dot location when the value of the bit is 1 (and simply skip to the next bit when the value of the bit is 0). While explained with regards to dots, such a process is similarly applicable to other tag features.

After step 705 process 700 can proceed to step 707 In step 707 private system 120 can update the available tag feature options based on the selected tag feature options. To continue the prior example, the potential dot locations may no longer constitute selectable tag feature options, but dot size, dot color, the presence or absence of connections between dots, and the presence or absence of connections between dots and rims, may now be available. The stylesheet can provide rules governing the correspondence between these tag feature options and tag data items. For example, the stylesheet can provide rules for associating connections between dots with particular bits in binary tag data.

Private system 120 can be configured to continue selecting tag feature options and update the set of available tag feature options until the tag data is completely encoded. For example, private system 120 can select first tag feature options according to values of first tag data. This selection of the first tag feature options can create second tag feature options. Private system 120 can then select second tag feature options according to values of second tag data. This selection of the second tag feature options can in turn create third tag feature options. In a non-limiting example, the first tag feature options can include the presence or absence of points, the second tag feature options can include the presence or absence of connections between points present according to the values of the first tag data, and third tag feature options encoding third tag data can include the width of connections present according to the values of the second tag data.

Figure 8:
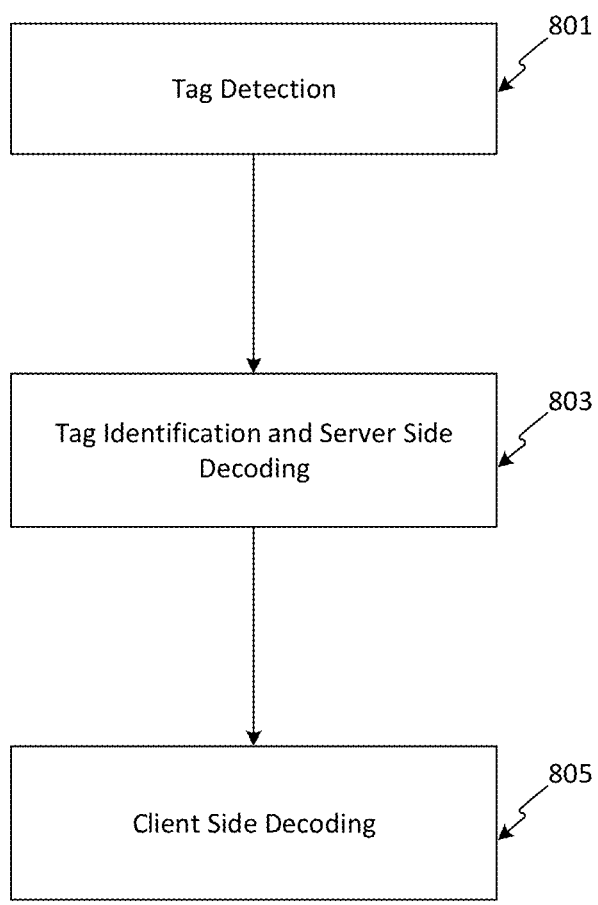
FIG. 8 depicts a flowchart illustrating an exemplary process of tag reading.

FIG. 8 depicts a flowchart illustrating an exemplary process 800 of tag reading. Process 800 includes the steps of tag detection, tag identification and server-side decoding, and optional client-side decoding. In some embodiments, tag detection can be performed by client device 110 using an image received from a scanner of client device 110 (e.g., a camera of a mobile device, or a handheld optical scanner). In various embodiments, tag detection can be performed by client device 110 using an image received from another device. In various embodiments, tag identification and server-side decoding can be performed by authentication server 115, private system 120, or another system. In various embodiments, optional client-side decoding can be performed by client device 110.

After starting, process 800 can proceed to step 801. In step 801, client device 110 can receive a raster image including at least a portion of secure tag 105. In some embodiments, tag detection 801 can include converting the raster image to a normalized vector graphics image and providing the vector graphics image to authentication server 115. In various embodiments, tag detection 801 can include converting the raster image to a normalized raster image and providing the normalized raster image to authentication server 115.

Tag detection 801 can include detecting secure tag 105 in a received image using at least one of geometric feature detection, kernel-based feature detection, template matching, or a convolutional neural network. In some embodiments, detecting secure tag 105 in a received image using geometric feature detection can include thresholding a raster image to generate a binary valued image. This thresholding can include converting a color image to a greyscale image and then thresholding the image based on greyscale values, or converting the color image to a black and white image. In some embodiments, client device 110 can be configured to perform the image conversion using image processing functions provided by ImageMagic, OpenCV, or the like.

Client device 110 can be configured to detect geometric features in the received tag image that match known target parameters, consistent with disclosed embodiments. Client device 110 can also be configured to detect a reference point of the potential secure tag using the geometric features. In some aspects, client device 110 can be configured to use geometric feature-detection algorithms provided by OpenCV or the like. In some aspects, client device 110 can be configured to use target parameter values retrieved from the stylesheet in detecting the geometric features in the binary-valued image. For example, a public portion of the stylesheet can include a description of the geometric features present in a class of secure tags. Such geometric features can include the shape of an inner and/or outer tag rim. For example, the stylesheet can indicate that the inner and outer tag rims are circles having predetermined dimension ratios. Client device 110 can then use the geometric feature-detection algorithms to detect concentric ellipses with appropriate dimension rations in the received tag image. In some embodiments, the reference point can be a focus of the concentric ellipses. In some embodiments, client device 110 can register the reference point as the center of secure tag 105.

Client device 110 can be configured to detect potential tag locations in the image using kernel-based feature detection, consistent with disclosed embodiments. In some aspects, the kernel-based feature detection can be used to identify the outline of secure tag 105 or tag features within secure tag 105. Consistent with disclosed embodiments, the kernel-based feature detection can be performed using kernel-based feature detection algorithms provided by OpenCV or the like.

Client device 110 can be configured to detect potential tag locations in the image using template matching or image stencil detection. In some embodiments, the templates or stencils can be included in, or generated using public portions of stylesheets. The templates or stencils can concern identifying portions of the secure tags, such as center logos or tag rims. For example, a template or stencil can match a center logo. Client device 110 can be configured to perform template matching or image stencil detection using template matching algorithms provided by OpenCV or the like.

Client device 110 can be configured to detect potential tag locations in the image using a convolutional neural network. The convolutional neural network can be implemented using real-time object detection functions provided by YOLO or the like. The convolutional neural network can be trained to distinguish secure tags from other features in an image. In some embodiments, the convolutional neural network (or another convolutional neural network) can be configured to distinguish between classes of secure tags, following identification of a secure tag in an image.

During tag detection step 801, client device 110 can be configured to generate a normalized secure tag image using the received image and a stylesheet. In some embodiments, client device 110 can be configured to use a public portion of the stylesheet. The public portion of the stylesheet can specify target parameter values for a class of tags. These target parameter values can include shared characteristics of tags in the class of tags. Such shared characteristics can include the presence, absence, shape, and orientation of tag features such as a center logo, inner rim, and outer rim. The target parameter values can further include ratios describing relationships between dimensions of tag features. For example, such ratios can include a ratio between inner (or outer) tag rim thickness and tag diameter or a ratio between inner (or outer) tag rim thickness and tag rim break widths. The target parameter values can also include size constraints on the tag (e.g., an overall diameter of a circular secure tag). Client device 110 can be configured to determine whether a secure tag identified in a received image satisfies the overall size constraints retrieved from the public portion of the stylesheet. The publicly available portion of the stylesheet can also provide rules for decoding public tag data encoded into the secure tag as tag feature options. For example, the publicly available portion of the stylesheet can describe a correspondence between tag feature options discernable from the normalized image and encoded tag data. The stylesheet, including the publicly available portion of the stylesheet, can also describe semantics of encoded data. For example, the publicly available portion of the stylesheet can identify publicly accessible encoded binary data as an address of an authentication server, a product type, a brand name, an inventory number, or an error correction code.

During tag detection step 801, client device 110 can be configured to flatten the received image using an image warp transform. In some embodiments, client device 110 can perform the warp transform using target parameter values retrieved from the public portion of the stylesheet. In some aspects, the image warp transform can map tag features detected in the received image to known positions specified in the public portion of the stylesheet. For example, client device 110 can detect potential secure tag rims in the received image and determine a transformation from the detected image locations to the known image location. Using image warping functions provided by OpenCV or the like, client device 110 can be configured to transform the entire image to better map the detected features to the feature locations described by the public portion of the stylesheet. In this manner, client device 110 can be configured to correct for at least one of fisheye distortion, barrel distortion, or angular distortion.

During tag detection step 801, client device 110 can be configured to determine an orientation of a tag feature and rotate the image based on the determined orientation of the tag feature. The rotation can further be based on a target parameter value retrieved from the public portion of the stylesheet. The tag feature can a center logo of the secure tag. Client device 110 can be configured to identify a center of the tag using the template match system described above. Client device 110 can be configured to then determine an outer ovoid line encompassing the entire secure tag. Client device 110 can be configured to then determine a center of the secure tag. After determining the center and the ovoid line, client device 110 can be configured to construct multiple right triangles on the secure tag image. The right triangles can be placed such that the center of each right triangle overlaps the center of the secure tag, while the two vertices bounding the hypotenuse intersect the outer ovoid rim. The triangle(s) with the least and/or greatest hypotenuse can be used, in conjunction with orientation information in the public portion of the stylesheet, to correct the orientation of the tag. Client device 110 can be configured to determine the appropriate style sheet based on the center logo. Should the secure tag not include a center logo, client device 110 can be configured to determine the tag style sheet by reading tag feature options in a default location (e.g., characters from an outer edge spline using spline encoding).

During tag detection step 801, client device 110 can be configured to detect image gaps. Such image gaps can arise from damage, lighting (e.g., reflections of ambient light into the scanner), or surface conditions (e.g., dirt). Client device 110 can be configured to detect tag feature options for potential image gaps and compare the tag feature option values to target parameter values listed in the public portion of the stylesheet. Should the potential image gaps not match target parameter values in the public portion of the stylesheet, client device 110 can be configured to disregard the image gaps, extending tag features surrounding the image gaps through the image gaps based on the target parameter values in the public portion of the stylesheet. For example, client device 110 can be configured to process rim gaps determined to be artifacts by disregarding the rim gaps when converting the normalized raster image to a vector graphics file for transmission to authentication server 115.

During tag detection step 801, client device 110 can be configured to provide an identification request to an authentication server, the identification request including the normalized secure tag image. Though described herein as an "identification request," the reason or purpose for providing such a request is not limited to identifying the secure tag. For example, providing the identification request can be part of an action involving a secure tag, such as a transaction of ownership of an item labeled with the secure tag, an update of rules concerning the secure tag, or cancelation of the secure tag. As described above, client device 110 can be configured to at least normalize an orientation of a received raster image, flatten the raster image, correct image gaps. Client device 110 can be configured to then generate the normalized secure tag image by converting the raster image to a vector graphics image, such as an SVG, EPS, or PDF image.

In some embodiments, client device 110 can be configured to provide instructions to display the image and an indication highlighting the potential secure tag on a user interface of the secure tag reader. For example, when client device 110 is a camera of a smartphone, the display of the smartphone can depict the image and include a bounding box, or similar indication, around the detected secure tag. In some embodiments, the bounding box can indicate whether the tag has been successfully identified. For example, a color, shape, linestyle, or the like of the bounding box can indicate whether the tag has been successfully identified. Client device 110 can be configured to perform an action upon selection of the bounding box, such as optically or digitally zooming into the area of the detected tag.

After step 801, process 800 can proceed to step 803. In step 803, client device 110 can be configured to provide an identification request to authentication server 115. The identification request can include a normalized image generated in step 801. The normalized image can be a vector graphics image. In some embodiments, the raster image received by client device 110 in step 801 can include multiple potential secure tags. In such embodiments, client device 110 can be configured to detect and generate normalized images of the multiple potential secure tags. Client device 110 can be configured to provide the generate normalized images as a stream of vector graphics images corresponding to the multiple potential secure tags. In some embodiments, the identification request can include a public key of the secure tag reader and at least a portion of the identification request can be encrypted with a private key of client device 110.

In some embodiments, client device 110 can be configured to receive instructions to generate another image. These instructions can be received from authentication server 115. The instructions can automatically cause client device 110 to generate a second, zoomed-in image of the potential secure tag. Alternatively or additionally, the instructions can direct the user to cause the client device 110 to generate a second, zoomed-in image of the potential secure tag. Client device 110 can then be configured to generate another normalized image from the second, zoomed-in image of the potential secure tag.

After step 803, process 800 can proceed to step 805. In step 805, client device 110 can receive decoding instructions and/or tag data from authentication server 115. In some embodiments, the decoding instructions can supplement the public portion of the stylesheet. For example, the decoding instructions can restrict the possibilities disclosed by the stylesheet to a particular mapping of between tag feature options and tag data values. In various embodiments, the decoding instructions can describe a particular set of rules for converting tag feature options to tag data values. For example, decoding instructions can indicate that a particular tag data item has values dependent on a specifically identified set of tag feature options.

As indicated above, in some embodiments client device 110 can be configured to provide instructions to display the image and an indication highlighting the potential secure tag on a user interface of the secure tag reader. In some embodiments, client device 110 can be configured to receive an indication from a user selecting a potential secure tag (e.g. the indication can be a bounding box surrounding the potential secure tag and the indication can include selection of the bounding box by a user on a touch-sensitive display). Client device 110 can be configured to generate a normalized image of the potential secure tag, to provide an identification request to authentication server 115, and to receive tag data and/or decoding instructions from authentication server 115 in response. Client device 110 can be configured to decode tag data using any decoding instructions received from authentication server 115. Client device 110 can then be configured to provide instructions to display the secure tag data (e.g., received and/or decoded tag data) on a user interface of client device 110 (or another device).

Figure 9:
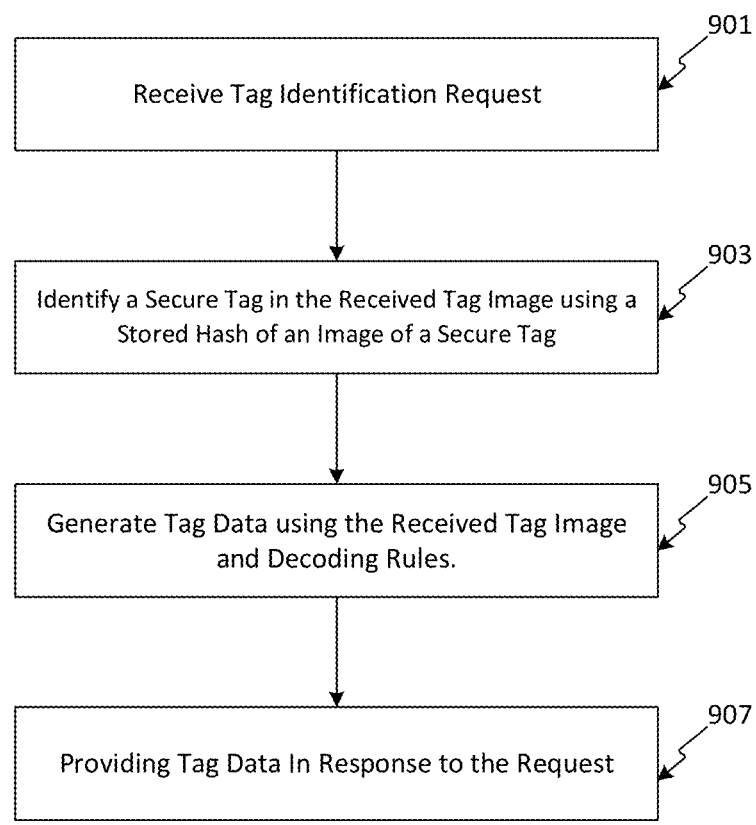
FIG. 9 depicts a flowchart illustrating an exemplary process of tag identification.

FIG. 9 depicts a flowchart illustrating an exemplary process 900 of tag identification. Though described below as performed by authentication server 115, process 900 can be performed in some embodiments by private system 120, client system 110, or another system. Consistent with disclosed embodiments, process 900 can include the steps of receiving a tag identification request, identifying a secure tag based on the tag identification request, generating tag data using the retrieved tag image and decoding rules, and providing the decoded tag data in response to the request.

After starting, process 900 can proceed to step 901. In step 901 authentication server 115 can receive a tag identification request. The tag identification request can include a tag image (e.g., a photograph or video image including an unidentified secure tag). Authentication server 115 can be configured to receive the tag identification request from client device 110. The tag identification request can be received using network 130. In some aspects, the tag identification request can include an authorization key (e.g., an API key for authorizing API calls). In some aspects, the tag identification request can include a session token (e.g., an OAUTH 2.0 bearer token, Kerberos token, or the like). In some aspects, the tag identification request can include user identification information, such as a user name or account information. In some aspects, authentication server 115 can be configured to determine whether the identification request is valid based on the session token and general access rules 210. For example, authentication server 115 can be configured by general access rules 210 to require account information in addition to a session token. Alternatively, authentication server 115 can be configured by general access rules 210 to permit access without requiring account information.

After step 901, process 900 can proceed to step 903. In step 903 authentication server 115 can identify secure tag 105 in the received tag image. Consistent with disclosed embodiments, authentication server 115 can be configured to identify secure tag 105 using a stored hash of an image of a secure tag. The stored hash can be a perceptual hash (e.g., a pHash, aHash, dHash, or the like). The secure tag corresponding to the stored hash may have been generated using a stylesheet, as describe above with regard to FIG. 6. In some embodiments, authentication server 115 can be configured to store hashes received from private system 120. Authentication server 115 may be configured to associate the stored hashes with secure tag identifiers. Authentication server 115 may not be configured to store stylesheets or private portions of stylesheets. Therefore, should an attacker gain access to authentication server 115, the attacker only gains access to hashes and secure tag identifiers. But authentication server 115 may be configured to store public portions of stylesheets, in some embodiments.

In step 903, consistent with disclosed embodiments, authentication server 115 can generate one or more hashes of the received tag image. The one or more generate hashes can be perceptual hashes (e.g., a pHash, aHash, dHash, or the like). In some aspects, the received tag image can be a vector graphics image. In various aspects, generating the hash of the received tag image can include converting at least a portion of the received vector graphics image into a raster image. This raster image can have a predetermined number of pixels. In some aspects, the predetermined number of pixels can be greater than or equal to 64 pixels. In various aspects, the predetermined number of pixels can be less than or equal to 1,048,576 pixels.

In step 903, consistent with disclosed embodiments, authentication server 115 can identify secure tag 105 in the received tag image by comparing the generated one or more hashes of the received tag image with the stored hash of an image of a known secure tag. In some embodiments, this comparison can include determining a difference between the stored hash and the generated hash. Authentication server 115 can be configured to identify secure tag 105 as the secure tag corresponding to the stored hash(es) when the difference between the stored hash and the generated hash satisfies a threshold criterion. For example, the threshold criterion can require that the hashes match. As an additional example, the threshold criterion can require that the hashes are similar. For example, in some aspects, the difference can be a distance between the stored hash and the generated hash. Authentication server 115 can be configured to identify hashes within a threshold distance as similar. In some embodiments, the distance can be a Hamming distance.

In some embodiments, authentication server 115 can be configured to identify damaged or partially obscured tags. For example, authentication server 115 can be configured to identify secure tag 105 in the received tag image by generating hashes of progressively smaller segments of the received tag image. These progressively smaller segments of the received tag image can be compares to hashes of corresponding segments of the known secure tag. Based on a degree of matching between these generated hashes and the corresponding hashes of the known secure tag, a damaged or partially obscured tag can be identified, even when a hash of an overall image of the damaged or partially obscured tag fails to match any stored hashes.

In step 903, consistent with disclosed embodiments, authentication server 115 can determine a tag identifier for the matched stored hashes. The tag identifier can be used to retrieve decoding rules for the tag.

After step 903, process 900 can proceed to step 905. In step 905 authentication system 115 can generate tag data using the received tag image and decoding rules. In some aspects, these decoding rules can be specific to tags generated using a particular stylesheet. For example, these decoding rules can identify the locations of tag data within the tag, specify default locations of tag features, specify correspondences between tag feature options and tag data values, and provide ratios (e.g. diameters of dots as ratios of overall diameters, widths of rim breaks as ratios of rim thicknesses, and the like) for identifying tag features and tag feature options.

In step 905 authentication system 115 can receive the decoding rules in response to a decoding request. In some aspects, the decoding request can be provided to private system 120 or another system. The decoding request can be provided using network 130. The decoding request can include an identifier for secure tag 105. The decoding request can include an authorization key (e.g., the authorization key received from client device 110). In some aspects, the decoding rules can be retrieved from private system 120 or another system.

In some, embodiments, the decoding rules can enable decoding of a subset of secure tag 105. The decoding rules can include or be based upon portions of the stylesheet used to generate secure tag 105. The decoding rules can correspond to the authorization key. For example, authentication system 115 can receive different decoding rules depending on the authorization key including the in decoding request. As an additional example, different rules can be provided in response to an authorization key associated with a manufacturer than in response to an authorization key associated with a retailer. Even though the secure tag can include the same information, the difference between the decoding rules means that different subsets of that information can be available to the manufacturer and the retailer.

In some embodiments, the decoding rules can enable iterative decoding of secure tag 105. For example, the decoding rules can include first decoding rules and second decoding rules. The first decoding rules can enable decoding of at least one of a first portion of the secure tag defined by the stylesheet or a first subset of tag features defined by the stylesheet. For example, the first decoding rules can enable decoding of first tag data in a reference portion of the secure tag. The second decoding rules can enable decoding of at least one of a second portion of the secure tag or a second subset of the tag features. For example, the second decoding rules can enable decoding of second tag data in a portion of the secure tag referenced by the first tag data encoded in the reference portion of the secure tag decoded using the first tag. Without the first tag data encoded in the reference portion, the second decoding rules cannot be used to decode the second tag data. Thus the first tag data can be generated using the first decoding rules and the second tag data can be generated using the first tag data and the second decoding rules.

In some embodiments, authentication system 115 can receive public decoding rules for decoding a public portion of a tag generated using the stylesheet. Such rules can specify how to decode non-sensitive information of general interest, such as stock keeping unit numbers (SKUs), brand names, expiration dates, and product names.

After step 905, process 900 can proceed to step 907. In step 907 authentication server 115 can be configured to provide the decoded tag data to client system 110 in response to the original tag identification. In some embodiments, authentication system 115 can be configured to provide the tag decoding rules in addition to or instead of the tag data. This can enable the client device to perform the tag decoding in place of authentication server 115 or in order to verify the decoding performed by authentication server 115. For example, in some embodiments, authentication server 115 can be configured to provide any public decoding rules for secure tag 105 stored by authentication server 115, or received from private system 120, to client device 110.

In some embodiments, authentication server 115 can be configured to track tag identification requests. For example, authentication server 115 can be configured to store tracking information including the identification request type, location, IP address, time of day, client device identification information, user identification information, transaction information, or the like. In some embodiments, authentication server 115 can be configured to store the tracking information in authentication database 205. In various embodiments, authentication server 115 can be configured to provide instructions to write this information to public database 130 (which may be a distributed database such as the Ethereum blockchain). For example, authentication server 115 can be configured to write the location of identification requests for secure tag 105 to bundle account 520 using oracle 510. In some embodiments, authentication server 115 can be configured to provide at least a portion of the tracking information in response to requests from client device 110, depending on one or more of the identity associated with the requests or the API key(s) provided with the request. In some embodiments, authentication server 115 can be configured to provide an address in public database 130 that client device 110 can use to retrieve the tracking information.

Figure 10:
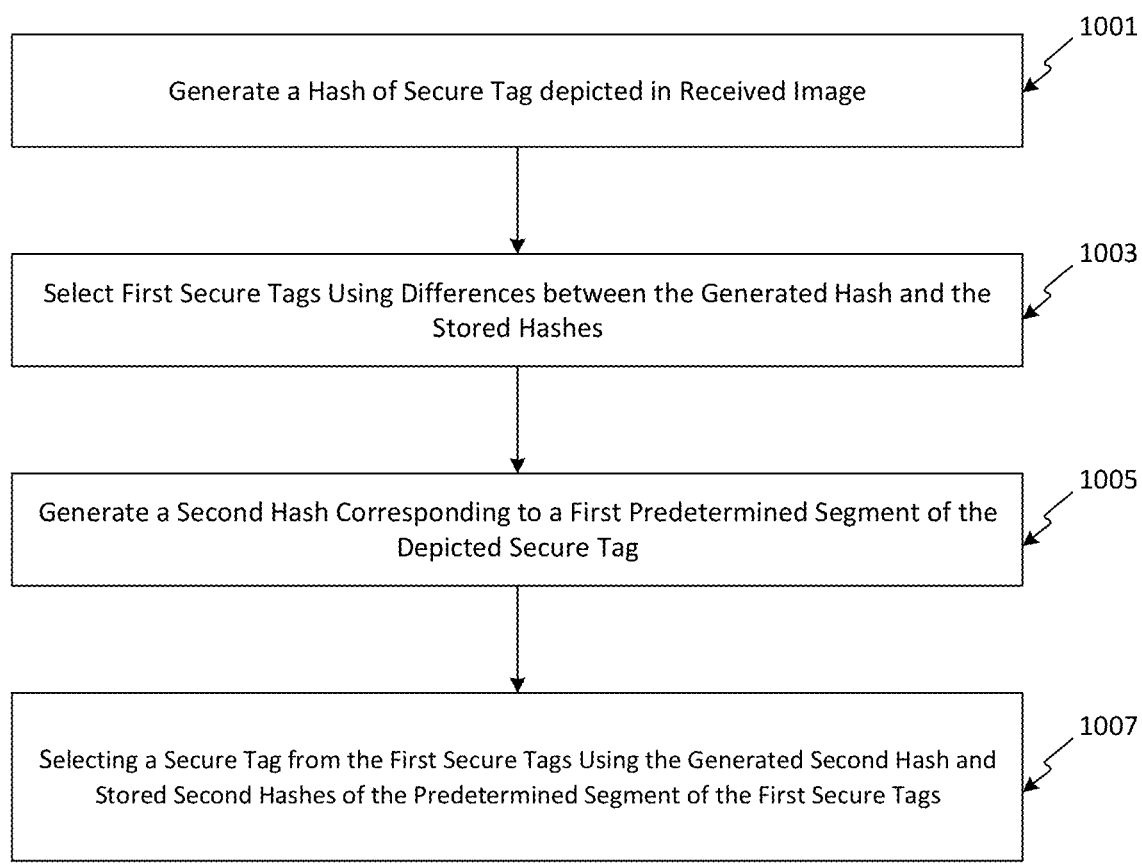
FIG. 10 depicts a flowchart illustrating an exemplary process of multi-resolution tag identification.

FIG. 10 depicts a flowchart illustrating an exemplary process 1000 of multi-resolution tag identification, consistent with disclosed embodiments. Though described below as performed by authentication server 115, process 1000 can be performed in some embodiments by private system 120, client system 110, or another system. Process 1000 can include the steps of generating a hash of an image of secure tag 105, selecting first secure tags based on the generated hash, generating a second hash corresponding to a predetermined segment of secure tag 105, and selecting a secure tag from the first secure tags as the secure tag matching secure tag 105. In this manner, process 1000 can enable authentication server 115 to identify secure tag 105 in an image when a hash of secure tag 105 in the image matches multiple stored hashes.

After starting, process 1000 can proceed to step 1001. In step 1001, authentication server 115 can generate a hash of a secure tag (e.g., secure tag 105) depicted in a received tag image. The hash can be a perceptual hash.

After step 1001, process 1000 can proceed to step 1003. In step 1003, authentication server 115 can select first secure tags using differences between the generated hash and stored hashes of the first secure tags. In some embodiments, the differences can be distances according to a metric, such as a Hamming distance. In some aspects, the stored hashes of the selected first secure tags can differ from the generated hash of the secure tag depicted in the receive tag image by less than a threshold amount.

After step 1003, process 1000 can proceed to step 1005. In step 1005, authentication server 115 can generate a second hash of a predetermined segment of secure tag 105 depicted in the received tag image. For example, authentication server 115 can be configured to generate a hash of one or more quadrants of the secure tag.

Authentication server 115 can be configured to prompt client device 110 for a second image, consistent with disclosed embodiments. For example, authentication server 115 can be configured to provide instructions to display a banding box or similar indication around the predetermined segment of secure tag 105. In response to this indication, a user can interact with the client device to obtain a second image depicting the predetermined segment of secure tag 105.

Authentication server 115 can be configured to receive this second image from client device 110. While the first received image can depict at least some of secure tag 105 as a whole in a first level of detail, the second received image can depict the predetermined segment of secure tag 105 in a second level of detail greater than the first level of detail. For example, the first and second images can include the same number of pixels, but the camera of client device 110 can be closer to the predetermined segment of secure tag 105 when taking the second image than when taking the first image.

After step 1005, process 1000 can proceed to step 1007. In step 1007, authentication server 115 can be configured to select a particular secure tag from the previously selected first secure tags. Authentication server 115 can be configured to refine the selection of a matching secure tag using differences between the second hash generated in step 1005 and stored second hashes of the predetermined portion of the images of the first secure tags. For example, while the first hash generated in step 1001 may broadly match the stored hashes of the first secure tags, the second hash generated in step 1005 may only match one of the stored second hashes (e.g., only the second hash generated in step 1005 and one of the stored second hashes may differ by less than a threshold amount). Should more than one of the stored second hashes sufficiently match the second hash generated in step 1005, authentication server 115 can be configured to repeat this comparison process with another predetermined segment of secure hash 105 (e.g., a sub-segment of the quadrant chosen in step 1005, or another quadrant of secure tag 105).

Figure 11:
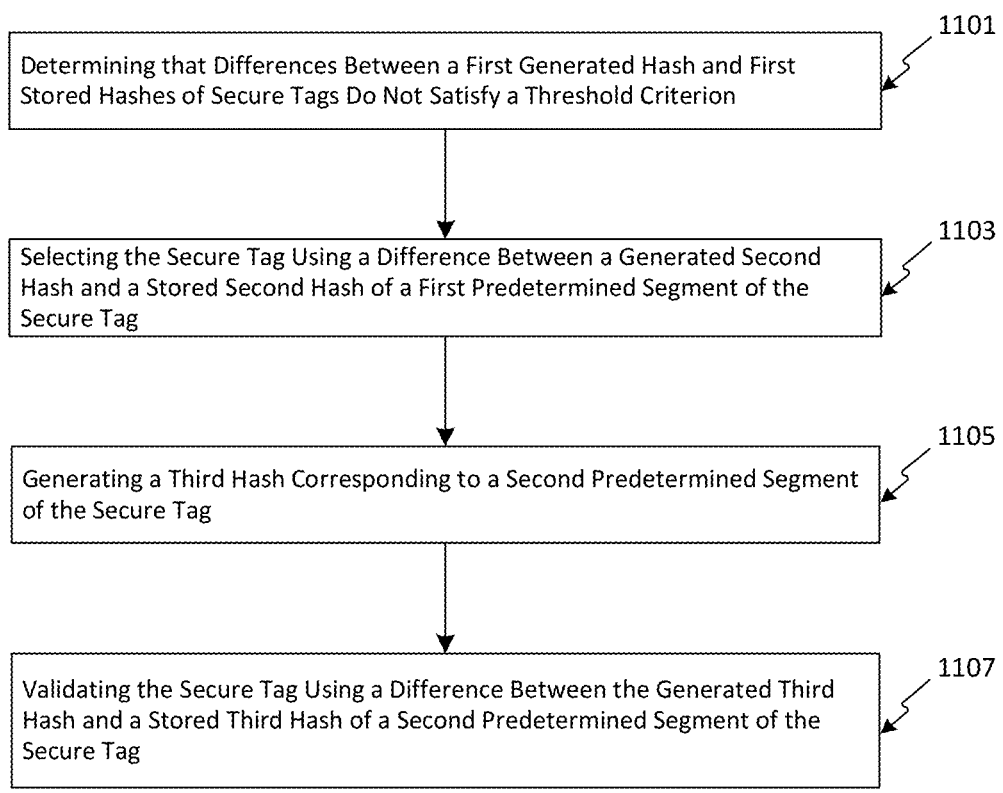
FIG. 11 depicts a flowchart illustrating an exemplary process of multi-resolution tag identification with altered tags.

FIG. 11 depicts a flowchart illustrating an exemplary process 1100 of multi-resolution tag identification with altered tags. Though described below as performed by authentication server 115, process 1100 can be performed in some embodiments by private system 120, client system 110, or another system. Consistent with disclosed embodiments, process 1100 can include comparing a hash of the secure tag depicted in a received tag image to stored hashes of secure tag images. When the hash of the secure tag depicted in a received tag image fails to match any of the stored hashes to within a predetermined degree of difference, authentication server 115 can be configured to compare a hash of a predetermined segment of the secure tag depicted in the received tag image to stored hashes of corresponding segments of secure tags. Authentication server 115 can be configured to identify a potentially matching secure tag based on this second comparison. The authentication server 115 can be configured to compare a hash of another predetermined segment of the secure tag depicted in the received tag image to a stored hash of a corresponding segment of the identified potentially matching secure tag. Should these additional hashes match to within a predetermined degree of difference, authentication server 115 can be configured to confirm the identification of the matching secure tag as the secure tag depicted in the received tag image. Thus, according to process 110, authentication server 115 can be configured to search authentication database 205 for hashes matching portions of the secure tag depicted in the received image. In this manner, authentication server 115 can be configured to match incomplete or damaged secure tags.

After starting, process 1100 can proceed to step 1101. In step 1101, authentication server 115 can determine that differences between a first generated hash and first stored hashes of secure tags do not satisfy a threshold criterion. The first generated hash can be of a secure tag (e.g., secure tag 105) depicted in a received image. The first stored hashes can be of secure tags in authentication database 205. The difference can be a distance, calculated according to a metric (e.g., a Hamming distance).

After step 1101, process 1100 can proceed to step 1103. In step 1103, authentication server 115 can be configured to select one of the secure tags in authentication database 205 based on a comparison between a generated second hash of the secure tag depicted in the received image (e.g., secure tag 105) and a stored second hash. The generated second hash can be a hash of a segment of the secure tag depicted in the received image (or another image of the same secure tag). The stored second hash can be a hash stored in authentication database 205 of a segment of a potentially matching secure tag. The segment of the potentially matching secure tag can be the same as the segment of the secure tag depicted in the received image.

After step 1103, process 1100 can proceed to step 1105. In step 1105, authentication server 115 can be configured to generate a hash of a second segment of the secure tag depicted in the originally received image. In some embodiments, authentication server 115 can be configured to prompt client device 110 for another image. For example, authentication server 115 can be configured to provide instructions to display a banding box or similar indication around the segment of secure tag 105. In response to this indication, a user can interact with client device 110 to obtain a second image depicting the desired segment of secure tag 105.

In some embodiments, the second segment can be distinct from the first segment. For example, when the first segment is a top right quadrant of the secure tag, the second segment can be a top left quadrant of the secure tag. In various embodiments, the second segment can overlap the first segment. For example, the second segment can fall wholly or partially within the first segment. For example, the second segment can be the lower left quadrant of the first segment.

After step 1105, process 1100 can proceed to step 1107. In step 1107, authentication server 115 can be configured to validate the potentially matching secure tag identified in step 1103. Authentication server 115 can be configured to validate the potentially matching secure tag using a difference between the generated third hash and a stored third hash. The stored third hash can be of a segment of the potentially matching secure tag. The segment can correspond to the segment used to generate the third hash. Authentication server 115 can determine that the difference between the third generated hash and this stored hash satisfies a threshold criterion. The difference can be a distance, calculated according to a metric (e.g., a Hamming distance).

Consistent with disclosed embodiments, processes 1000 and 1100 can include determining (i) an overall distance using the segment distances, and/or (ii) a count of segment distances satisfies a threshold criterion. For example, authentication server 115 can compare multiple hashes of images of segments of secure tag 105 to corresponding stored hashes of segments of the secure tag. The comparison can include determining a distance between each hash of an image of a segment of secure tag 105 and the corresponding stored hash of a segment of the secure tag. The comparison can include determining an overall distance based on these individual distances, such as an average distance. The comparison can also include determining a count of the individual distances satisfying a threshold criterion (e.g., falling within a certain maximum distance). In some embodiments, authentication server 115 can be configured to determine a confidence value using at least one of a number of the hashes compared, the count of the individual distances satisfying the threshold criterion, or the individual or overall distances.

Figure 12:
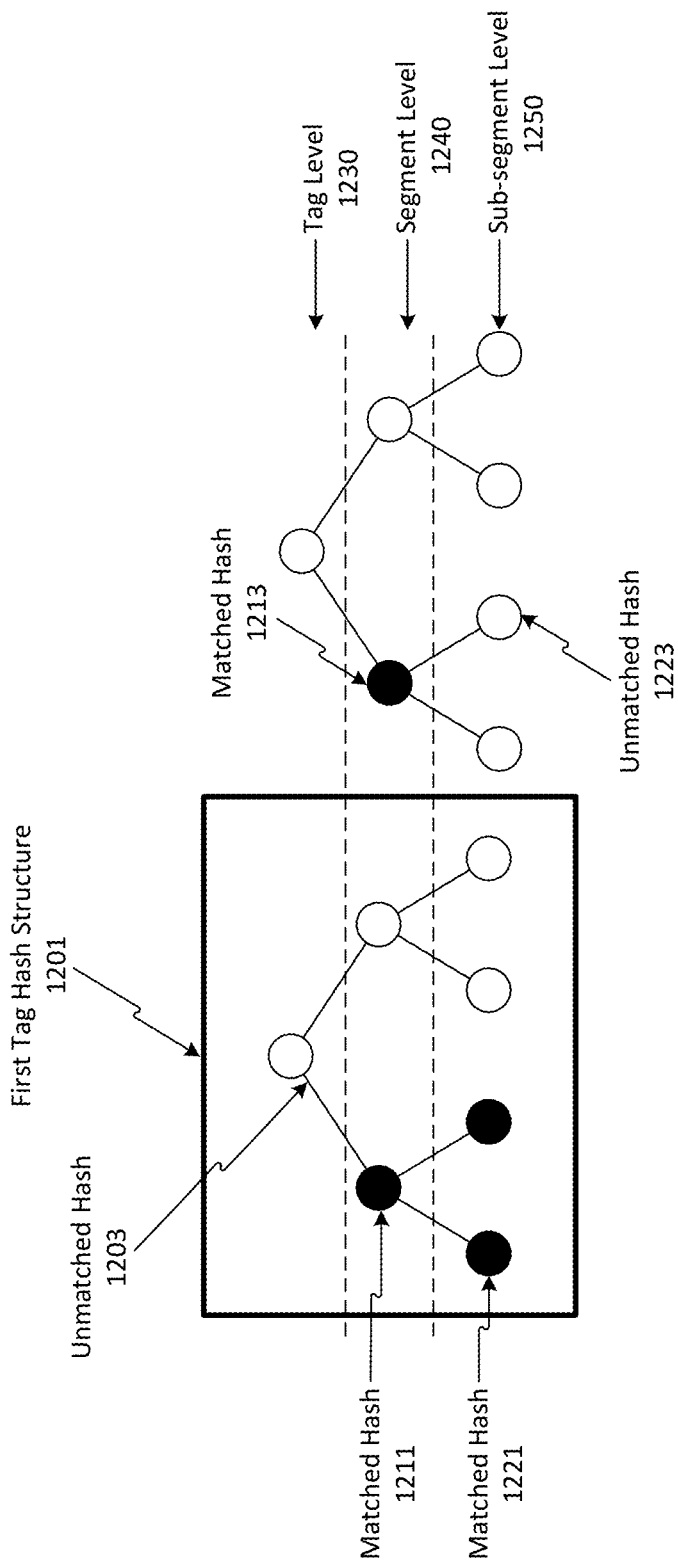
FIG. 12 depicts a flowchart illustrating an exemplary data structure for performing multi-resolution tag identification.

FIG. 12 depicts a schematic of a logical database structure for performing multi-resolution tag identification. Authentication database 205 can be configured with the schema depicted in FIG. 12, in some embodiments. Authentication database 1205 can be configured to store hashes generated using secure tags. These hashes can be generated by private system 120 during the tag creation process, as described above with regards to FIG. 6. In some aspects, authentication database 205 can be configured to store hashes concerning a first secure tag in a data structure 1201. Authentication database 205 can be configured to store hashes corresponding to multiple levels of detail. In some aspects, tag level 1230 can include hashes computed over entire secure tags. At this level of detail, small tag feature options used to encode data may not be identifiable (due to the resolution of the scanner or image processing losses). Thus a hash computed over an image depicting an entire tag may not match with any of the hashes stored in authentication database, or may match with multiple hashes. In various aspects, tag level 1240 can include hashes computed over a segment of the overall tag (e.g., quadrant of the overall secure tag). At this level of detail, small tag feature options used to encode data may be identifiable. Furthermore, damage to one segment of a tag may not affect another segment of the tag. Therefore, while a hash computed over the entire damaged tag may not match (e.g., unmatched hash 1203), a hash computed over an undamaged segment of the tag may still match (e.g., matched hash 1211). In various aspects, tag level 1250 can include hashes computed over a sub-segment of the overall tag (e.g., a quadrant of a quadrant of the overall secure tag). Because additional segments of other tags may match (e.g., matched hash 1213), authentication server 115 can be configured to check additional hashes (e.g., matched hash 1221, unmatched hash 1223). By checking these additional hatches, authentication server 115 can confirm that the secure tag corresponding to the hashes of first tag hash structure 1201 is the secure tag depicted in the received image. In some embodiments, authentication server 115 can be configured to generate a score based on the number of hashes checked, the number of hashes matching according to a similarity criterion, and the degree of matching. This score can be used to identify the secure tag matching the secure tag depicting in the image received from client device 110. As would be appreciated by one of skill in the art, the depicted tree structure is not intended to be limiting. Other data structures could be used to store hashes and related information, such as an associative array or map keyed to the stored hashing and including identifiers for the secure tags.

Figure 13:
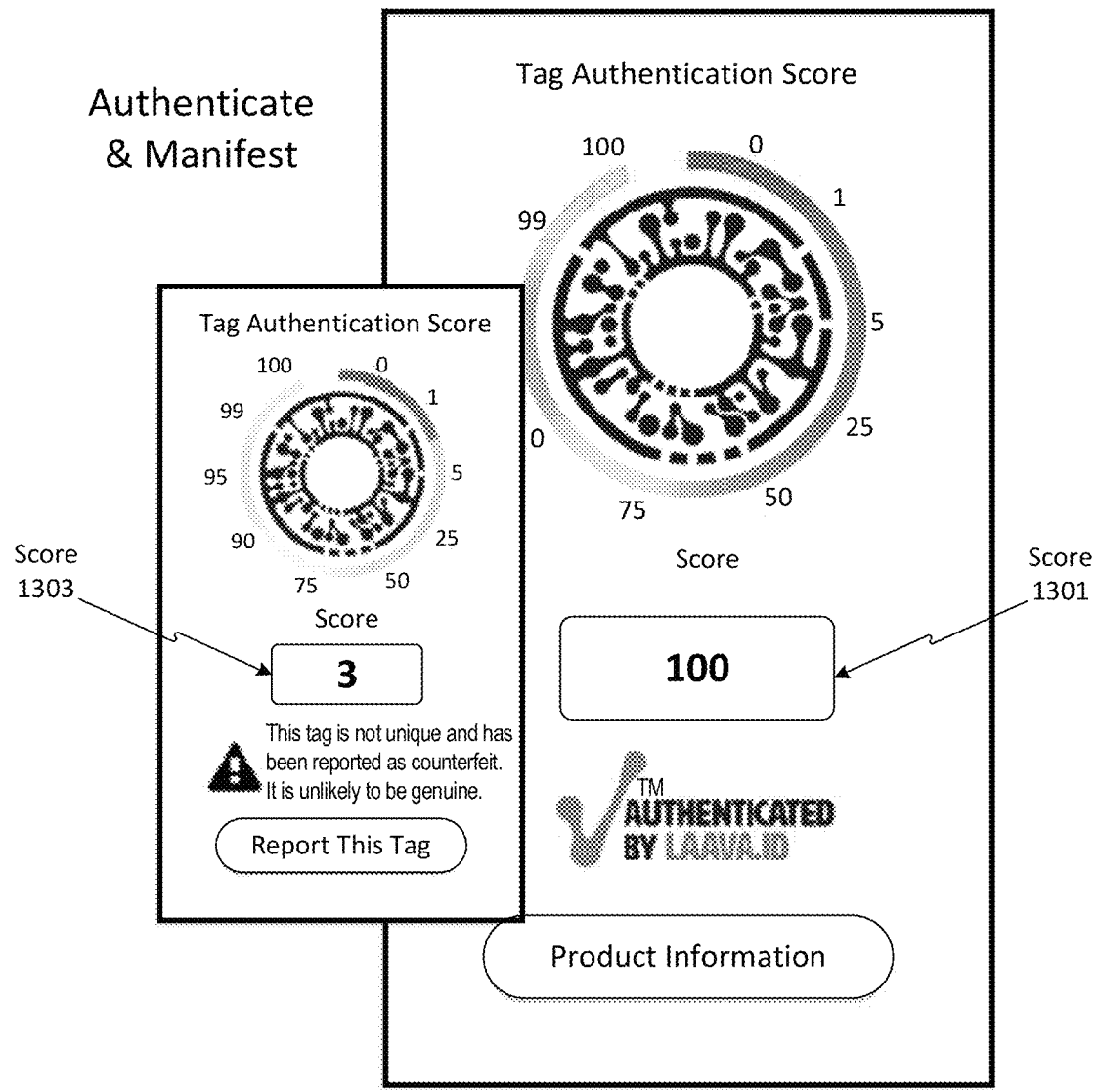
FIG. 13 depicts an exemplary user interface depicting results of tag identification.

FIG. 13 depicts an exemplary user interface for evaluating the authenticity of a tag. A reading device can have an app that is able to display the determined level of authenticity of a tag. The authenticity can be determined using the systems and methods disclosed herein. When a secure tag is scanned, the scanned tag image is sent to the authentication server. The authenticity of the tag can be determined using the hashing method described in FIGS. 10-12. When the tag is authenticated, information about the tag is returned, including the number of scans, any reports, etc. In certain aspects, the authentication server can determine a probability of authenticity based on the hashing process. In other aspects, the authentication server can determine the authenticity of the secure tag based on the tag history stored in the blockchain.

In some embodiments, the app to determine the level of authenticity of a tag can return an "authentication score." In certain aspects, a perfect score 1301 can be returned. This can occur when, for example, the secure tag is in good condition and the reading device is able to get a good scan of the secure tag. In addition, perfect score 1301 can be returned when the authentication server determines that the secure tag has not been scanned before or if the tag history in the blockchain indicates the product is not a counterfeit. In other aspects, a low score 1303 can be returned. This can occur when the secure tag is in poor condition or the reader cannot get a good scan of the secure tag. In addition, low score 1303 can be returned when the authentication server determines that the same tag has been identified as being potentially counterfeit. For example, if the tag has been scanned numerous times in multiple locations, low score 1303 will be returned as the authentication score. In another example, if the tag has been reported as counterfeit, low score 1303 will be returned as the authentication score.

In some embodiments, a user can report a tag through the exemplary user interface shown in FIG. 13. For example, when low score 1303 is returned indicating that the tag has been scanned on numerous occasions and is not unique, the user can report the tag so that the owner of the tag becomes aware of the possible counterfeit. In other embodiments, a user can look at product information through the app. For example, when high score 1301 is returned, the user can then review the product information.

Figure 14:
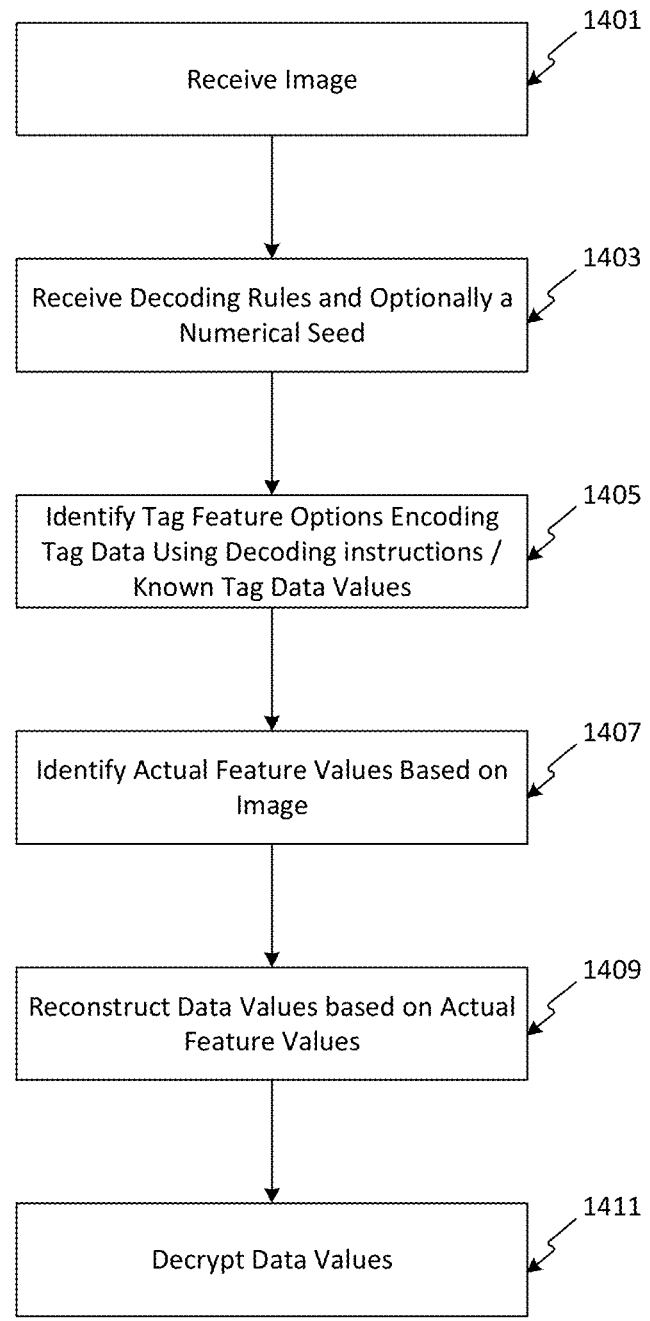
FIG. 14 depicts an exemplary process for decoding tag feature selections.

FIG. 14 depicts an exemplary process for decoding tag feature selections. Though described below as performed by authentication server 115, process 1400 can be performed in some embodiments by private system 120, client system 110, or another system. Process 1400 can include the steps of receiving an image, receiving decoding rules and a numerical seed, identifying possible features using a known stylesheet and/or known data values, identifying actual features based on the received image, reconstructing data values, and decrypting data values. In this manner, authentication server 115 can be configured to decode data stored in a secure tag using information received from both client device 110 and private system 120. In some embodiments, authentication server 115 does not store the image, decoding rules, a numerical seed. In this manner, the arrangement of functionality of system 100 ensures that an attacker compromising authentication server 115 would not be able to decode the contents the secure tags managed by authentication server 115.

After starting, process 1400 can proceed to step 1401. In step 1401, authentication server 115 can be configured to receive an image. The image can be a raster image or a vector graphics image. The image can be received from client device 110, or another system. Authentication server 115 can be configured to convert the image to a vector graphics image, when the image is a raster image.

After step 1401, process 1400 can proceed to step 1403. In step 1401, authentication server 115 can receive decoding instructions. In some embodiments, authentication server 115 can be configured to receive decoding instructions from private system 120. The decoding instructions can be received in response to a request from authentication server 115 to private system 120. The request can include an application key and the decoding instructions received can depend on the application key provided.

In some embodiments, private system 120 can be configured to convert the stylesheet and numeric seed used to generate the secure tag into decoding instructions that directly describe correspondences between tag features present in the vector graphics image and tag data values. For example, the decoding instructions can specify a set of tag feature options and a mapping from the values of these tag feature options to the values of an item of tag data. In such embodiments, private system 120 may not provide private portions of the stylesheet or the numerical seed to authentication server 115. In some embodiments, authentication server 115 can be configured to receive at least some of the private portions of the stylesheet using to generate the tag together with a numerical seed used to generate a secure tag layout for the secure tag. In such embodiments, authentication server 115 can be configured to generate the correspondences between tag features present in the vector graphics image and tag data values.

After step 1403, process 1400 can proceed to step 1405. In step 1405, authentication server 115 can identify possible features using the decoding instructions and known tag data values. For example, authentication server 115 can be configured to locate tag features described in the decoding instructions. In some instances, locating the tag features can depend on known tag data values. For example, a secure tag may encode an 8-bit binary number into the size of dots in the secure tag. The decoding instructions can indicate the correspondence between the size of the dots and the values of the specific 8-bit binary number. But the decoding instructions may not specify which portion of the secure tag contains the relevant dots. Another portion of the secure tag can include a reference usable to identify the portion of the tag encoding the tag features (the dots) having tag feature options (dot sizes) that encode specific values of the tag data.

After step 1405, process 1400 can proceed to step 1407. In step 1407, authentication server 115 can identify actual tag feature option values based on the received image. In some embodiments, when the image file is a vector graphics file, authentication server 115 can read the feature option values from the vector graphics file. If necessary, authentication server 115 can first convert the received image to a vector graphics file. Alternatively, authentication server 115 can use functions provided by OpenCV or the like to determine tag feature option values (e.g., relative dot sizes, the presence or absence of a feature at a location) from a raster image directly.

After step 1407, process 1400 can proceed to step 1409. In step 1409, authentication server 115 can reconstruct tag data values based on actual feature values. For example, have determined the values of the tag feature options for the relevant tag features, authentication server 115 can be configured to convert these tag feature option values to tag data according to the decoding rules received from private system 120.

After step 1409, process 1400 can proceed to optional step 1411. In optional step 1411, authentication server 115 can decrypt the tag data. In some embodiments, authentication server 115 can be configured to used key material encoded into the secure tag to decrypt encrypted tag data.

Figure 15:
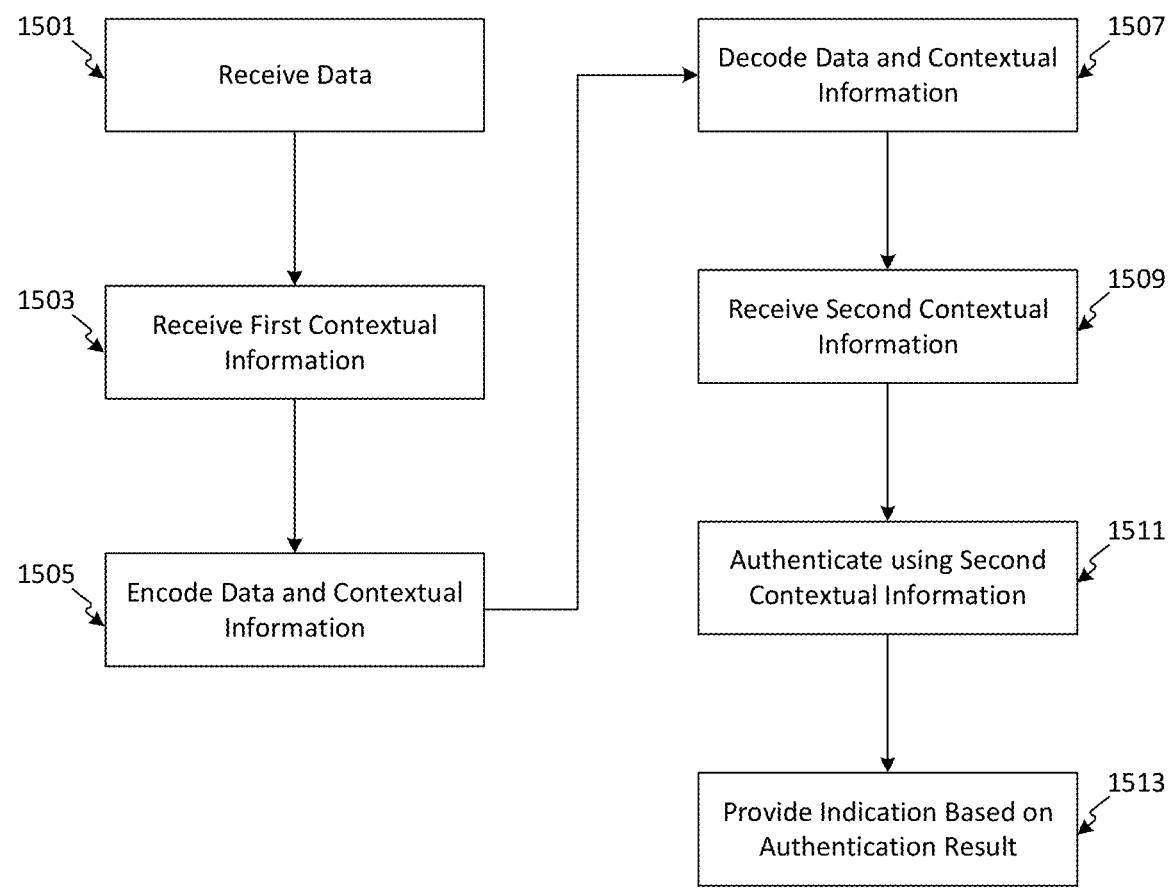
FIG. 15 depicts an exemplary authentication process using contextual information.

FIG. 15 depicts an exemplary authentication process using contextual information. Though described below as performed by private system 120 and authentication server 115, process 1500 can be performed in some embodiments entirely by private system 120 or by authentication server 115, or by client system 110 or another system. According to process 1500, private system 120 can encode contextual data into a secure tag. Authentication server 115 can then enforce contextual conditions concerning the encoded data in responding to an identification request.

After starting, process 1500 can proceed to step 1501. In step 1501, private system 120 can receive tag data. As previously described, this tag data can be received from another system, a memory of private system 120, or a user.

After step 1501, process 1500 can proceed to step 1503, in step 1503, private system 120 can receive contextual information. In some embodiments, this contextual information can include at least one of an authentication credential (e.g., a password, authentication token, or the like), a biometric identifier (e.g., a fingerprint, voiceprint, or the like), a sound file, a tag identifier (e.g., a tag identifier of another secure tag), or a perceptual hash of an image. For example, the secure tag can produced to label an item (e.g., a user identification card, a piece of meat, a bottle of wine, an item owned by an individual) and the image can depict a portion of the item (e.g., the identification photo on the identification card, the grain of the meat, the label of the bottle of wine, the face of the individual that owns the item).

After step 1503, process 1500 can proceed to step 1505. In step 1505, private system 120 can encode the tag data and the contextual information into the secure tag. As described in this application, the tag data and the contextual information can be encoded into the secure tag as a selection of tag feature options, with the available tag feature options dependent on a numeric seed.

After step 1505, process 1500 can proceed to step 1507. In step 1505, authentication system 115 can receive an identification request concerning the secure tag. As described in this application, the authentication server can be configured to identify the tag using one or more hashes of the secure tag. Authentication server 115 can be configured to request decoding instructions from private system 120. Authentication server 115 can be configured to decode the stored contextual information using the decoding instructions.

After step 1507, process 1500 can proceed to step 1509. In step 1509, authentication system 115 can receive additional contextual information. This additional contextual information can be received from client device 110 or another device. The additional contextual information can be received in response to a request provided by authentication system 115. For example, authentication system 115 can provide instructions to client device 110 for display to a user of client device 110 (e.g., instructions to display on a user interface of client device 110 the text "To unlock Laava tag take picture of owner's face").

After step 1509, process 1500 can proceed to step 1511. In step 1511, authentication system 115 can authenticate the identification request using the additional contextual information. In some embodiments, authentication system 115 can be configured to determining that the received additional contextual information and the decoded contextual information satisfy a similarity criterion. For example, authentication system 115 can be configured to compare the decoded contextual information to the received contextual information. When the contextual information is a perceptual hash of an image (e.g., a perceptual hash of another tag, or of an owner of the label item, or of a portion of the labeled item) authentication system 115 can be configured to determine a distance between the received additional contextual information and the decoded contextual information. In some aspects, this distance can be a hamming distance (or a similar metric).

After step 1511, process 1500 can proceed to step 1513. In step 1513, authentication system 115 can provide an indication based on the result of the authentication performed in step 1511. Should the additional contextual information and the decoded contextual information not satisfy the similarity criterion, authentication system 115 can provide an indication of an authentication failure to client device 110. Should the additional contextual information and the decoded contextual information satisfy the similarity criterion, authentication system 115 can provide an indication of successful authentication to client device 110. In some embodiments, the indication of successful authentication can include at least some of the tag data received in step 1501. In various embodiments, the indication of successful authentication can include decoding instructions for at least some of the tag data received in step 1501. In various embodiments, the indication of successful authentication can include status information retrieved from a distributed database. This status information can be retrieved from the distributed database using an oracle (e.g., the distributed database can be the Ethereum blockchain).

Figure 16A:
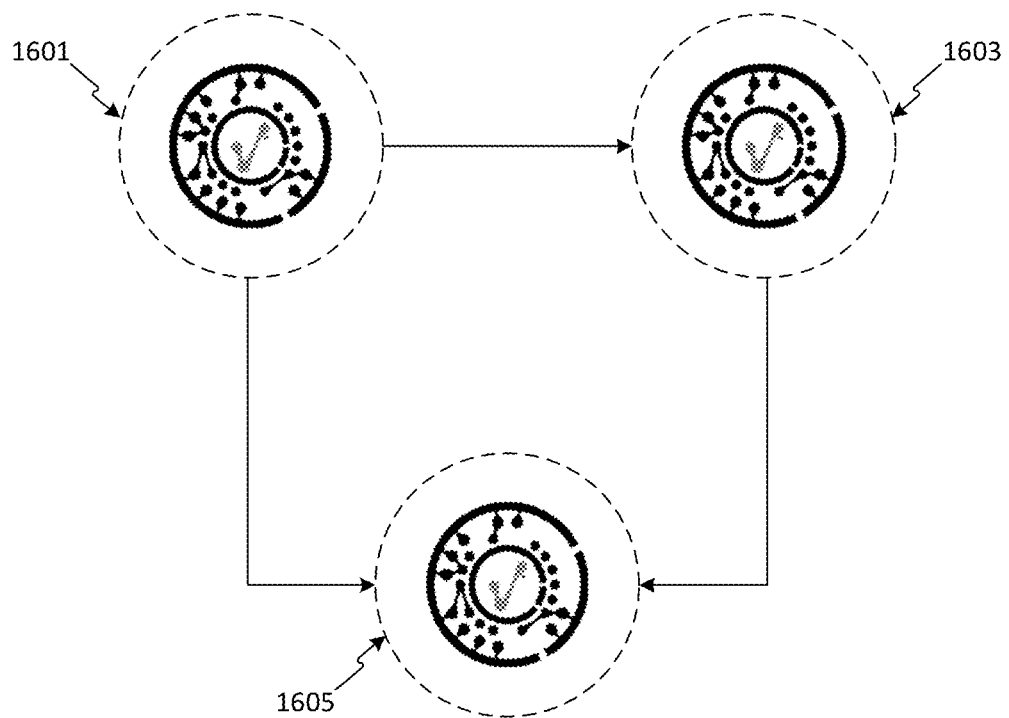
FIG. 16A depict paired and sequenced secure tags.

FIG. 16A depicts paired and sequenced secure tags. Secure tags can have relationships with other tags to increase the level of security and authenticity. For example, a first secure tag 1601 and a second secure tag 1603 can be paired. First secure tag 1601 and second secure tag 1603 can then both be required to be scanned for a user to get information about the products or to transfer ownership of the products. For example, first secure tag 1601 can be generated and placed on one shoe in a pair of shoes, and second secure tag 1603 can be generated and placed on the second show in the same pair of shoes. In this example, both tags are unique and identify the specific shoe in the pair, however both tags are required to be read to authenticate the pair of shoes and/or transfer ownership.

In some embodiments, paired tags can further be sequenced to create a sequenced tag 1605. Sequenced tag 1605 is a combination of first secure tag 1601 and second secure tag 1603, and provides information about the paired tags. In certain aspects, sequenced tag 1605 can be the only tag available to be scanned prior to purchase or transfer of ownership. In these aspects, sequenced tag 1605 can provide authentication of the product and basic information about the product. Sequenced tag 1605 can also indicate which paired tags should be present. By way of the previous example, when a pair of shoes contains paired tags, the tags can be sequenced to create sequenced tag 1605. Sequenced tag 1605 can be placed on the outside of the shoebox, providing information about the shoes inside the box. Once opened, first secure tag 1601 and second secure tag 1603 can be scanned to check that the correct shoes are in the box.

Figure 16B:
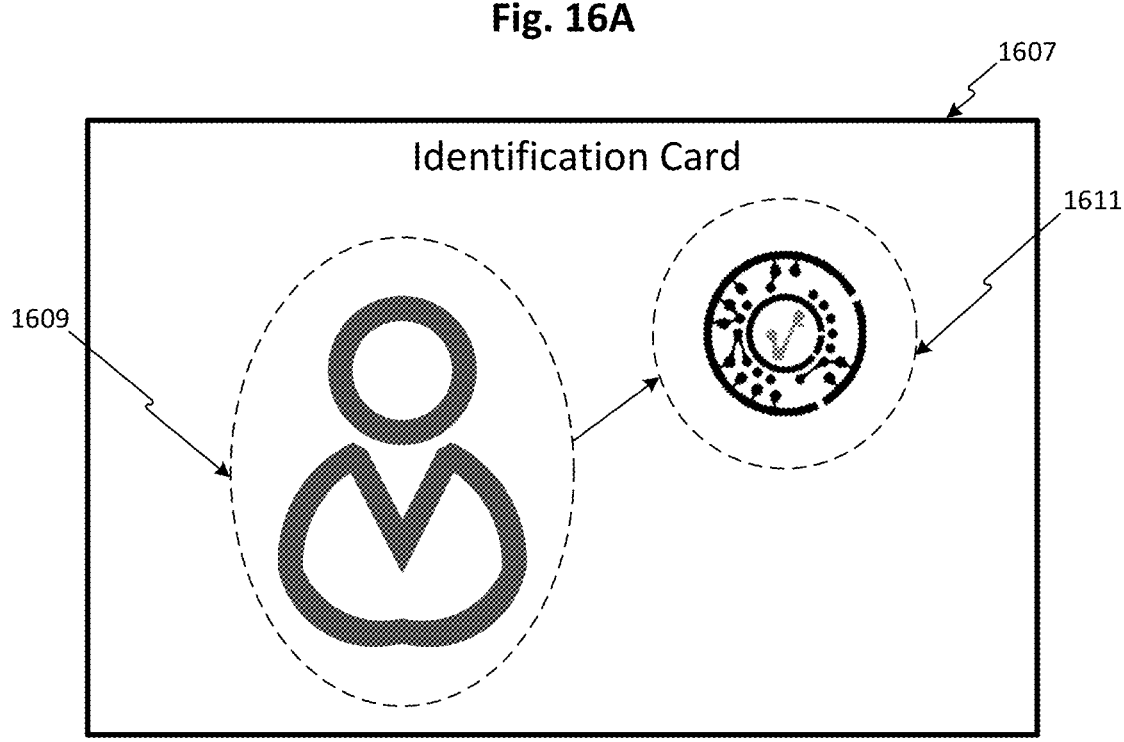
FIG. 16B depict a secure tag paired to contextual information.

FIG. 16B depicts an identification card 1607 using proximity fingerprinting. In addition to having relationships with other secure tags, a secure tag 1611 can have a relationship with an external image, such as facial fingerprint 1609. Identification card 1607 can have an additional level of authenticity by combining secure tag 1611 with facial fingerprint 1609. Proximity fingerprinting works by using objects in proximity to secure tag 1609 to further authenticate a tag. In some embodiments, this can prevent a situation where a secure tag is copied from being authenticated somewhere else. For example, if secure tag 1611 is copied from identification card 1607, it will still not be verified without facial fingerprint 1609. The result is a combined secured ID in the form of identification card 1607. In some embodiments, secure tag 1611 is paired with facial fingerprint 1609, meaning both secure tag 1611 and facial fingerprint 1609 must be presented together for authentication.

In some embodiments, identification card 1607 can be used to present proof of identification in the appropriate situation. For example, a police officer can require a citizen to present identification card 1607 to ensure the person is who they claim to be at the point of encounter. In other embodiments, establishments that server alcohol can require a person to present identification card 1607 to ensure the person is not using a fake driver's license or proof of age card.

Figure 22:
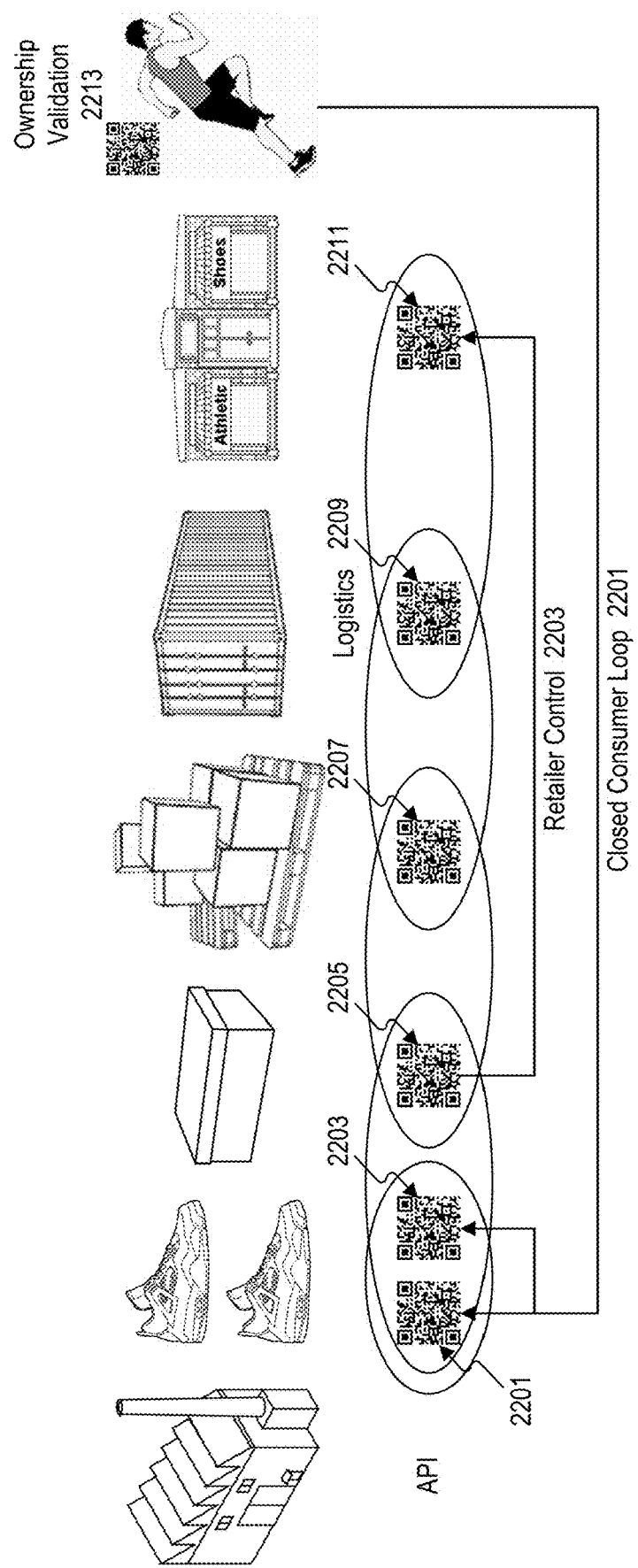
FIG. 22 depicts an exemplary process for inventory management using paired tags.

FIG. 22 depicts paired tags throughout the supply chain. When a manufacturer makes a product, it can create a first secure tag 2201 and a second secure tag 2203, pair the secure tags, and affix the secure tags to the products. The paired tags can then be sequenced and updated in the blockchain throughout the supply chain process. For example, the sequenced tag can contain information about the paired product itself 2205, about the specific pallet the paired product was shipped on 2207, the overall shipment the paired product was sent in 2209, and information about the retailer 2211. At each stage in the supply chain process the blockchain is updated with information about the paired product. When a customer goes to the retailer to purchase the product, he can carry out ownership validation 2213 of the sequenced tag.

In some embodiments, the retailer control 2215 and closed consumer loop 2217 can have access to different levels of information. For example, closed consumer loop 2215 can have access to only information about the paired tags themselves. This can include information about the product itself and the manufacturer. Closed consumer loop 2215 allows the consumer to verify the authenticity of the paired tags. In this example, retailer control 2215 can include the ability to access information about the entire supply chain process. Retailer control 2215 can include access to individual packaging information 2205, pallet information 2207, shipment information 2209, and retailer information 2211. Retailer control 2215 will typically not include access to the paired tags themselves. Retailer control 2215 allows the retailer to track shipment information and manage logistics.

FIG. 17 depicts an exemplary two-part label. The two-part label can include a base tag 1710 and an overlay 1720. Base tag 1710 can include a substrate labeled with a first secure tag that encodes first tag data as a selection of potential first secure data feature options. Overlay 1720 can be detachably adhered to the substrate containing base tag 1710. Overlay 1720 can include a transparent portion 1721 and an opaque portion 1723. Both transparent portion 1721 and opaque portion 1723 can be aligned with the first secure tag. The first secure tag located on base tag 1710 can be unaffected by aligned transparent portion 1721. Aligned opaque portion 1723 and the first secure tag located on base tag 1710 can encode second tag data as a selection of potential second secure tag feature options.

In some embodiments, the potential first secure tag feature options on base tag 1710 are different from the potential second secure tag features options created by opaque portion 1723 and base tag 1710. In other embodiments, aligned opaque portion 1723 can obscure selected first secure tag features on base tag 1710. In other embodiments still, aligned opaque portion 1723 can select potential first secure tag feature options on base tag 1710. In other embodiments still, the potential first secure tag feature options on base tag 1710 can include the presence or absence of tag features at positions specified by a first secure tag layout. In these embodiments, the potential second secure tag feature options created by aligned opaque portion 1723 can include the presence or absence of tag features at positions specified by a second secure tag.

The two-part label depicted in FIG. 17 can be generating by first generating a first secure tag that encodes first tag data as a selection of potential first secure tag feature options using the first tag data, a first numeric seed, and a first stylesheet. Next, the method generates a second secure tag that encodes second tag data as a selection of potential second secure tag feature options using the second tag data, a second numeric seed, and a second stylesheet. The method then determines a difference image between the first secure tag and the second secure tag and labels a substrate with the first secure tag to create base tag 1710. The method then detachably adheres overlay 1720 to base tag 1710, overlay 1720 being labelled with the difference image and aligned with the first secure tag.

In some embodiments, overlay 1720 obscures portions of the first secure tag located on base tag 1710 by way of opaque portion 1723 absent from the second secure tag. In other embodiments, overlay 1720 depicts portions of the second secure tag absent from the first secure tag. In other embodiments still, overlay 1720 transmits portions of the second secure tag present in the first secure tag located on base tag 1710 by way of transparent portion 1721. In other embodiments still, the first stylesheet used to generate the first secure tag can be different from the second stylesheet used to generate the second secure tag. In other embodiments still, the substrate in which base tag 1710 is labeled on and overlay 1720 is adhered to can include a consumer good.

For example, a two-part labeled can be used for additional authentication and security of products. A two-part label can be placed on the outside of a box being sold, said two-part label containing base tag 1710 and overlay 1720. Overlay 1720 contains both transparent portion 1721 and opaque portion 1723, such that the tag has a unique look different from base tag 1710. In this example, the customer or retailer can scan the second tag created by overlay 1720 to reveal certain information about the product. After the product is purchased and/or ownership is transferred, overlay 1720 can be removed revealing base tag 1710. The now-owner can scan base tag 1710 to reveal information completely different from the information provided by the combination of overlay 1720 and base tag 1710. The two-part label adds an additional layer of security without adding to the complexity of the secure tag itself.

Figure 18:
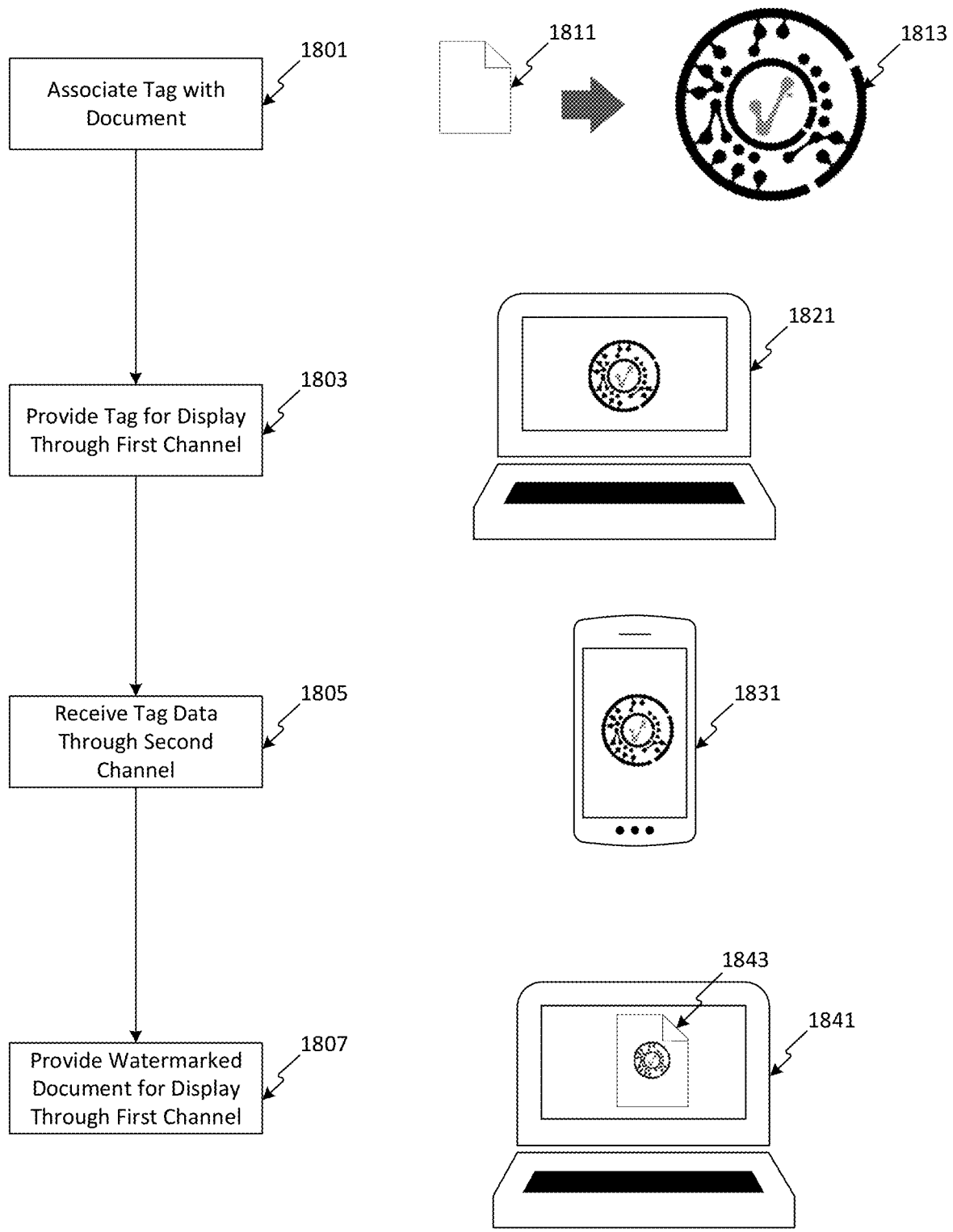
FIG. 18 depicts an exemplary process for multi-channel document authentication using secure tags.

FIG. 18 is a flowchart of exemplary method 1800 for providing documents using secure tags. Method 1800 begins at step 1801, where the method associates a first secure tag 1813 with a document 1811. First secure tag 1813 can be generated and paired to document 1811. In addition, first secure tag 1813 has an identifier of document 1811 encoded into it using a selection of potential feature options. In some embodiments, the identifier of document 1811 can include a hash of document 1811. In other embodiments, document 1811 is encrypted to the blockchain. The method can receive a request from a first device 1821 to access document 1811. First device 1821 can be a mobile device (e.g. tablet, smartphone, etc.), a desktop computer, a laptop, a server, a wearable device (eyeglasses, a watch, etc.), and/or device dedicated hardware device. Following the request for access to document 1811, method 1800 moves to step 1803.

At step 1803, the method provides first secure tag 1811 through first user device 1821 for display. At step 1805, the method can receive confirmation of the request through a second device 1831, which includes a secure tag image. Second device 1831 can be a mobile device (e.g. tablet, smartphone, etc.), a desktop computer, a laptop, a server, a wearable device (eyeglasses, a watch, etc.), and/or device dedicated hardware device. The method can then compare first secure tag image 1813 to the secure tag image received from second device 1831. If the comparison reveals a match between first secure image 1813 and the secure tag image received from second device 1831, then method 1800 will move to step 1807.

At step 1807, the method provides document 1811 to first device 1821 for display. In some embodiments, document 1811 can be watermarked with a secure tag to create a watermarked document 1843. Watermarked document 1843 can have a new secure tag or can be watermarked with first secure tag 1813. In other embodiments, first device 1821 can become am authorized user device 1841. In some embodiments, authorized user device 1841 can access watermarked document 1843 for a predetermined period of time. When the predetermined period of time has finished, authorized user device 1841 loses its authorization to view watermarked document 1843. In other embodiments, watermarked document 1843 cannot be accessed by any device after it has been marked as read. In other embodiments still, watermarked document 1843 can be read by a second authorized user device after authorized user device 1841 has marked the document as read.

In some embodiments, comparing first secure tag 1813 and the secure tag image received from second user device 1831 can include generating a perceptual has of first secure tag 1813, generating a perception hash of the secure tag image received from second user device 1831, and determining if a difference between the stored perceptual hash and the generated perceptual hash satisfies a threshold criterion. In other embodiments, comparing first secure tag 1813 and the secure tag image received from second user device 1831 can include generating a perceptual hash of the secure tag image received from second user device 1831, selecting first secure tags using differences between the generated perceptual hash and stored perceptual hashes of images of the first secure tags, generating a second perceptual hash of a predetermined segment of the secure tag image received from second user device 1831, and selecting first secure tag 1813 from the first secure tags using differences between the generated second perceptual hash and stored second perceptual hashes of the predetermined portion of the images of the first secure tags.

In some embodiments, the confirmation request at step 1805 can include a confirmation request identifier. In this embodiment, providing the document to first device 1821 at step 1807 based on the comparison can further include generating a second secure tag paired to the request, the second secure tag encoding the confirmation request identifier using a selection of potential tag feature options, and watermarking document 1811 with the second secure tag. In these embodiments, watermarked document 1843 does not contain a watermark of first secure tag 1813.

In some embodiments, method 1800 can further include determining that the receipt of the secure tag image satisfies an authentication criterion. In certain aspects, the authentication criteria can concern a number of confirmation requests associated with first secure tag 1813. In other aspects, the authentication criteria can concern an elapsed time since the provision of first secure tag 1813 to first device 1821. In other aspects still, the authentication criteria can concern a geographic origin of the confirmation request. In other aspects still, the confirmation request can include a confirmation request identifier, and the authentication criteria can concern the confirmation request identifier. In these aspects, the authentication criteria can be satisfied when an access identifier of the access request matches a confirmation identifier of the confirmation request.

Method 1800 can be used when there is an additional level of security required for a document. For example, a bank can use method 1800 to ensure security on certain documents. A bank can create a tag that is paired with a document concerning a customer's account. The customer can request access to the document through her laptop. The bank then the secure tag associated with the document to the customers laptop. The customer can then scan the tag with her mobile phone and send the scan back to the bank. The image is then compared, and access to the bank documents will be granted if the image matches the secure tag provided.

Figure 19:
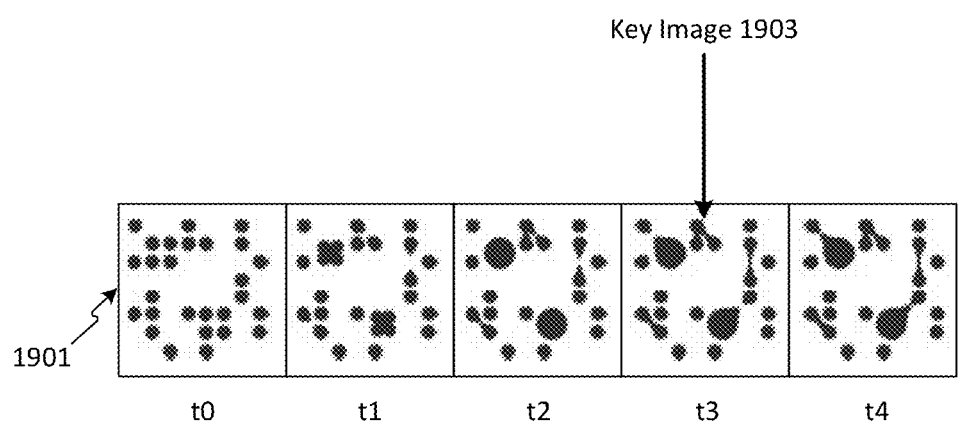
FIG. 19 depicts exemplary secure tags sequences for authentication.

FIG. 19 depicts an exemplary mutable secure tag. A mutable tag can digitally animate over time by morphing between glyphs and tags. For example, at a first time the tag can mutable tag can be in the form of a series of dots without additional tag features, or an invalid frame 1901. Invalid frame 1901 can mutate over a predetermined period of time to change into a valid frame 1903. Valid frame 1903 can be read by an appropriate reading device and can return data. In some embodiments, a mutable tag can be authentication by a single frame in the mutable tag process. In other embodiments, the mutable tag can be authenticated by authenticated by several frames in the mutable tag process. In other embodiments still, authentication can only occur based on the order of appearance of frames in the mutable tag process. In other embodiments still, invalid frame 1901 can include a 'junk tag,' or a type of tag that may appear valid but returns no information. A mutable tag can be read by any form of readable device, such as, for example, a camera.

In some embodiments, the mutable tag process can be triggered by a rollover or click event. In these embodiments, the tag is static prior to the triggering event and enters the mutable tag process following the triggering event. In other embodiments, the tag can be set to enter the mutable tag process during a certain time frame. For example, a tag can be set to mutate between the hours of 8 PM and 8 AM for additional tag security over-night. In other embodiments still, the mutable tag contains valid frame 1903 which is paired to another valid frame. In these embodiments, a user may be required to scan both paired frames to authenticate the tag.

The system for generating a mutable secure tag can include at least one processor and at least one non-transitory memory containing instructions that, when executed by the at least one processor, cause the system to perform operations which can include generating a first secure tag encoding tag data as a selection of tag feature options according to values of the tag data; receiving, from a scanner of a second device, a request including a sequence of tag images, the sequence of tag images including a first tag image; authenticating the request using the first secure tag and the first tag image; and providing an indication of the authentication of the request.

In some embodiments, the operations can further include providing instructions to display, on a display of a first device, a sequence of tags including the first secure tag shown in valid frame 1903. In some aspect, the instructions provided to display a sequence of tags including the first secure tag shown in valid frame 1903 can include embedding the sequence of tags into a digital product. In other aspects, the instructions can provide for displaying the sequence of tags of the display of the first device in response to a trigger. The trigger can be an event caused by a user or a predetermined event. In either aspect, the sequence of tags displayed can include invalid frame 1901 and valid frame 1903.

In some embodiments, authenticating the request can include comparing one or more perceptual hashes of the first secure tag displayed in valid frame 1903 to one or more corresponding hashes of the first tag image. In other embodiments, the authentication can further require matching the multiple secure tags to the multiple corresponding tag images according to a predetermined order of appearance. In other embodiments still, the indication of the authentication of the request can include at least some of the tag data. In other embodiments still, the indication of the authentication of the request can include decoding instructions for decoding at least some of the first tag data. In other embodiments still, the indication of the authentication of the request can include status information retrieved from a database. In certain aspects, the database can be a distributed database, and the status information can be retrieved from a distributed database using an oracle.

Figure 20:
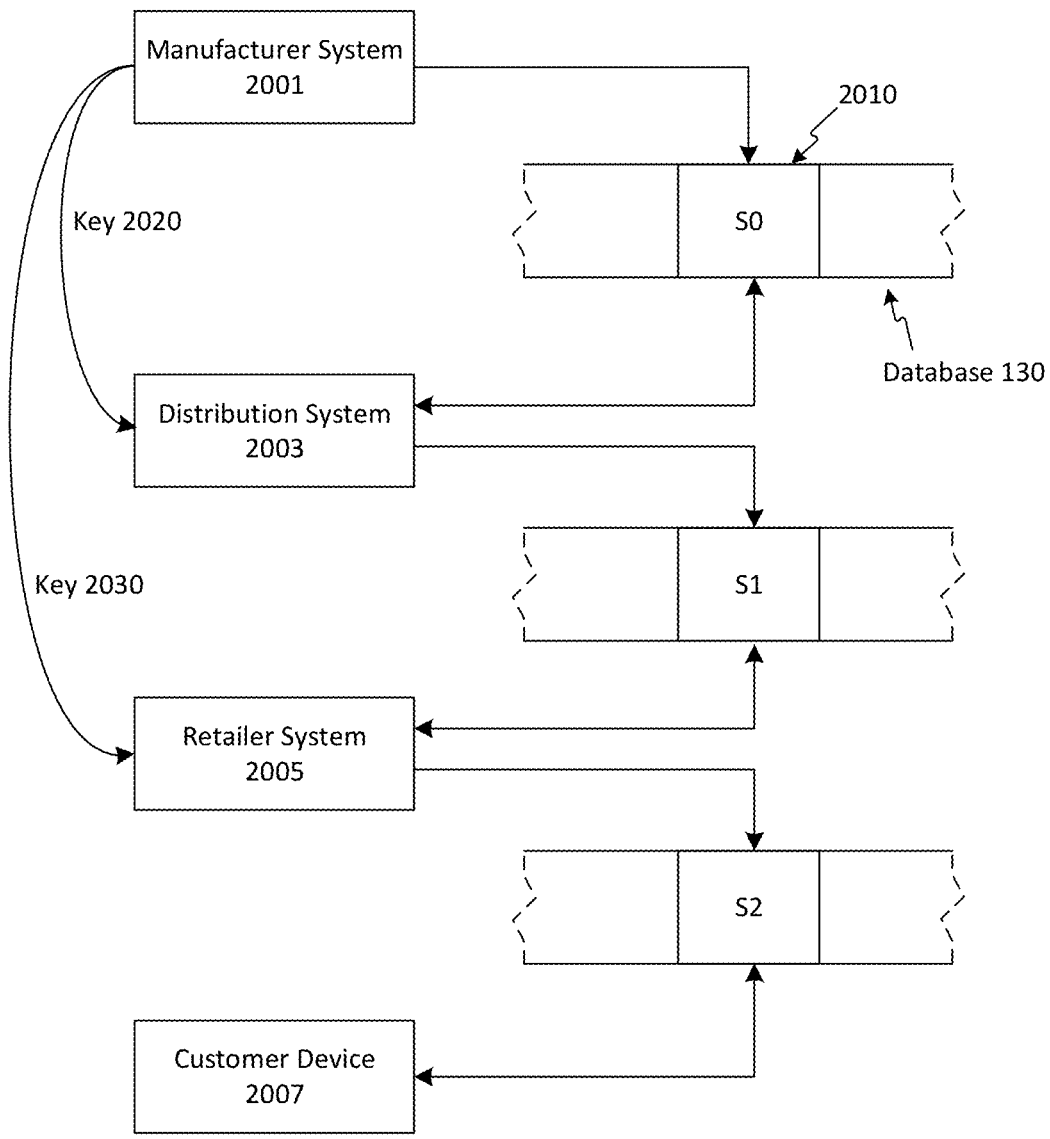
FIG. 20 depicts an exemplary process for inventory management using a database.

FIG. 20 depicts an exemplary system 2000 for inventory management using a database, consistent with disclosed embodiments. Though described below as performed by client systems associated with different entities in a supply chain, system 2000 can be performed in some embodiments by authentication system 115, private system 120, or another system. In some embodiments, manufacturing system 2001 can be configured to provisioning a database (e.g., database 130) with status information for a secure tag. In some aspects, manufacturing system 2001 can be configured to update the state of an account 2010 of the database with status information concerning the secure tag, or an item labeled with the secure tag. Manufacturing system 2001, or another system, can be configured to provide application keys to carrier system 2003 and retailer system 2005. These application keys can allow carrier system 2003 and/or retailer system 2005 to update or modify the state of account 2010. Alternatively or additionally, the state of an account 2010 of the database can include rules governing access to the account. In some embodiments, customer system 2007 can lack an application key. Therefore, in some embodiments, customer system 2007 can have a default level of access to the database. For example, customer system 2007 can have read only access to the state information described in account 2010.

A client device can scan the secure tag associated with account 2010. Scanning the secure tag can cause the client device to interact with authentication server 115 to decode the secure tag. In some embodiments, the client device can be configured to provide authentication information (e.g., an application key or authentication credentials) and update information to authentication server 115.

In some embodiments, using information decoded from the secure tag, authentication server 115 can be configured to update account 2010. In some aspects, authentication server 115 can be configured to provide the update information an address of the account to an oracle. The oracle can then write the update to account 2010. In some embodiments, authentication server 115 can be configured to provide the information to a private database. The private database can be configured to collect updates, which can be periodically written to the database.

In various embodiments, using information decoded from the secure tag (e.g., an address of account 2010 in database 130), authentication server 115 can be configured to retrieve information from account 2010. In some aspects, authentication server 115 can be configured to provide a request for state information to an oracle. The request can include an address of the account. The oracle can then read the state of account 2010 to retrieve the state information, which is then conveyed to the client device (directly or through one or more of the oracle and the authentication server).

In some embodiments, authentication server 115 can be configured to provide information for reading or writing to the database. For example, authentication server 115 can be configured to decode an address of account 2010 in database 130 and provide the address to the client device. The client device can the contact the oracle to provide updates or read information. In such embodiments, the oracle may be configured to restrict access to account 2010 based on application keys received from the client device or rules stored in account 2010.

A client device associated with manufacturing system 2001 can scan the secure tag, consistent with disclosed embodiments. For example, a worker can use the client device to scan the secure tag as the item labeled by the secure tag is exiting a manufacturing facility associated with manufacturing system 2001. Manufacturing system 2001 can be configured to use system 2000 to update account 2010 with information concerning the manufacturing of the item. In some embodiments, manufacturing system 2001 can subsequently access a portal to read information stored in account 2010 regarding the secure tag. For example, when manufacturing system 2001 accesses system 2000 (through authentication server 215 or an oracle) using an application key or credential associated with the manufacturer, manufacturing system 2001 can retrieve state information including at least one of tracking information, sales information, customer data, usage information, activation information, or location information.

A client device associated with distribution system 2003 can scan the secure tag, consistent with disclosed embodiments. For example, a worker can use the client device to scan the secure tag as the item labeled by the secure tag is received for transport. Based on this scan, distribution system 2003 can be configured to use system 2000 to retrieve state information regarding at least one of authenticity information, destination information, or manufacturer information. Distribution system 2003 can be configured to use system 2000 to update account 2010 with information concerning the distribution of the item. In some embodiments, distribution system 2003 can subsequently access a portal to read information stored in account 2010 regarding the secure tag. For example, when distribution system 2003 accesses system 2000 (through authentication server 215 or an oracle) using an application key or credential associated with the distributor, distribution system 2003 can retrieve state information regarding at least one of authenticity information, destination information, or manufacturer information.

A client device associated with retailer system 2005 can scan the secure tag, consistent with disclosed embodiments. For example, a worker can use the client device to scan the secure tag as the item labeled by the secure tag is received for from the distributor. Based on this scan, retailer system 2005 can be configured to use system 2000 to retrieve state information regarding at least one of authenticity information, transactional information, product information, or tracking information. Retailer system 2005 can be configured to use system 2000 to update account 2010 with information concerning the receipt or sale of the item. In some embodiments, retailer system 2005 can subsequently access a portal to read information stored in account 2010 regarding the secure tag. For example, when retailer system 2005 accesses system 2000 (through authentication server 215 or an oracle) using an application key or credential associated with the distributor, retailer system 2005 can retrieve state information regarding at least one of authenticity information, transactional information, product information, or tracking information.

Customer device 2007 can scan the secure tag, consistent with disclosed embodiments. In some embodiments, customer device 2007 may lack an application key or authentication credential. In such embodiments, system 200 may provide relatively little information regarding the item labeled with secure tag 105. For example, customer device 2007 may be able to retrieve at least one of authenticity information, product information, or proof of ownership information.

As described herein, the state of the account can store status information including state information for the secure tag indicates at least one of tracking information, sales information, customer data, usage information, activation information, location information, authenticity information, destination information, updated manufacturer information, transactional information, product data, or proof of ownership information. The particular allocation of access to this information among the manufacturer, distributor, retailer, and customer is intended to be exemplary, and not limiting.

Figure 21:
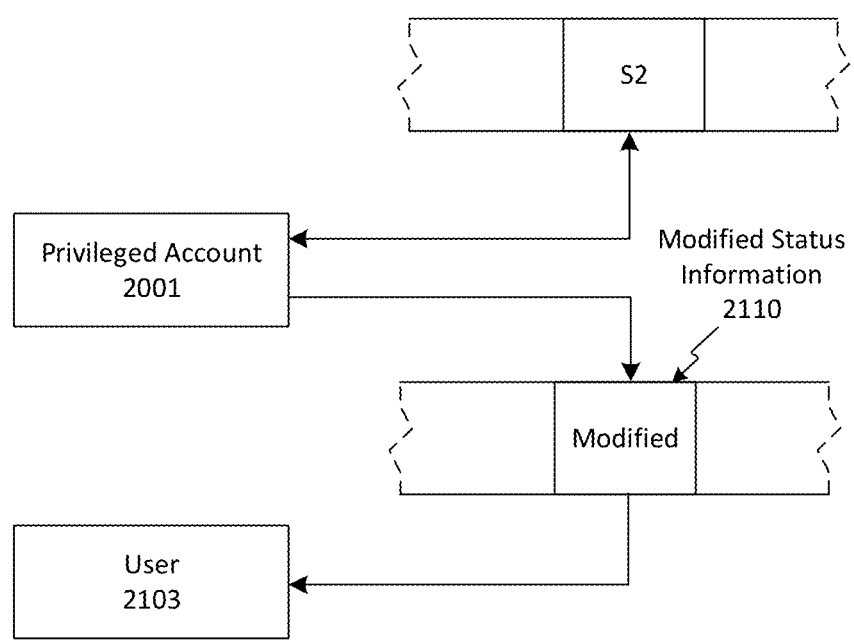
FIG. 21 depicts an exemplary process for modifying tags.

FIG. 21 depicts an exemplary system 2100 for modifying secure tag information in a database, consistent with disclosed embodiments. Though described below as performed by a client system, system 2100 can be performed in some embodiments by authentication system 115, private system 120, or another system. As described above with regarding to FIG. 20, a system can access the database, either during an interaction involving a secure tag or using a portal, to read or write information concerning the state of the secure tag. As shown in FIG. 21, a user with a privileged account (e.g., as shown by a privileged application key or authentication credentials) can access the database to update state information to cancel a tag. This can render the tag invalid for subsequent use or transactions. For example, should user 2103 attempt to perform an action using the tag later, authentication server 115 can indicate that the tag is cancelled and refuse to identify the tag, authentication the tag, or perform the action.

FIG. 22 depicts a process for tracking inventory using secure tags. As shown, two shoes can be tied together using paired tags (e.g., tags 2201 and 2203), as discussed with regards to FIGS. 16A and 16B. The shoes can be paired with the shoebox containing them by labeling the shoebox with a tag 2205 paired to each of tags 2201 and 2203. A tag 2207 for a box of shoeboxes can be paired with tag 2205. A tag 2209 for a shipping container can be paired with the tag 2207 for the box of shoeboxes. A retailer tag 2211 can be paired with the tag 2209 for the shipping container. The transfer of ownership to the customer can be associated with generation of tag 2213, as described below with respect to FIG. 23. In some embodiments, tag 2213 tag can be paired to the individual shoe tags 2201 and 2203. Throughout this inventory tracking process, accounts associated with the tags described can be updated with tracking information, location information, and other status information, as discussed with regards to FIGS. 20 and 21. As shown, information in accounts for those tags under retailer control (inside the retailer control loop 2203) can be accessible to at least the retailer, while information in accounts for tags 2201, 2203, and 2213 can be accessible to the customer.

Figure 23:
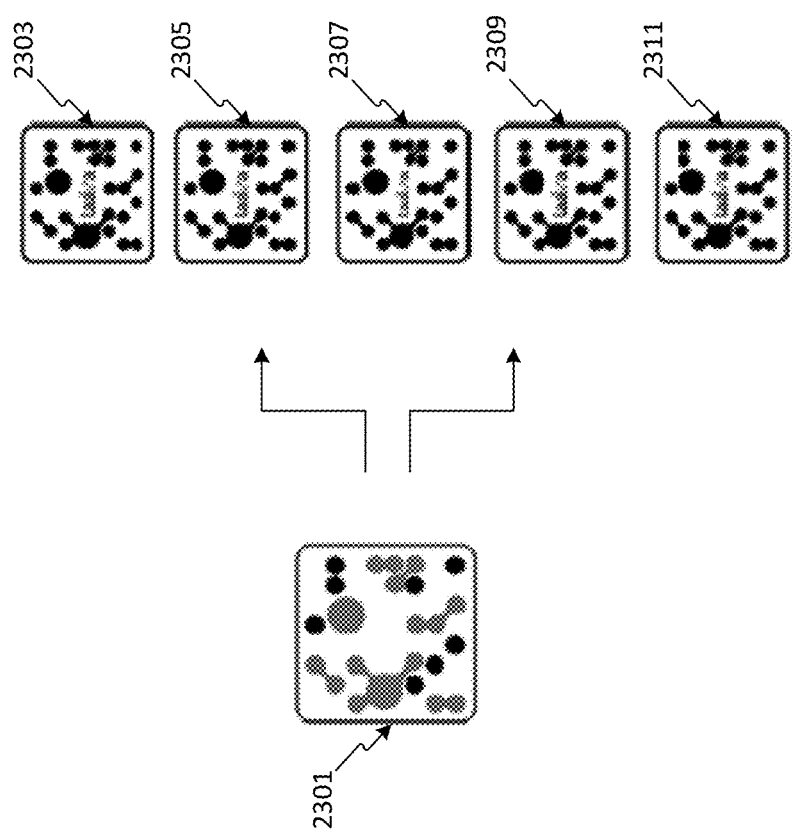
FIG. 23 depicts an exemplary process for documenting transfers of ownership.

FIG. 23 depicts a process to transferring ownership of an item using a secure tag. The tag validation process can involve pairing a uniquely generated digital secure tag with an original manufacturer secure tag 2301. In some embodiments, a product is received by a seller with original manufacturer secure tag 2301. Original manufacturer secure tag 2301 is logged in the seller's system and associated with the product online. Potential customers can then view the product online. Each potential customer sees a uniquely generated tag containing secondary data which can authenticate the product when scanned. Each uniquely generated tag is paired with original manufacturer secure tag 2301. For example, potential buyer one will be presented with unique secure tag one 2303. Unique secure tag one 2303 resembles original manufacturer secure tag 2301 but contains unique secondary data. In addition, unique secure tag one 2303 is paired with original manufacturer secure tag 2301. Thus, user one can confirm the authenticity of the product while maintaining unique secure tag one 2303 which can contain information about the time and date for viewing the product. In other embodiments, potential user two can be presented with unique secure tag two 2305, potential user three can be presented with unique secure tag three 2307, potential user four can be presented with unique secure tag four 2309, and potential user five can be presented with unique secure tag five 2311. In each embodiment, the unique secure tag is paired to original manufacturer secure tag 2301.

In some embodiments, when a product is purchased by a buyer, the seller can assign original manufacturer secure tag 2301 to the buyer. In other embodiments, original manufacturer secure tag 2301 can be automatically assigned to the buyer upon purchase. In either embodiment, the purchase and subsequent assignment of original manufacturer tag 2301 is updated in the blockchain. Following purchase and assignment, no additional unique secure tags can be generated and paired with original manufacturer tag 2301. In certain aspects, a potential customer can be notified of the purchase via the paired unique secure tag. For example, the pairing between original manufacturer secure tag 2301 and the unique secure tag can be killed. In another example, the unique secure tag can notify the potential customer of the purchase via the updated information on the blockchain.

FIG. 24A depicts an exemplary secure tag. The secure tag can contain various technical components. For example, the technical components can comprise: verification fragments, an outer and inner frame, an outer frame section, an outer frame block, dots, glyphs, connectors and splines, a Laava stage one ID, a center graphic, a center graphic public key, and additional technical features that are described in more detail below. The technical components can further be used to encode data in various forms. The technical components are described in more detail below.

The center graphic can be a graphic, brand, or other visual, and can be an end user identifiable element which also contains fingerprinted data. In some embodiments, the center graphic can be used for orientation of a secure tag. In other embodiments, center graphic can be a glyph set, which can contain data. For example, center graphic can contain a smaller fingerprint signature than the larger tag, and if required, can contain 128 characters of information in readable text. In other embodiments still, center graphic can be used to display a brand. In such embodiments, center graphic can be any shape and can have color. The center graphic can further be surrounded by lines with a contrast difference to separate it from the rest of the tag. In some embodiments, the lines can be required to have a certain thickness.

The center graphic public key can be a hashed SHA2 version of the center graphic, typically a large generated number. The center graphic public key can be used to unlock other portions of the tag, as described in further detail below. The Laava stage one ID can be a manufacturer ID and public key and can allow a tag to be identified before any data is read. A glyph can generally be individual shapes or characters generated within the tag, and can be where most of the data, keys, ID, etc., are stored. The outer frame is the border of the outside of the secure tag and defines the shape for scanning. The outer frame can also allow for additional functionality and data storage. The inner frame can be an optional border on the inside of a secure tag surrounding the center graphic and may be used to separate glyphs from the center graphic visually. In addition, inner frame can be used to assist with fingerprinting of the center graphic and can contain data.

Verification fragments can be a specific set of image data, and can be used for verification, comparison, and data storage. The verification fragments can include multiple elements, such as the center graphic and other variable elements. Dots can be a point on a secure tag at which white space becomes a visible shape or circle. Dots can store multiple data elements and define the tag and can be a starting point for forming a glyph. Splines and connectors can be a shape which joins or blends two or more dots together and can allow for storage of larger amounts of data and stronger encrypting or encoding. An outer frame section is an identified portion of the outer frame and can be used to store or repeat data. An outer frame block can be a collection of breaks in the outer frame section and can be used to store data.

FIG. 24B depicts portions of a graphics file corresponding to the exemplary secure tag. The graphics file represents the exemplary secure tag depicted in FIG. 24A. The graphics file is created during the tag generation process, discussed in more detail below.

FIG. 25A depicts secure tag 2501, secure tag 2503, and secure tag 2505, each generated using the same style sheet but different data. The stylesheet provides the tag template for the first step of secure tag generation. In some embodiments, the stylesheet describes the class of secure tag. Following receipt of the stylesheet, the tag generation process receives a numeric seed, generates a secure tag layout, and receives tag data, all before generating the final secure tag. The stylesheet and numeric seed provide the locations of where data can be encoded. Data is then encoded as tag feature options. In FIG. 25A, secure tags 2501, 2503, and 2505 were all generated using the same stylesheet at the first step of the secure tag generation process, but different data was provided before the final secure tag is generated. During the tag generation process, the tag generation systems can select from the same first and second order locations based on the stylesheet for secure tag 2501, 2503, and 2505, resulting in some similarities between the secure tags. After the layout for each exemplary secure tag was been produced, the data was encoded into the tag feature options to produce unique designs.

FIG. 25B depicts secure tag 2511, secure tag 2513, and secure tag 2515, each generated using different stylesheets but the same tag data. As discussed above, the stylesheet is used at the first step in the tag generation process. Secure tag 2511, 2513, and 2515 each began the tag generation process with different first and second order locations available. As with the previous examples, the data is encoded after the first and second order locations have been identified and selected. Since the data can be encoded into various tag features, and the tag generation algorithm produces randomized designs, the same tag data can result in significantly different final secure tag designs. Secure tag 2511, 2513, and 2515 will all return the same data when scanned, but each secure tag has a unique design.

Figure 26A:
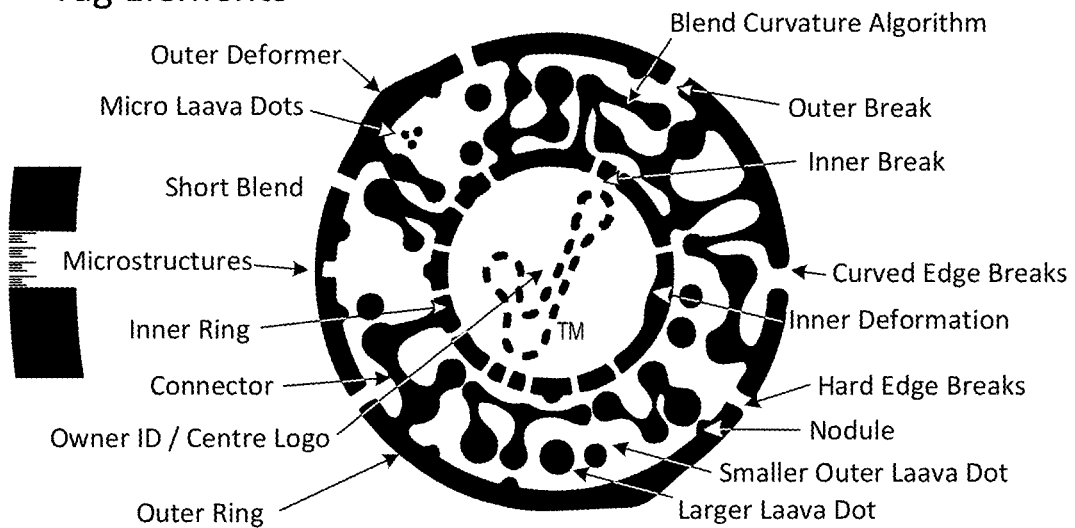
FIG. 26A depicts secure tag feature options.

FIGS. 26A through 26P depict details of the potential secure tag features. Each Fig. is described in more detail below.

FIG. 26A depicts potential features of an exemplary secure tag. Each of the potential features can be used to encode data or for fingerprinting. The potential features comprise: the primary inner dots, the outer breaks, the inner breaks, the inner edge blend, the outer horizontal blend, the inner frame, the owner ID, the secondary inner dots, the inner horizontal blend, the outer frame, the outer edge blend, the short blend, the secondary outer dots, inner deformations, outer deformations, nodules, and the long blends. As discussed in more detail below, each of these potential features can be used to encode information. Additional variable assets can be used to embed additional data or encrypt information. For example, the variable assets can comprise indents, hollows, colored shapes, gradients, connecting lines, and embedded symbols.

In some embodiments, the secure tags can contain additional features to authenticate the product or store information. For example, background patterns or textures can be subtly or invisibly placed behind the tag. Similarly, in another example, adjacent patterns or textures can be used to provide additional authentication or store information. In another example, a Penrose Tile graphic pattern can be used to fingerprint or distinguish a specific set of tags. In another example still, adjacent information, such as a unique wordset, can be placed within proximity to the tag. Such a design can be useful when human readable ID confirmation is required, such as, for example, in the instance of customer support.

Figure 26B:
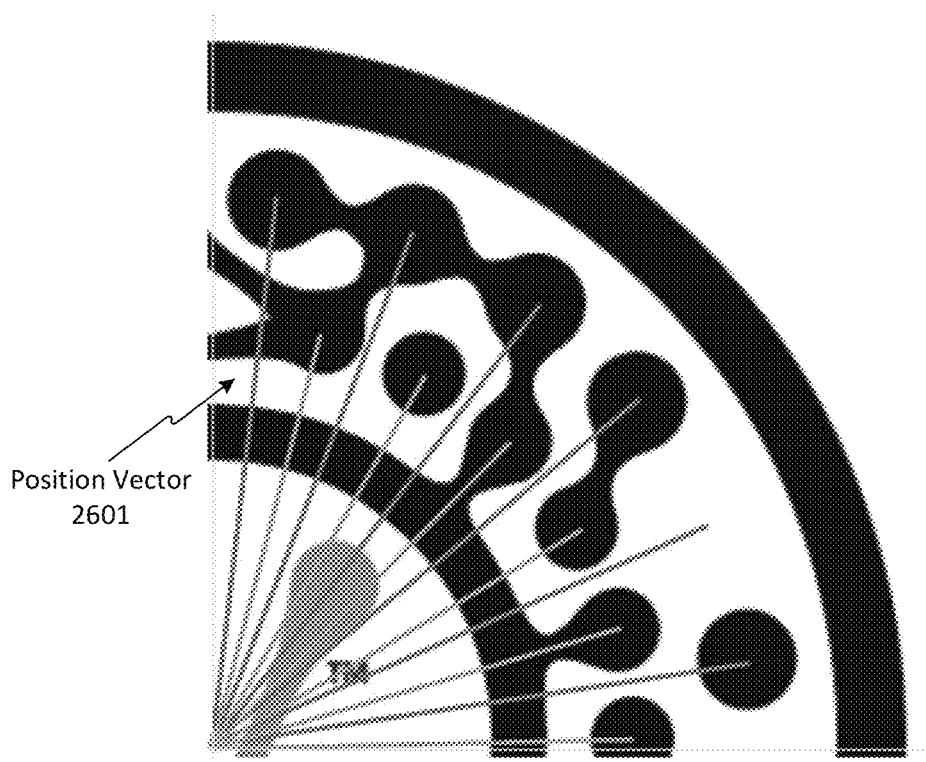
FIGS. 26B-26N depict details of potential secure tag options.

FIG. 26B depicts an exemplary tag showing the position vector 2601. Position vector 2601 discloses the final positions of dots and shapes in an exemplary secure tag after the layout, and any displacement, of the dots and shapes has been determined. Position vector 2601 provides information on the location of each shape, dot, and tag feature in a secure tag.

Figure 26C:
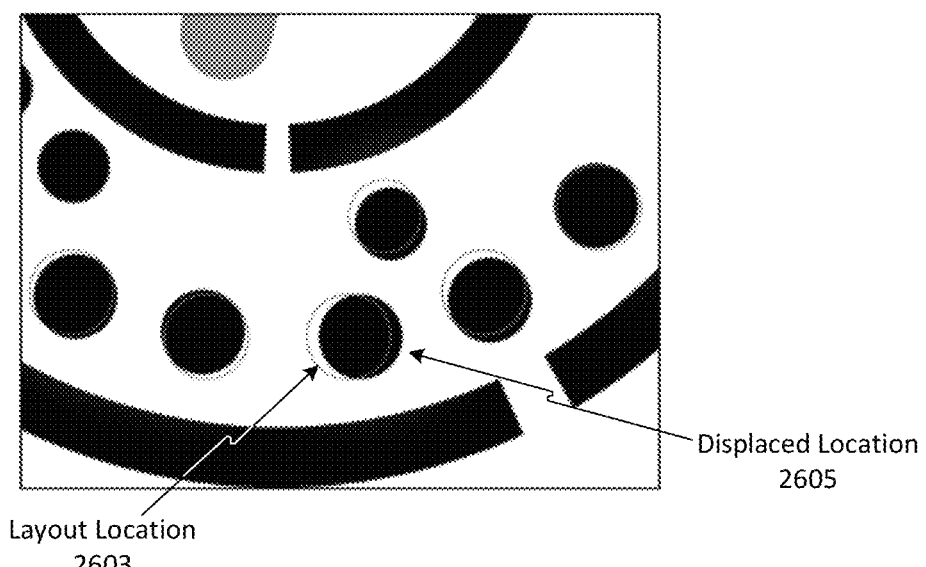

FIG. 26C depicts an example of offset dot alignment. As disclosed above, the layout of an exemplary secure tag can be determined following the receipt of a stylesheet describing the class of secure tags and the numeric seed. Layout location 2603 depicts the location of an exemplary dot after the secure tag layout was generated. After receiving the tag data, the secure tag is generated as tag feature options. Certain tag feature options involve alignment and positioning of dots and shapes. Displaced location 2605 depicts the final location of the exemplary dot after the tag data was encoded as tag feature options. The difference between layout location 2603 and displaced location 2605 can be indistinguishable to the human eye, making it difficult to copy such a tag. The tag generation systems are designed to make the grids much more unpredictable than a standard grid. In some embodiments, resolutions can allow for displaced location 2605 to be adjusted from layout location 2603 based on grid offsets, line length, angles, etc. In such embodiments, these adjustments may allow additional information to be encoded into the tag.

Figure 26D:
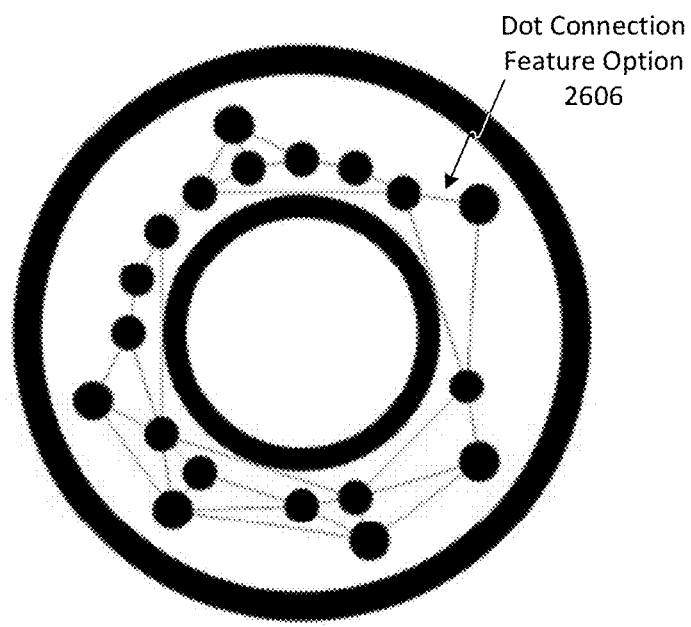

FIG. 26D depicts an exemplary secure tag showing a dot connection feature option 2608. Dot connection feature option 2608 can span any distance within the outer frame of the secure tag to reach other dots. In some embodiments, dot connection feature option 2608 can be established between dots as a straight line. Dot connection feature option 2608 cannot go through the center image to reach another dot.

Figure 26E:
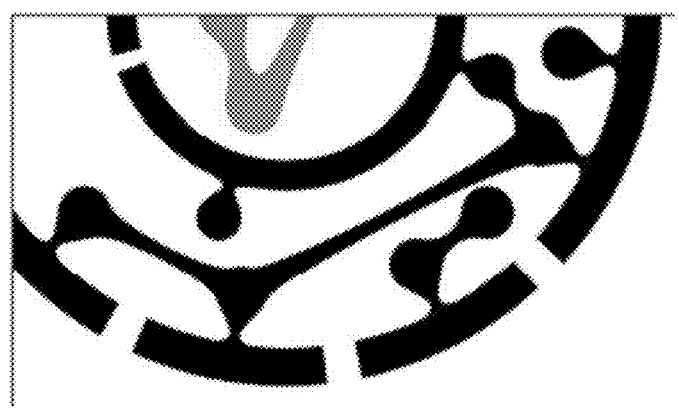

FIG. 26E depicts dot connection feature option 2608 after data has been encoded to create splines and edge connections. The shapes formed through the splines are called glyphs. As discussed above, glyphs can be individual shapes or characters generated within the tag, and can be where most of the data, keys, ID, etc., are stored. In some embodiments, spline mathematics can be used to contain encrypted or encoded information. For example, elliptical curve cryptography can be used. Edge joins can also be used to store data.

Figure 26F:
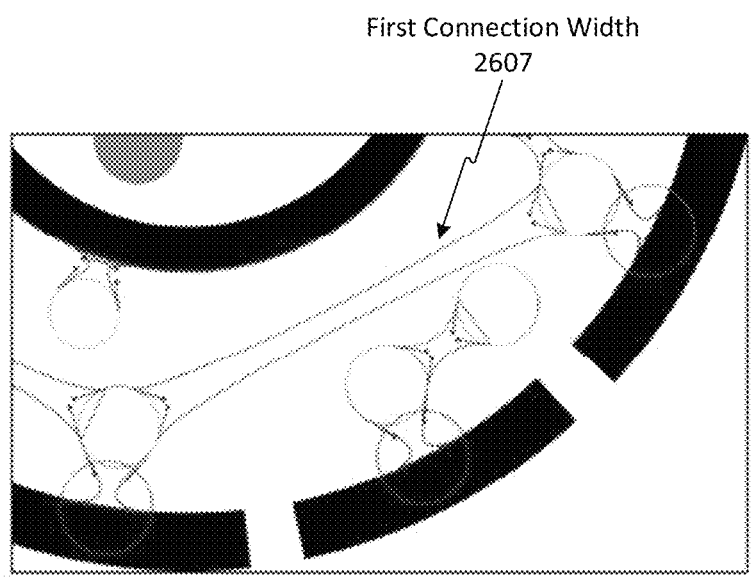
Figure 26G:
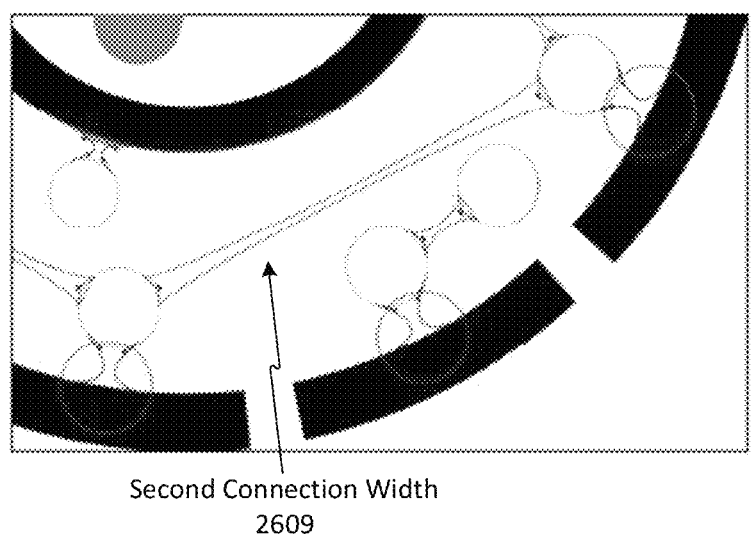

FIGS. 26F and 26G depict dots and connectors as vectors for the same exemplary tag layout. The secure tags are generated in vector format, which are defined in terms of 2D points with connecting lines and curves. The vectors in these images show variable spline origins and the thicknesses of splines, or connectors, which can be used to encode data. FIG. 26F depicts a first connection width 2607 and FIG. 26G depicts a second connection width 2609. First connection width 2607 is depicted as greater than second connection width 2609. First connection width 2607 and second connection width 2609 can be encoded with the same or different data.

Figure 26H:
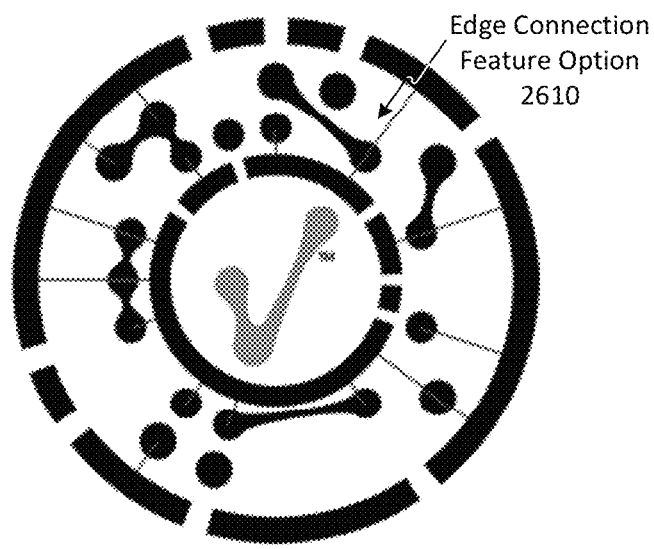

FIG. 26H depicts an exemplary tag showing an edge connection feature option 2610. Edge connections can be formed from any potential edge connector feature option 2610. Edge connector feature option 2610 provides the possibility of forming an edge connection between either the inner or outer frame. Once edge connector feature option 2610 has been selected to be turned into an edge connection, data can be encoded the shape. For example, edge connections can be encoded with data used to represent a manufacturer number.

Figure 26I:
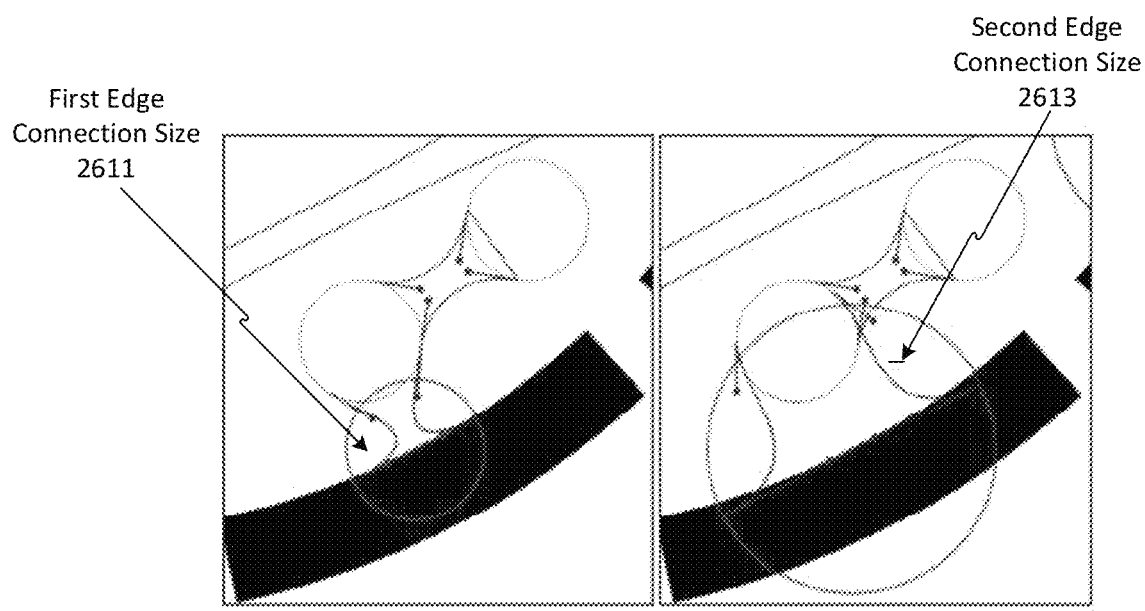

FIGS. 26H and 26I depict dots and edge connections as vectors for the same exemplary tag layout. The vectors in these images show variable edge join origins and thicknesses which can be used to encode data. FIG. 26I depicts a first edge connection size 2611 and FIG. 26H depicts a second edge connection size 2613. First edge connection size 2611 is depicted as greater than second edge connection size 2613. First connection size 2611 and second edge connection size 2613 can be encoded with the same or different data.

Figure 26J:
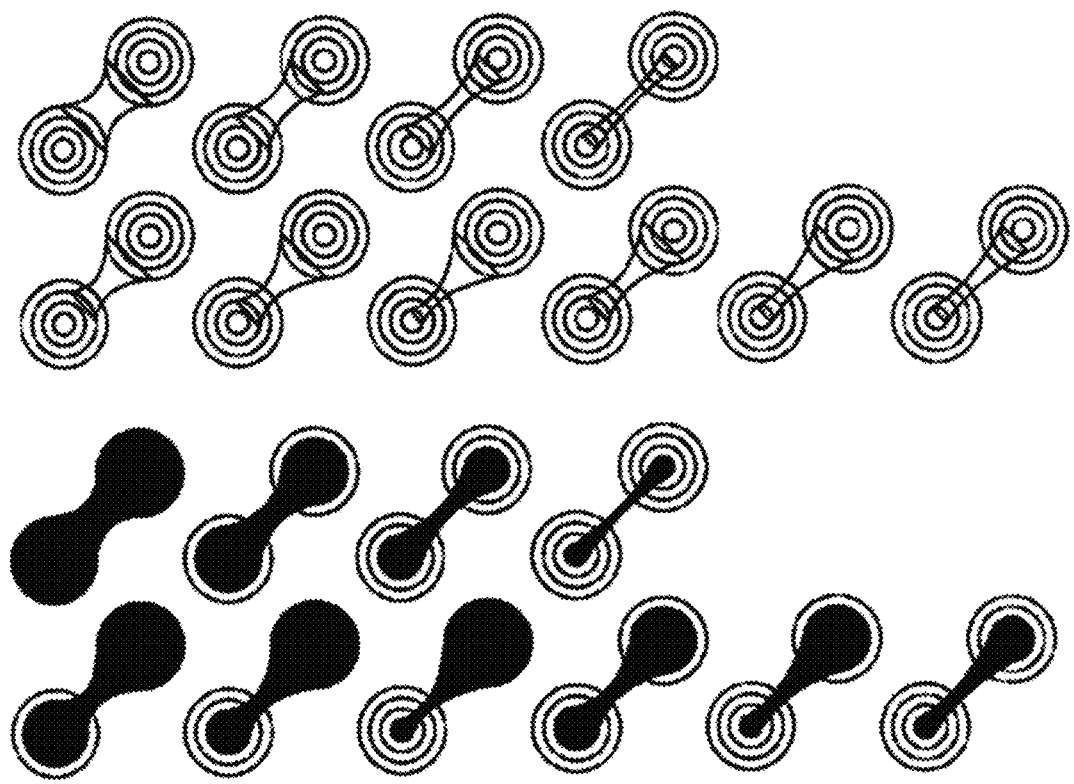

FIG. 26J depicts various glyphs and potential spline features for an exemplary secure tag. Glyph sets can be generated using a multitude of splines and placed within a flexible coordinates system. In some embodiments, glyphs can be generated mathematically using a blend curvature algorithm. In other embodiments, glyphs can be generated based on predetermined shapes. For example, a customer may request a glyph be in a specific shape based on the customer's product or service. In this example, the glyph set can be distinctly identified and specifically designed. The spline of a glyph can vary in thickness based on, in part, the spline's starting position on each dot. In some embodiments, glyphs can be formed between any number of dots. The area around a glyph can contain data as a microstructure or within an algorithmic method which stores data in the path. FIG. 26J depicts only a limited number of possible glyphs and spline features.

Figure 26K:
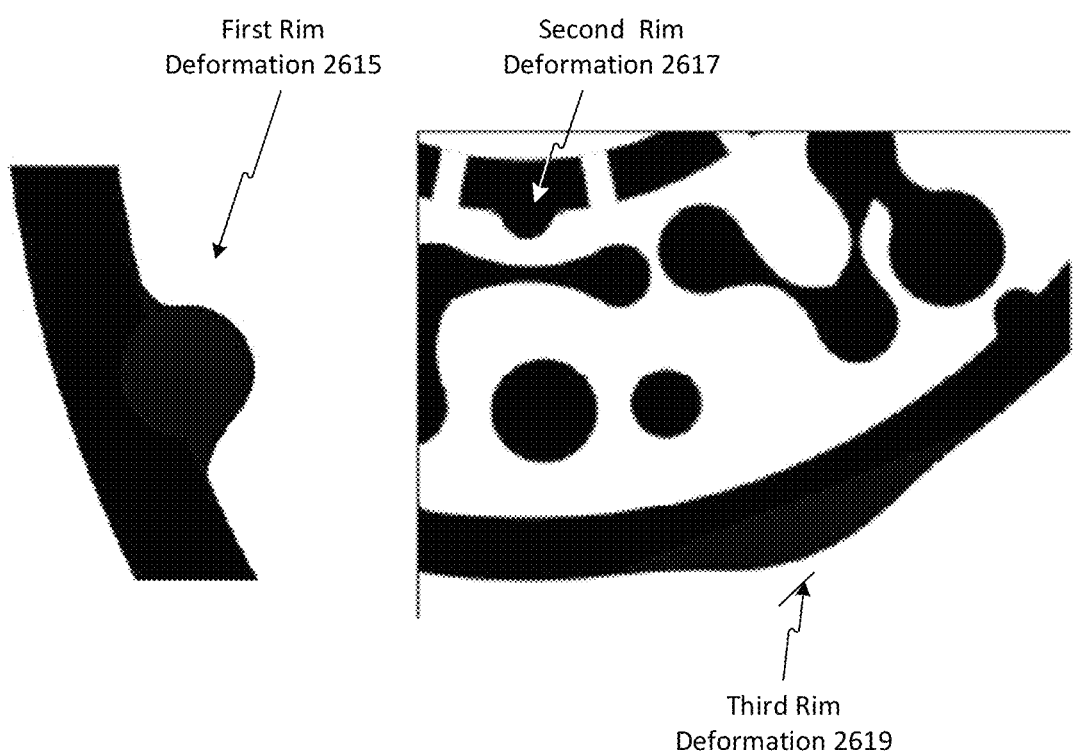

FIG. 26K depicts a first ring deformation 2615, a second ring deformation 2617, and a third ring deformation 2619, all of which can be used to encode data. First ring deformation 2615 can comprise a deformation on the inner edge of the outer frame. Second ring deformation 2617 can comprise a deformation on the outer edge of the inner frame. Third ring deformation 2619 can comprise a deformation on the outer edge of the outer frame.

Figure 26L:
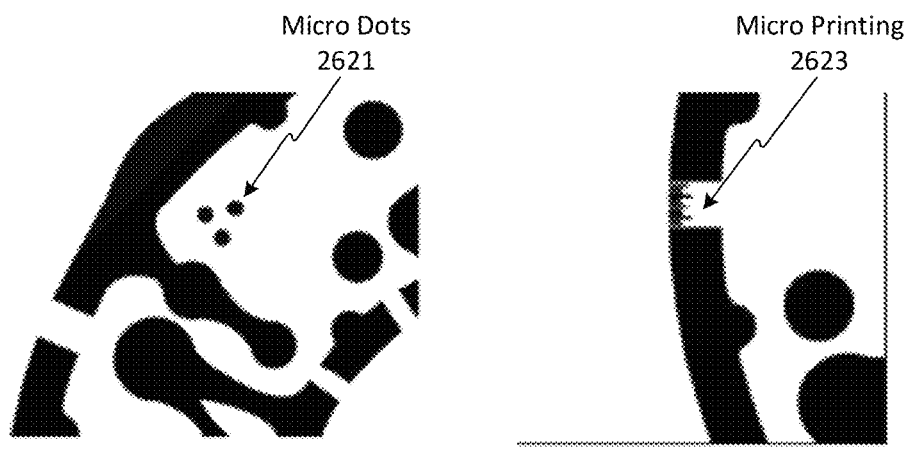

FIG. 26L depicts microdots 2621 and microprinting 2623, both of which can be used to encode data. Microprinting 2623 can comprise a second set of binary data, which can be interpreted in a similar way as the outer frame and outer frame break data. At lower resolutions, microprinting 2623 may appear as noise. At higher resolutions, microprinting 2623 can comprise information on the grid positions of fingerprint data. The information can comprise an X or Y grid number and the offset value. In some embodiments, the tag can be encrypted provided there is enough microprinting 2623. In other embodiments, microprinting 2623 can comprise different colors. In such embodiments, microprinting 2623 can store additional information in the same physical space. In other embodiments still, the outer frame can contain microprinting 2623 on both the inner and outer side of the line. In such embodiments, b microprinting 2623 on both the inner and outer side can be colored. In other embodiments, microprinting 2623 can store additional binary data by varying the height of its blocked sections. In such embodiments the binary code may be difficult to copy due to its small physical size. Microprinting 2623 can be used for advanced data storage and may be accessible by very high-resolution cameras.

Figure 26M:
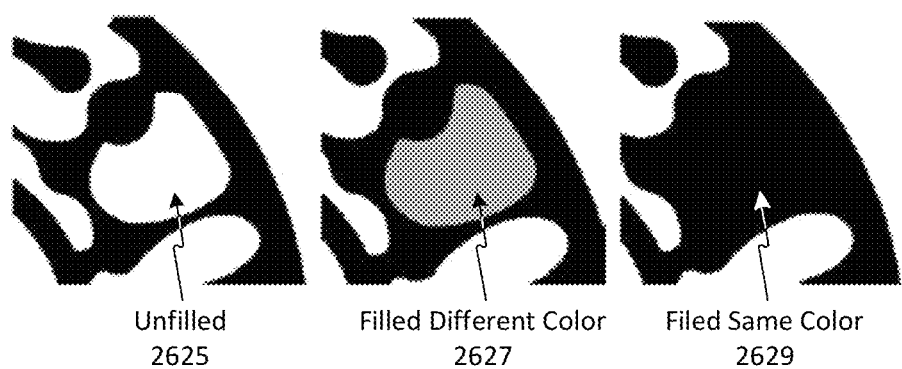

FIG. 26M depicts the same location with three different gradients of color filling: unfilled 2625, filled a different color 2627, and filled the same color 2629. Data can be encoded into the secure tag based on the gradient and color of a location.

Figure 26N:
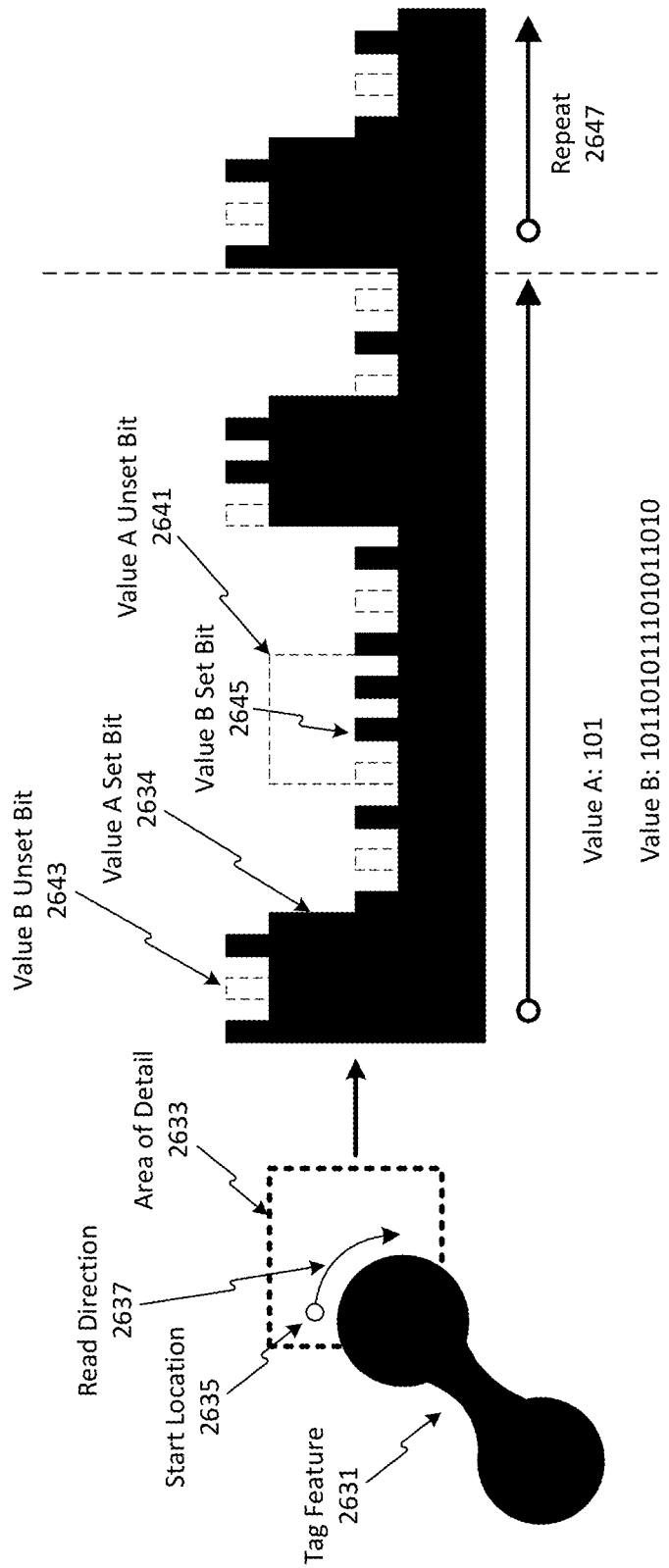

FIG. 26N depicts an exemplary tag feature 2631 and the data encoded into tag feature 2631. Tag feature 2631 depicts two dots connected by a connection, or two bits connected by a third bit, with an area of detail 2633 containing encoded data. Area of detail 2633 can comprise a spline wrapping around the edge of one of the dots. Area of detail 2633 can be read by beginning at start location 2635 and moving in the read direction 2637. Area of detail 2633 can have a first spatial frequency with the potential to encode three bits of data (value A) and a second spatial frequency with the potential to encode 18 bits of data. Value A set bit 2639 represents a 1 at the first spatial frequency and value A unset bit 2641 represents a 0 at the first spatial frequency. Value B unset B represents a 0 at the second spatial frequency and value set bit 2645 represents a 1 at the second spatial frequency. Following the three and 18 bits of encoded data, there is a repeat 2647.

FIGS. 27A through 27K depict the generation of an exemplary secure tag. Each figure is described in more detail below.

Figure 27A:
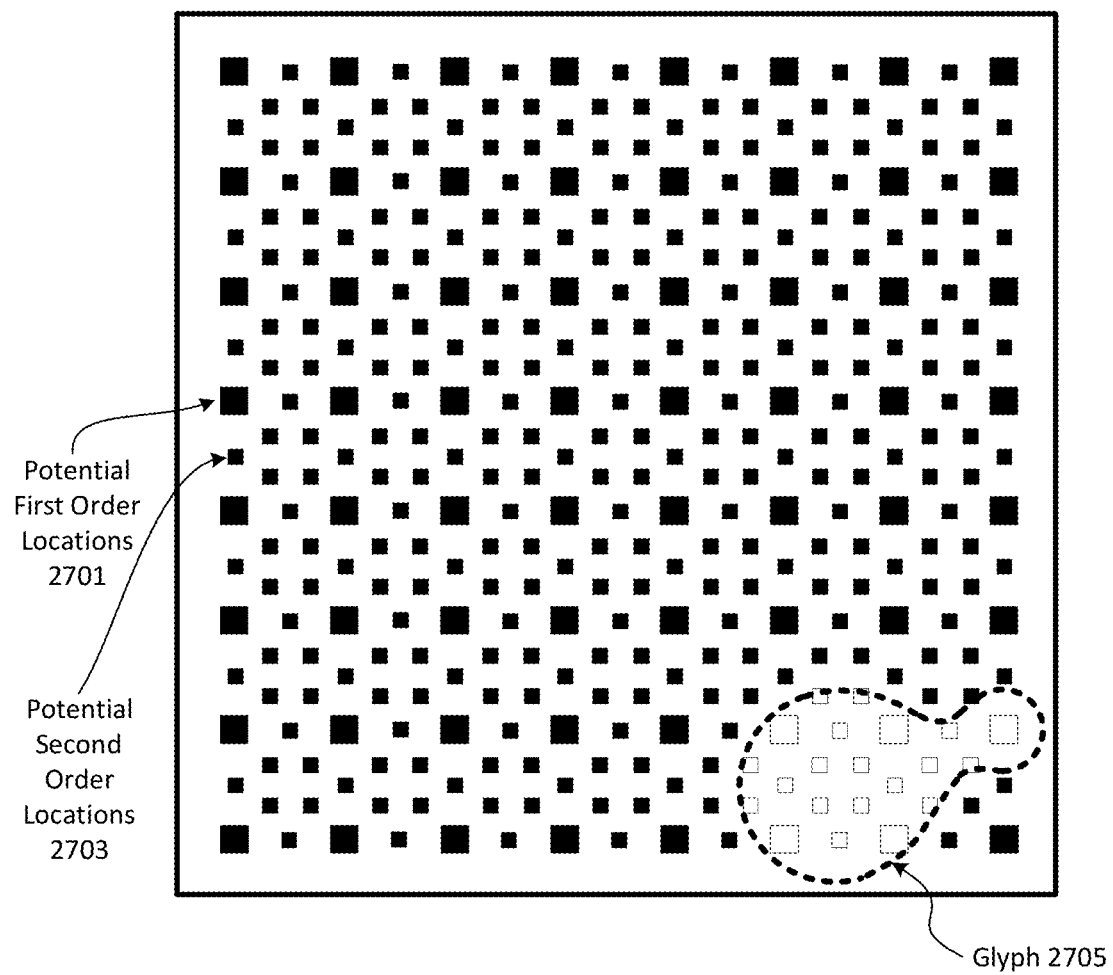

FIG. 27A depicts an exemplary grid used as a base in the process of secure tag generation. The grid comprises the potential first order locations 2701 and the potential second order locations 2703, which are the bases for a glyph 2705. The formation of the grid is the first stage in the generation of secure tags and is done using specific algorithms to create randomized designs. Potential first order locations 2701 and potential second order locations 2703 dictate the final position and shape of glyph 2705. Glyph 2705 can span across any number of potential first order locations 2701 and potential second order locations 2703.

Figure 27C:
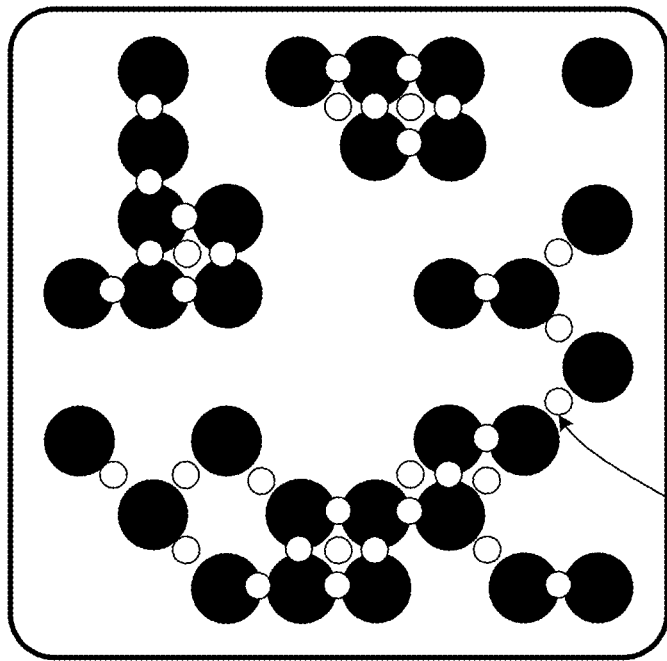
Figure 27B:
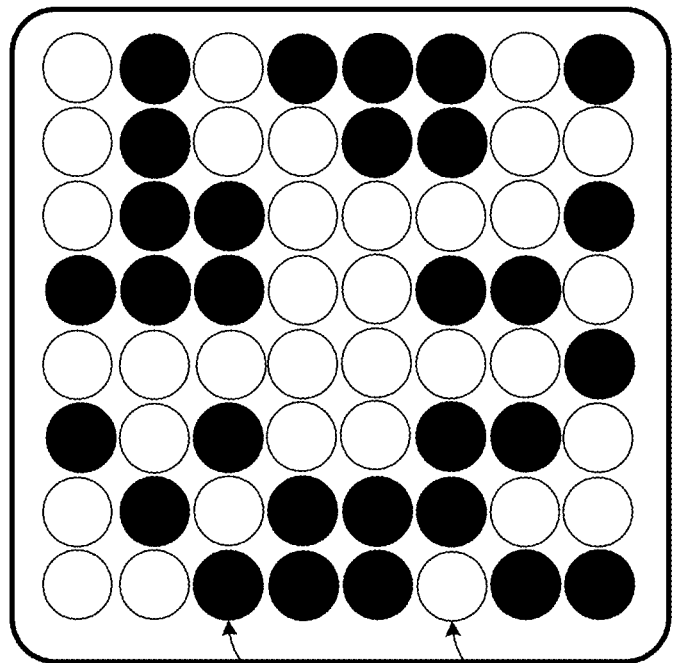

FIG. 27B depicts selected first order location 2707 and unselected first order location 2709. At this stage in the tag generation process, potential first order locations 2701 are identified and selected. The tag generation algorithm randomly selects a predetermined number of potential first order locations 2701. Selected first order location 2707 will then be further used in the process of secure tag generation, while unselected first order location 2709 is no longer part of the tag generation process. In FIG. 27B, there are 26 selected first order locations 2707, selected at random, resulting in one of seventy-two-thousand billion possible combinations.

FIG. 27C depicts the identification of a potential second order location 2711. Potential second order location 2711 can comprise any second order location located between selected first order locations 2707. In FIG. 27C, there are 40 potential second order locations 2711 identified, resulting in the possibility of approximately one trillion sub-combinations.

Figure 27D:
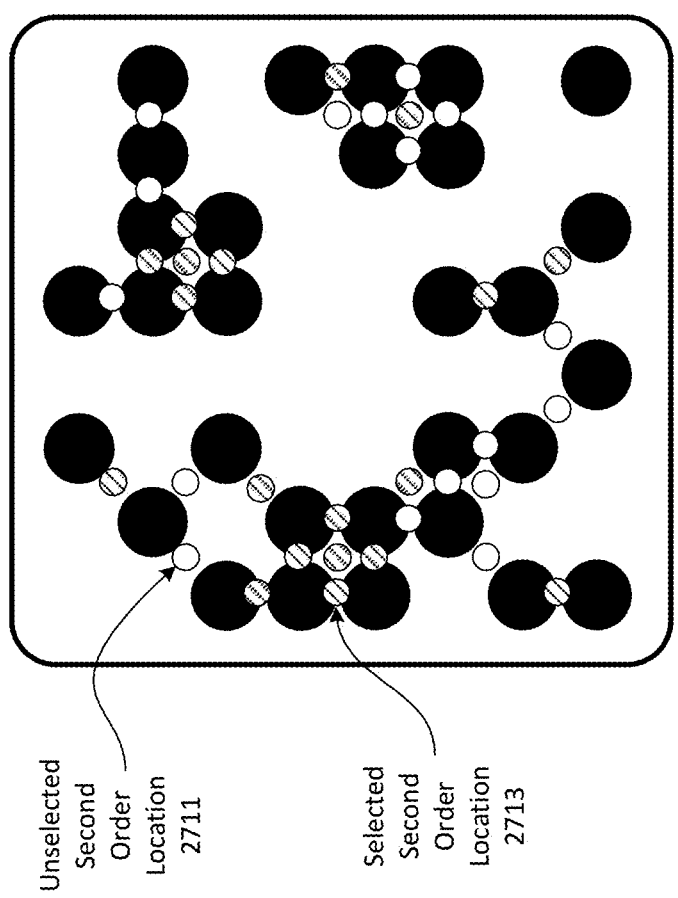

FIG. 27D depicts unselected second order locations 2713 and selected second order locations 2715. Selected second order locations 2715 are chosen from the potential second order locations 2711 identified previously. Selected second order locations 2715 can be chosen by the system based on a tag generation algorithm, and can be used to connect selected first order location 2707 to a separate selected first order location 2707.

FIG. 27E depicts the secondary grid showing selected first order locations 2707 and selected second order locations 2715 immediately prior to and immediately after processing through the visualization engine in the process of secure tag generation. The secondary grid comprising selected first order locations 2707 and selected second order locations 2715, or the final secondary grid, can be passed on to the visualization engine for further secure tag generation. Certain selected first order locations 2707 are bridged by selected second order locations 2715. Selected second order locations 2715 are used to create connections between selected first order locations 2707, resulting in a glyph. In some embodiments, the shapes of the curves on each glyph can contain data. Additional code variations can be introduced into the structures based on the shape build. Selected first order locations 2707 that were not bridged by a selected second order location 2716 can remain as individual dots. In some embodiments, the dots can contain data.

Figure 27J:
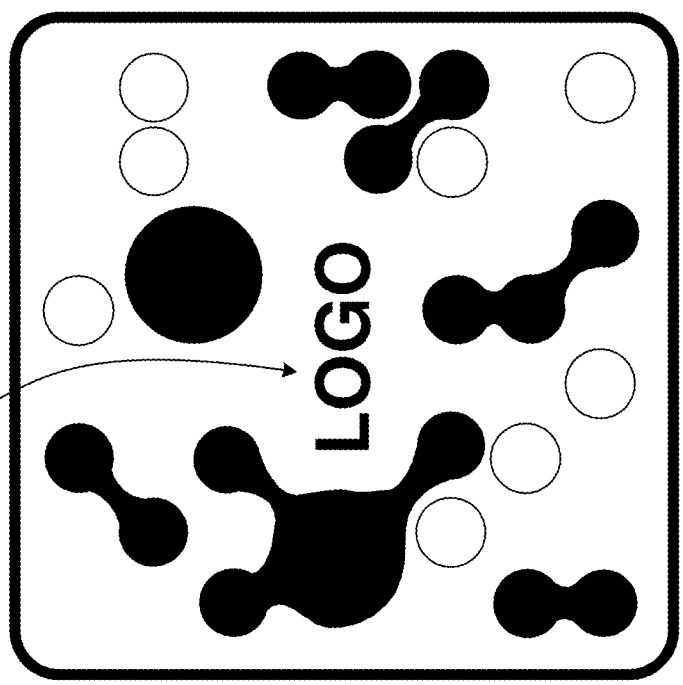

FIGS. 27F through 27I depict different possible glyphs 2717 based on the selected first order location 2719 and selected second order location 2721. In each figure, the tag generation algorithm may have identified any of the second order locations as potential connectors. Each figure depicts a different possible glyph 2717 based on the selected second order locations 2721. FIGS. 27F and 27H both depict glyphs 2715 where selected first order location 2719 is connected to at least one, but no more than three, selected first order locations 2719, however FIG. 27H depicts selected first order locations 2719 connected in series. FIG. 27G depicts glyph 2717 in which selected first order location 2719 is connected to every selected first order location 2719. In this figure, selected second order locations 2721 can cause selected first order locations 2719 to form into a larger circle or dot. FIG. 27J depicts glyph 2717 where only three of five selected first order locations 2719 are connected by selected second order locations 2721. In this figure, the final tag would include glyph 2717 and two individual dots. Each glyph 2717 in FIGS. 27F through 27I can have data encoded into it.

FIG. 27J depicts an exemplary secure tag with the orientation information 2723. Orientation information 2723 can be placed in the center of the secure tag as the center image. Orientation information 2723 can be used in the tag identification process to allow the optical reader to properly identify the correct tag. In some embodiments, orientation information can comprises a logo, brand, or any other identifier.

Figure 28A:
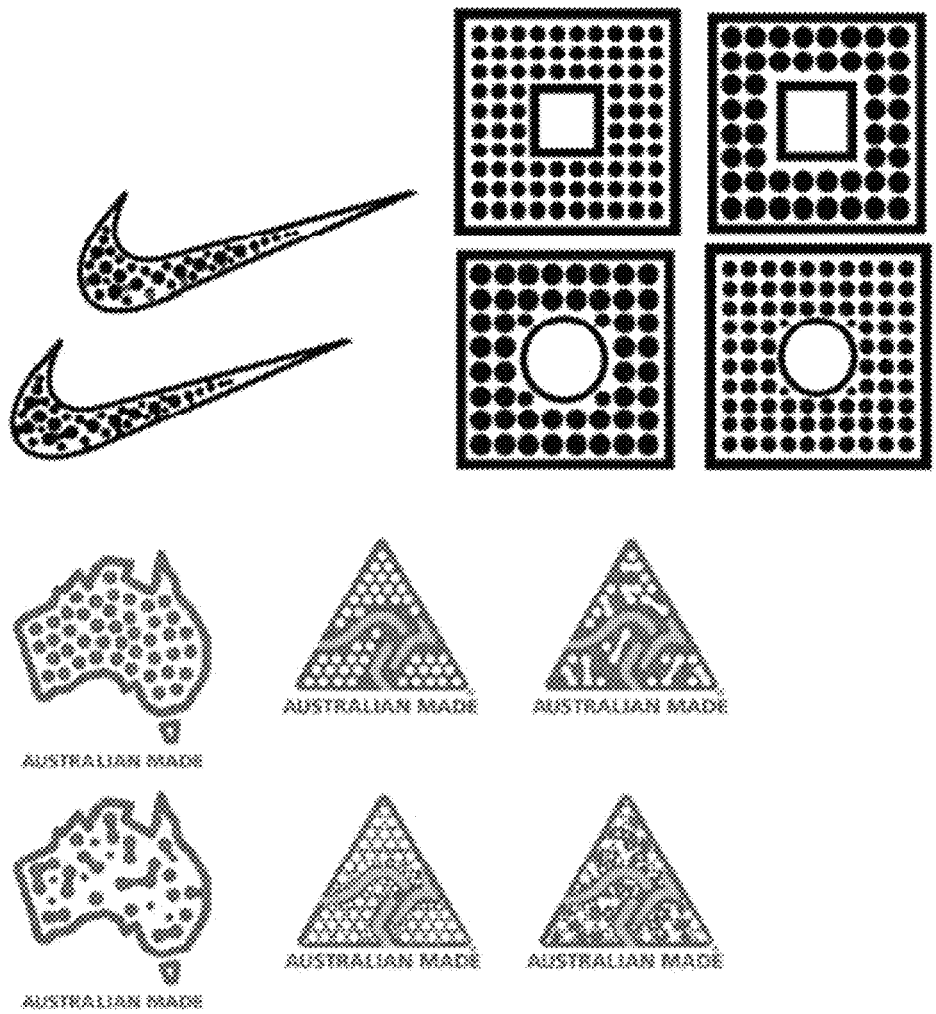
FIGS. 28A-28N depicts generation of an exemplary secure tag.
Figure 28B:
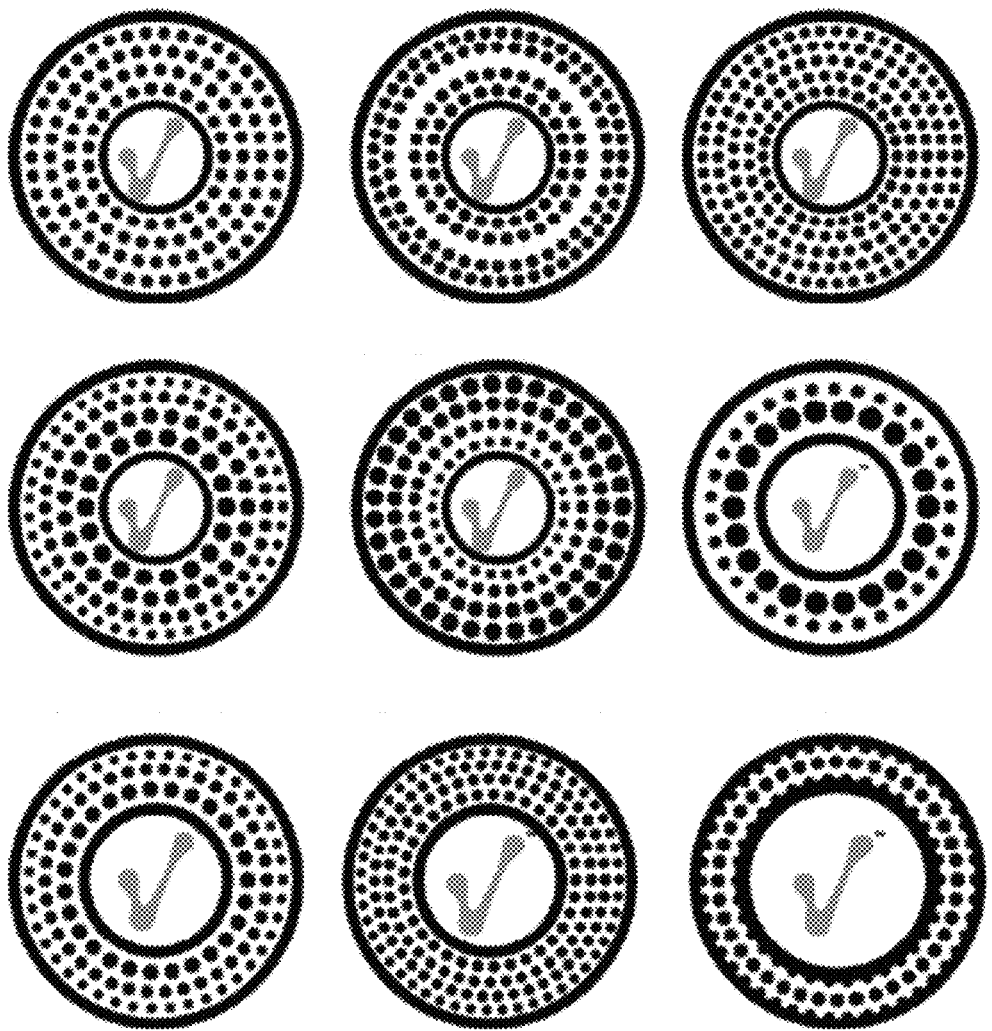
Figure 28D:
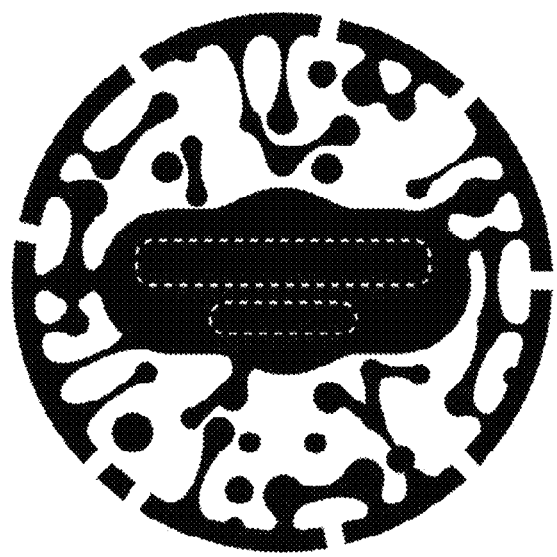
Figure 28E:
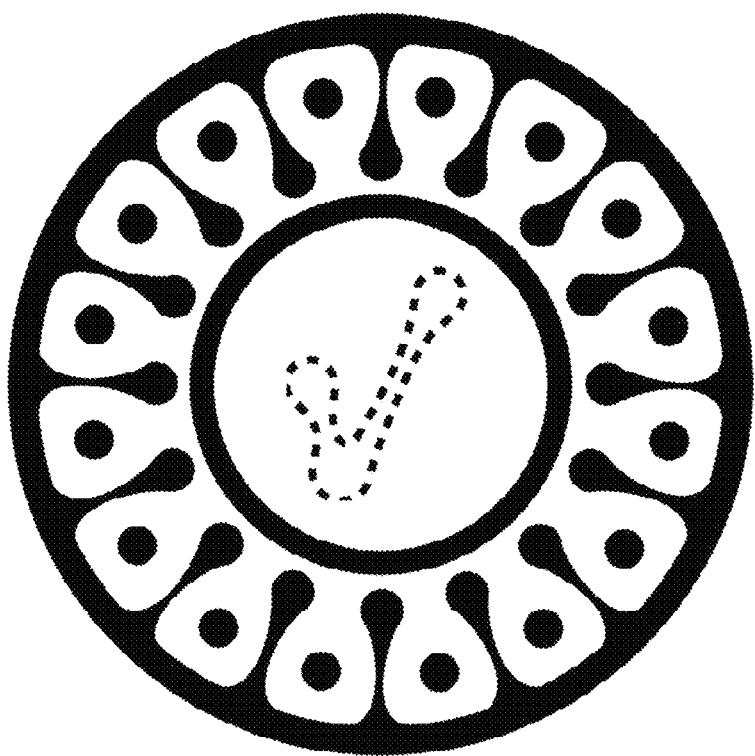
Figure 28F:
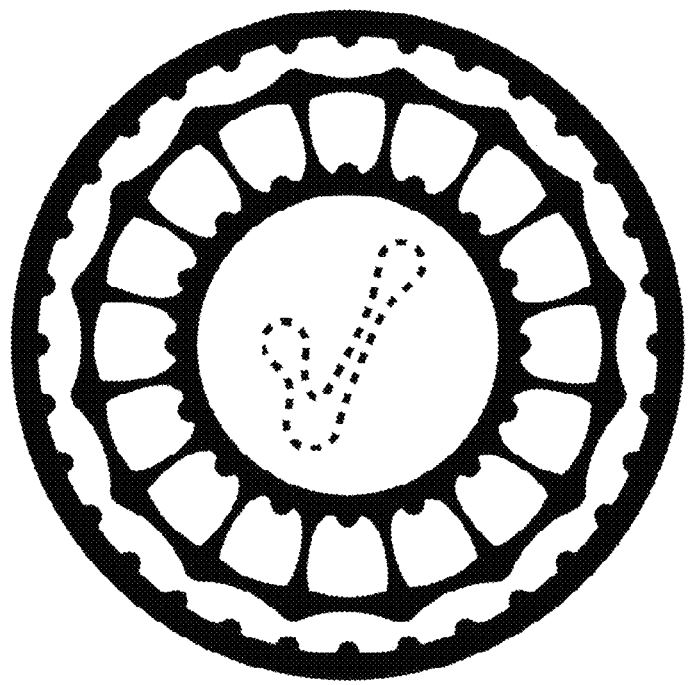
Figure 28G:
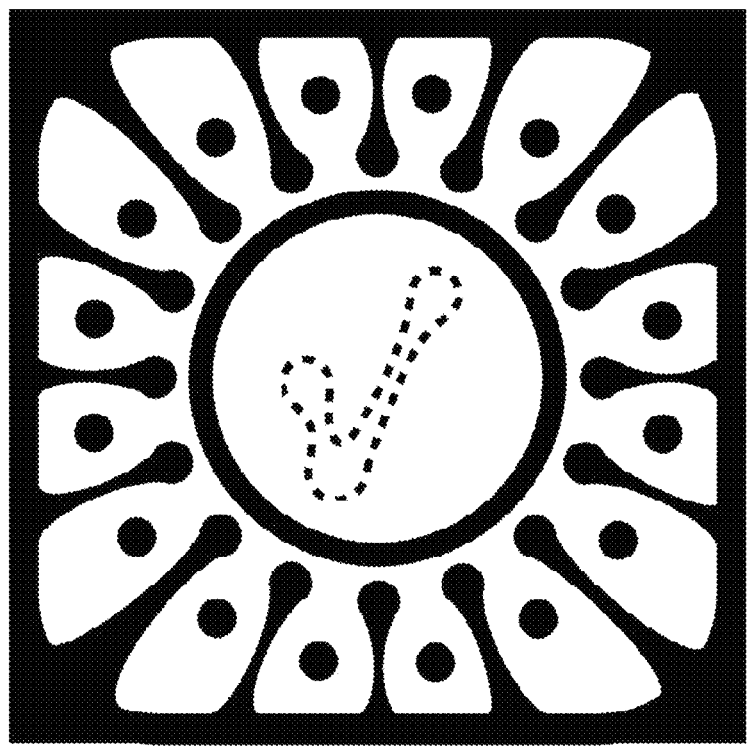
Figure 28H:
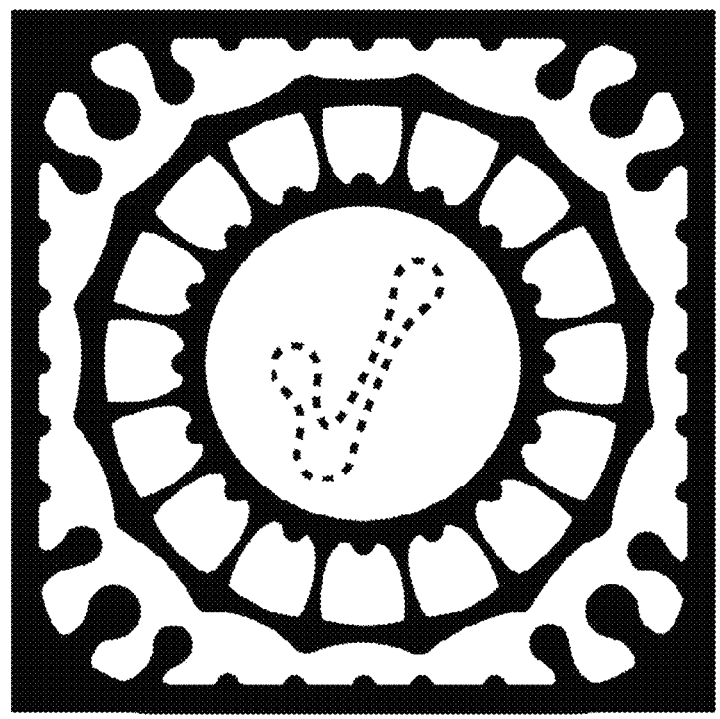
Figure 28I:
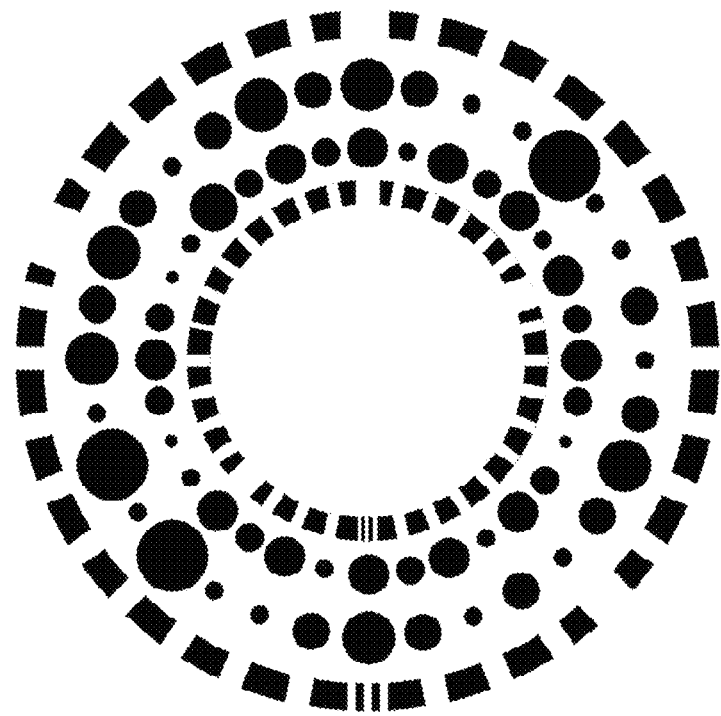
Figure 28J:
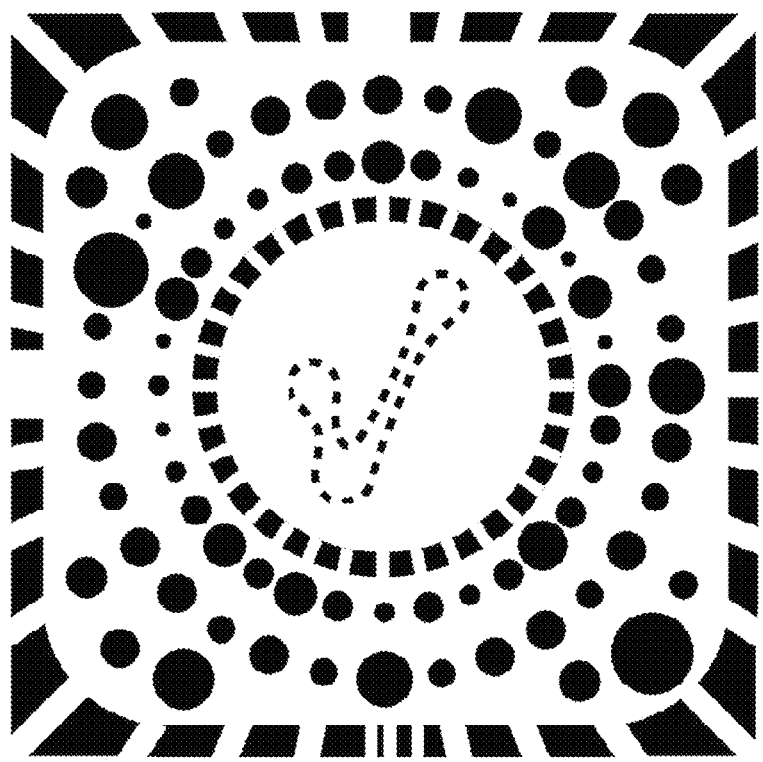
Figure 28K:
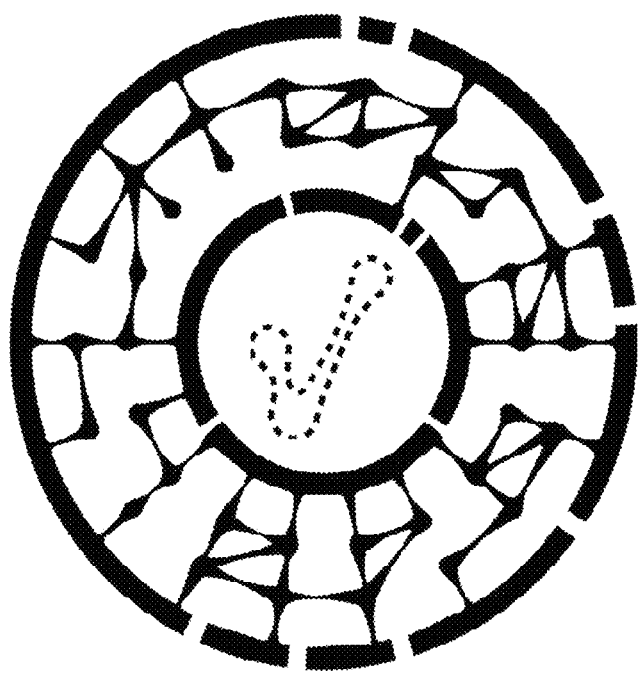
Figure 28L:
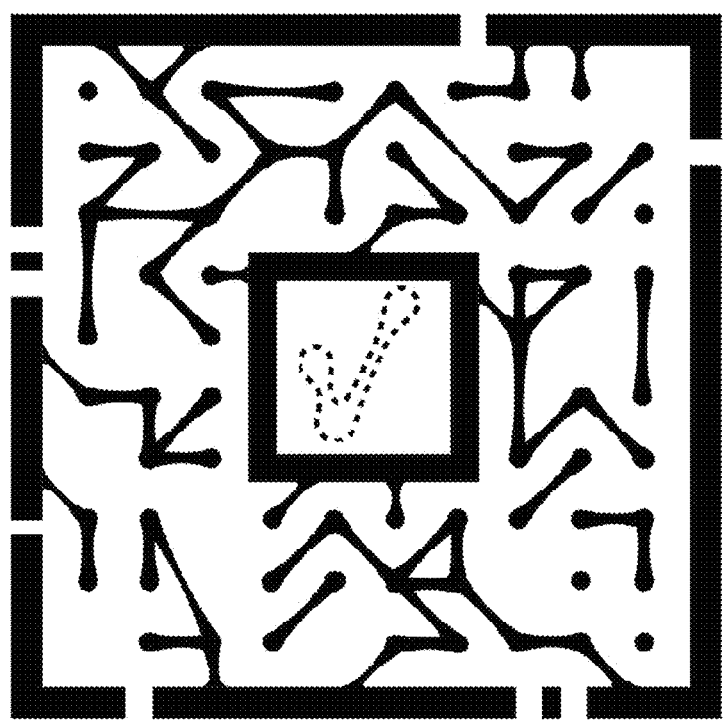
Figure 28M:
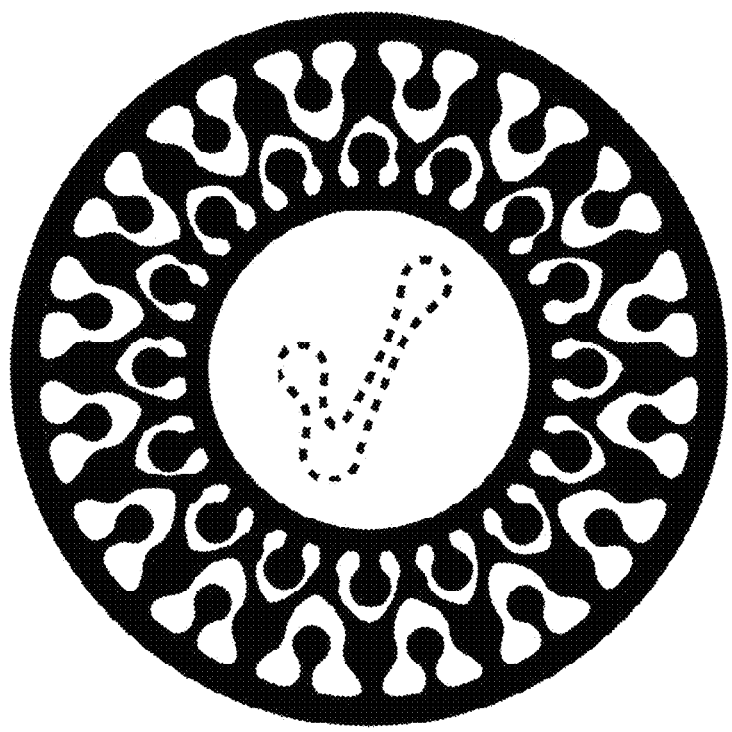
Figure 28N:
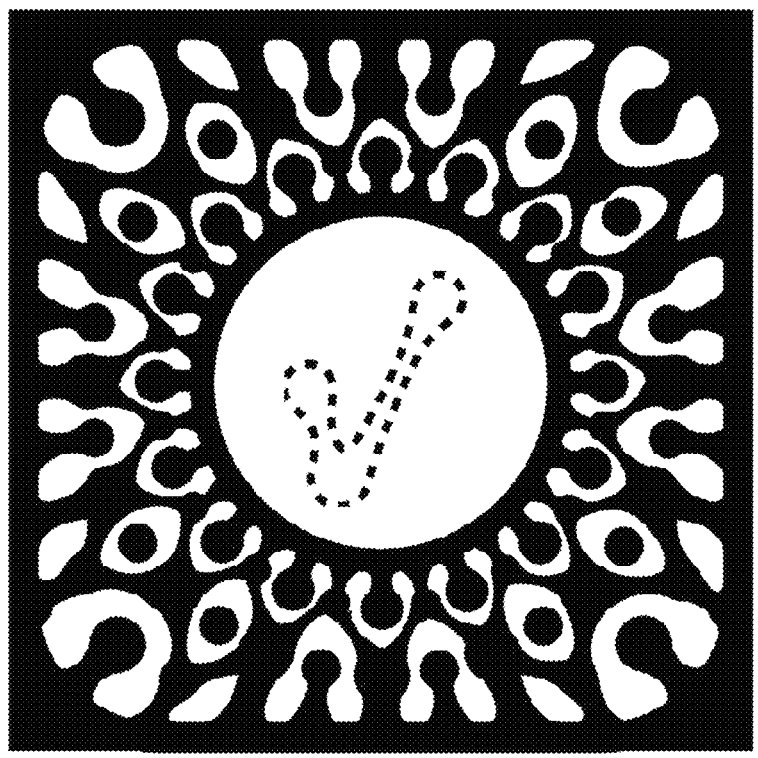

FIGS. 28A through 28N depict exemplary secure tags. Each tag is described in more detail below.

FIG. 28A depicts secure tags in various form factors. The outer frame of a secure tag can be any shape. For example, a customer may request a tag designed to match a specific image. In this example, the desired image can act as both a secure tag and a trademark. In some embodiments, the secure tag may not have a center image. In these embodiments, tag orientation can be achieved based on the design of the outer frame of the secure tag. In other embodiments, the center image can be a custom image provided by the customer. FIG. 28A depicts examples of possible form factors, such as the shape of Australia and the Nike™ Swoosh.

FIG. 28B depicts a series of exemplary tags. Each of these tags have a symmetrical design and a series of dots without connectors or splines. In the normal secure tag generation process, the likelihood of a symmetrical secure tag being created is very low. However, the secure tag generation process can also be controlled to create aesthetically appealing tags, such as the examples provided in FIG. 28B. In these example, the designs are chosen, and the data can be encoded into the chosen design.

FIG. 28C depicts examples of secure tags integrated with barcodes. In some embodiments, the secure tag can be read together with the barcode. In other embodiments, the secure tag and the barcode can be read separately. Integrating the secure tag with a barcode can provide backward compatibility for SKU based barcode readers, as well as a unique identity. The secure tag can contain matching data relating to the barcode. This can prevent fraudulent use or misuse of both the barcode and the secure tag.

FIG. 28D depicts an exemplary secure tag. In some embodiments, the exemplary secure tag can have a center image overlaid on a colored or black background. In other embodiments, the secure tag may not have an inner frame. In other embodiments still, the secure tag can have an inner frame that is a different shape from the outer frame.

FIG. 28E depicts an exemplary secure tag with a symmetrical pattern and Laava center image.

FIG. 28F depicts an exemplary secure tag with a symmetrical pattern and Laava center image.

FIG. 28G depicts an exemplary square secure tag with a symmetrical pattern and Laava center image.

FIG. 28H depicts an exemplary square secure tag with a symmetrical pattern and Laava center image.

FIG. 28I depicts an exemplary secure tag with no center image and without connectors between the dots.

FIG. 28J depicts an exemplary square secure tag with a Laava center image and no connectors between the dots.

FIG. 28K depicts an exemplary secure tag with a Laava center image and connectors of narrow thickness.

FIG. 28L depicts an exemplary square secure tag with a Laava center image and connectors of narrow thickness.

FIG. 28M depicts an exemplary secure tag with a symmetrical pattern and Laava center image.

FIG. 28N depicts an exemplary square secure tag with a symmetrical pattern and Laava center image.

Figure 29A:
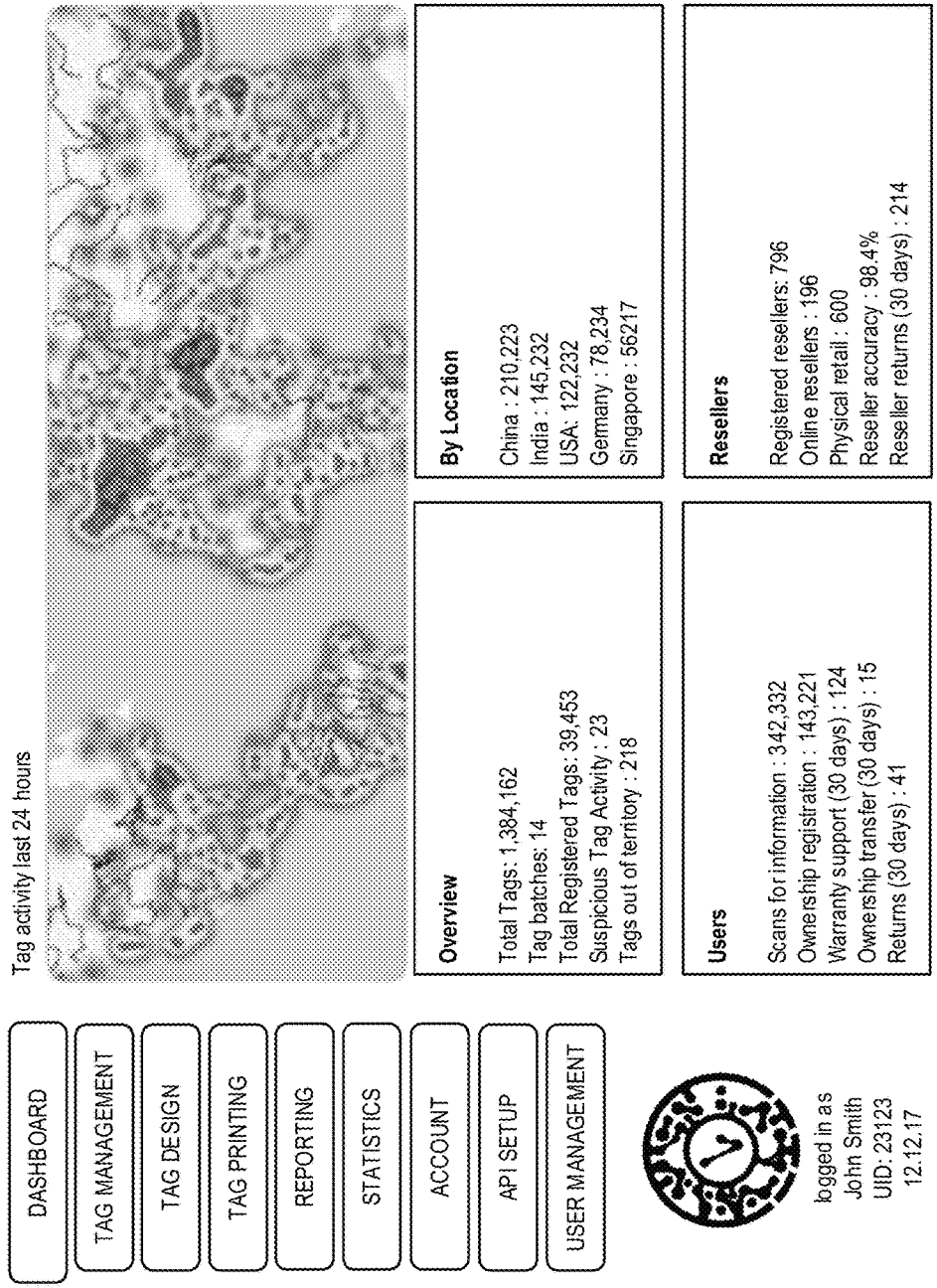
FIGS. 29A and 29B depict exemplary user interfaces.

FIG. 29A depicts an exemplary user interface for managing secure tags. In FIG. 29A, the dashboard tab displays secure tag activity over a 24-hour period. In some embodiments, the dashboard of the user interface can provide information comprising an overview of all secure tags for a single customer, the number secure tags by location, associated user information, and associated reseller information. The user interface has various tabs available for user interaction, these tabs can comprise: tag management, tag design, tag printing, reporting, statistics, account information, API setup, user management, and the like.

Figure 29B:
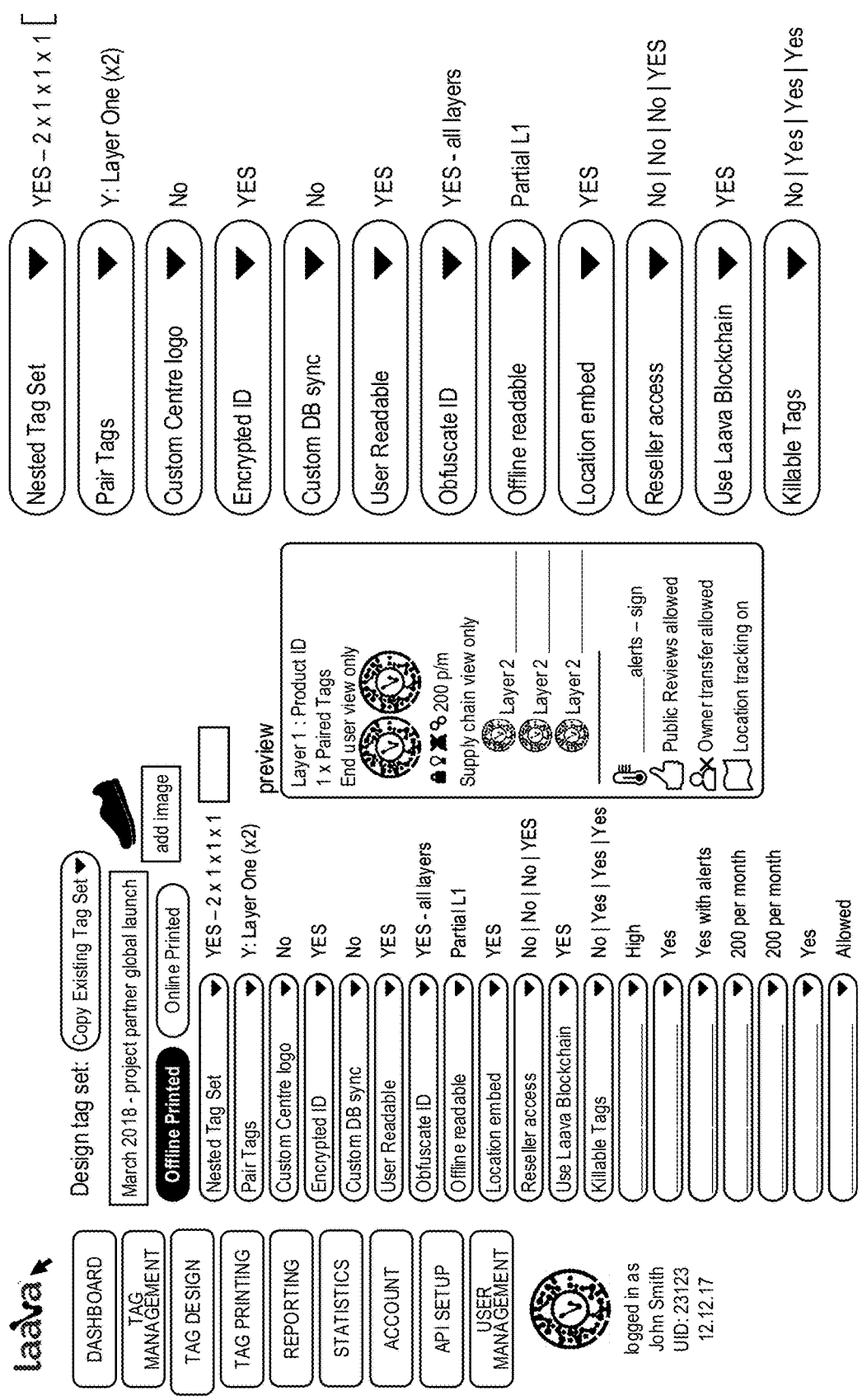

FIG. 29B depicts an exemplary user interface for requesting a secure tag design. The tab design user interface can provide a user with a variety of options for creating a secure tag. For example, the user has the option of selecting whether it wants nested secure tags and if it wants to pair secure tags. Other potential customizable options comprise: the customer center logo, encryption ID, custom DB sync, whether the secure tag is user readable, whether or not to obfuscate the ID(s), readability offline, whether or not to have a location embed, reseller access for each ID, whether or not to use the Laava blockchain, and whether the secure tags are killable. In FIG. 30B, the user has selected 4 layers of nested tags, with the top layers being paired. Each layer of secure tag can contain different information. In this example, the user has the ability to control what information each layer can provide and what keys are required to access each secure tag.

In some embodiments, system 100 (e.g., authentication server 115 or private system 120) can be configured to identify one or more secure tags as unauthorized copies of an authorized secure tag. System 100 can be configured to index information about these unauthorized copies and generate a report containing information about the unauthorized copies. For example, system 100 can be configured to generate a heatmap displayable by the user interface of FIGS. 29A and 29B showing where and how frequently unauthorized copies of the secure tag have been detected.

Exemplary Usage Cases

Secure tags can be used to assist both customers and retailers in the sale and purchase of products such as alcohol. Before purchasing, the customer can verify the authenticity of alcohol, such as, for example, a wine bottle, and receive information about the wine bottle including: previous owners, the retailer, the manufacturer, the manufacture date, ingredients, use-by instructions, safety warnings, and any other relevant information. Before selling, the retailer can scan the tag to review information, which can include: confirming arrival with logistics, viewing retailer offers from the vineyard, viewing the manufacturer and manufacture data, viewing the stock of the wine bottle, viewing ingredients, viewing customer selling notes, determining store position, setting-up return policy, setting-up an offer 'per bottle,' setting-up a lucky win to occur upon purchase of a bottle, viewing safety warnings, viewing use-by instructions, and carrying out any other relevant action. Upon checkout, the retailer can transfer ownership of the wine bottle to the customer, and the customer can use the secure tag to take advantage of additional benefit (e.g., re-order, review, etc.). In some embodiments, the wine bottle can have a second secure tag place on the inside of the wine bottle cap for additional authenticity after opening the bottle, which can be paired with the secure tag on the outside of the wine bottle.

Secure tags can be used to authenticate webpages, emails, or other digital products. For example, a website can have a unique secure tag for every page, served as a digital token that is used to authenticate the webpage itself. The secure tag can change after a predetermined period of time and the tag can also be killed once displayed or timed out. A user can authenticate a webpage, email, etc., with a browser that scans the secure tag itself using a secure plugin, or through the use of an optical reading device such as a smartphone. The secure tag can be used to verify the serve date and time, website or email provider, webpage or email security information, or any other information unique to the webpage or email.

Multiple forms of membership can be managed within a single secured tag owned by a customer and paired with, or shared by, allowed business. The customer can have various forms of ID and/or memberships, such as, for example, a health insurance card, a student ID, a fitness membership card, a travel membership card, etc., encoded into a single personal physical or digital secure tag. Each business associated with an encoded form of ID and/or membership can be given access to check the secure tag for only the specific ID and/or membership it is associated with. A customer can therefore present the same single secure tag in each situation instead of carrying around multiple forms of ID.

Secure tags can be used to create authenticated protected personal IDs for both online and offline use. The user can take their official ID (credit card, passport, etc.) to the relevant authority (a bank, passport office, etc.) where the ID is verified, and the confirmed ID supplier is connected to the user's personal ID blockchain. The authenticated protected personal IDs can be read by the appropriate authorities and can be used in situations such as: elections and voting, push bank statements, secure messaging, secure email, building entry, memberships, proof of age cards, or any other application that requires personal identification. The protected identity is owned by the user, but the relationship is paired with the formal ID issuers which means the formal ID issuer can revoke the ID.

Businesses can create authenticated personal IDs for customers using secure tags. A business, such as, for example, a bank, can provide a customer with both a personal ID associated with that user's account and a reader with specific access allowances (e.g., through an app specific to that business). A physical or digital document with specific information for that customer can contain a tag that can only be read by the user with the correct personal ID associated with that document. If the user has the correct personal ID associated with the documents, access corresponding to the level allowed by the personal ID will be granted. Additionally, the authenticated personal ID can be used to verify the customer at, for example, an Automated Teller Machine or bank. A business can receive notification whenever a document is scanned by a user without the correct personal ID or when a personal ID cannot be used to verify a customer.

Secure tags can be used to authenticate art and other valuable goods and allow the artist to potentially earn revenue from ongoing/future sales. A secure tag can be attached the original artwork and paired with both a second secure tag representing ownership and a third secure tag retained by the artist. Both the secure tag on the artwork and second secure tag representing ownership can contain information about the art itself, the current owner, the artist, and the art dealer, and both can be required for a sale and transfer of ownership. The artist can retain his or her paired tag and can receive notifications when ownership is transferred, which can potentially include a percentage of revenue from the ownership transfer. In some embodiments, art can be verified with proximity fingerprinting using, for example, the wood grain pattern on the art frame in proximity to the tag. The proximity fingerprint is invisible to a customer, and if the tag is moved it may not be validated and the authenticity may not be proven.

Other valuable products with very specific requirements, such as baby formula, can be authenticated using secure tags. Baby formula can have both an external secure tag and internal secure tag. The external tag can contain important information such as: use-by instructions, manufacturer ID, market information, safety information, or any other relevant information, which can be scanned by all potential customers. Once the baby formula has been purchased and the ownership transferred, the now-owner has access to the information contained on the internal secure tag. The internal secure tag will typically be paired to the stock or retailer ID through the pallet or shipment ID, giving the customer access to full supply chain information about the specific baby formula purchased.

Secure tags can be used to track lost items and return them to their owners. Users can print their own secure tags or buy secure tags in various form factors containing information about the owner. The secure tags can be paired to a 'lost and found' account, via app or another program, and attached to an item. The owner of the tag is sent a notification with information about a scan, such as time and location, anytime the tag is scanned. The owner can choose whether to disclose certain information in the event that someone else scans the tag, including information on how to contact the owner or return the item.

Warranty and insurance registration can be handled through the use of secure tags. A customer can authenticate a vehicle through the blockchain and then purchase the vehicle. The ownership is then transferred to the customer, the customer is registered for a warranty, and the vehicle is officially registered to the customer in the appropriate databases (e.g., the DMV). The customer's insurance company can match the customers ID and vehicle data for the recently purchased vehicle, and if the customer ID is confirmed, the insurance can be issued.

Secure tags can be used to authenticate casino chips or other gambling chips. Each chip is given a secure tag which can be paired to an embedded RFID ID in the chip. The combination of the secure tag and RFID can be managed in the blockchain, allowing the casino to track each chip in various ways. Users can also check the secure tags with their own reading devices to ensure they have legitimate chips in their hands. In addition, the unique tag on the chip can serve as a visual deterrent for creating spoofed tags.

Lotteries and other promotions can be managed through the use of secure tags. A company can create tickets on the blockchain. The customer can then purchase digital or physical tickets associated with the tickets on the blockchain and reveal the tags on the tickets. The tickets can then be scanned, the customer can receive information regarding whether they won or lost, and the result of the win or loss can be updated in the blockchain. In some embodiments, the ticket can be a tag that can be scanned to reveal basic information about the lottery company, retailer, etc. before purchase, and has a portion that can be scratched away to reveal a new tag that can be scanned by the now-owner to reveal the result of either a win or loss.

Secure tags can be used for serving promotional adverts to specific customers. A customer can be served a promotional advert online that contains a specific tag unique to that customer. The customer can then visit the website associated with the advert and print coupons with a secure tag that has a specific ID and promotional data embedded into it. The customer can then visit the physical store and redeem the coupon, and the physical sale will then be tied to the digital cookie associated with the original advert.

Secure tags can be used for general promotional activities as well. For example, a car company can create a custom tag to be advertised publicly that is used for a giveaway of a vehicle or to book a test drive. The secure tag can be open to the public and scannable by anyone. The secure tag can animate according to a set formula so that it contains the location, time, and other data necessary of every view so that each customer scan is unique. Each scan is uploaded to the blockchain, and the company can have set promotional rules in place to award certain scans.

Physical crypto-currency can be authenticated using secure tags. A user can load a cryptocurrency, such as, for example, 'bitcoin,' onto a physical note with a secure tag printed on it. The secure tag can be tied to a specific owner by way of access key, or open to the public to be available to anyone offline. The secure tag can be validated at a checkout station, and the information about the transaction can be uploaded to the blockchain. In some embodiments, the secure tag can be paired with another form of identification, such as RFID.

Secure tags can be used to control access to confidential items, such as those used by the military or other non-public organizations. A private secure tag can be created, with the information stored on a private blockchain. Designated personnel can be granted different access levels for scanning and reading the tagged items. If the item is scanned by a non-authorized reader, the data about where, when, and who scanned the tag is sent back to the private blockchain. In the event that the item is scanned by a non-authorized reader, an alarm or warning directed towards the secure tag owner may be triggered.

Meat and livestock, or other organic products, can be validated using secure tags by way of proximity fingerprinting. For example, beef "texture" in proximity to a secure tag can be fingerprinted together with the secure tag at the point of packaging. The secure tag can provide information about the cut of the beef, the date of packaging, transportation, and any other information important to buying perishable goods. The secure tag and texture must be scanned together to fully authenticate the product to an end user, and if the tag has been moved the proximity fingerprinting will not validate the product as authentic.

Secure tags can be used to confirm and validate safety and inspection reports. When a unit or device requiring inspection is being installed, the installer can create a secure tag for the whole unit, or individual parts, containing information about the installation and manufacturer. The tags can be scanned and updated during inspections and safety evaluations by additional users with appropriate access. When a new user scans the secure tag, he can to receive information on the inspection history, the replacement history, the users who have scanned the tag previously and the dates/times at which they did so, the warranty information, who the part was supplied by, and any other information deemed relevant. A log of inspections can therefore be kept on the blockchain.

Secure tags can be used to authenticate medicine and prescriptions. For example, doctors can have a unique secure tag on every prescription page to prevent stolen prescriptions. The doctor can scan a prescription when she is writing it down and give permission for a specific patient to use that prescription. When a pharmacy is filling the prescription, it can check the secure tag to determine if the doctor has actually given someone permission to use the specific prescription page, and also if the proper medicine is being prescribed to the correct person. In another example, secure tags can be printed on medication packaging, blister packs, or even on the individual pills themselves. In these examples, the medicine is matched with a patient, thus providing the doctor, nurse, or other approved medical provider with access to patient information when scanned. This can provide evidence that medicine is being taken as prescribed and help ensure that the correct person is being provided with the proper medication.

Taxes and expense reporting can be tracked and verified through the use of secure tags. A company can provide its employees with a specific reader for scanning receipts and invoices. Receipts and invoices can be printed with a unique tag, which can then be scanned by the reader specifically designed for this activity. The reader can be designed to give users the ability to only scan certain secure tags on receipts or invoices. The scanned expenses are then stored in the blockchain and can be accessed in the future by the company or tax agencies to verify expenses and costs.

Users can create customized secure tags in numerous configurations. For example, certain brands may wish to have tags designed in the same shape as their trademarks. This can allow for different packaging options and different levels of security. In some embodiments, the center logo can be customized while keeping the shape of the secure tag fixed to a standard shape.

Grey products can be eliminated from the supply line by using secure tags. Authentic parts for specific equipment and vehicles can be given a secure tag containing information about the manufacturer and about what type of equipment or vehicle the part should be used in. Engineers or technicians inspecting and replacing parts in the future can scan the parts to determine whether the part is authentic and is being used in the correct manner.

Secure tags can be used to identify and report counterfeit or fake products. A customer can scan a secure tag on a product to check the manufacturer, licensed country of sale, approved retailer, etc. If any of this information is off, the customer can report the item as fake, including information about the location and time of the scan. The report will be uploaded to the blockchain and the owner of the tag will be notified. In addition, since each secure tag is unique, if the same tag reports being scanned more than once in multiple locations, the owner of the tag will automatically be notified of the discrepancy.

A company can limit the copying of products, such as, for example, shoes, using secure tags. In this example, the copier has gained access to a single shoe produced by the company with a legitimate tag and made copies of the legitimate tag to place on fake shoes. The copier then sells the shoes to numerous buyers, claiming the products are genuine. Only the first scan will result in a genuine product being authenticated, and the scan must be before the shoes are sold. If the tag reveals that this is not the first time the same tag has been scanned, the tag is reported as counterfeit and the customer is saved from buying a counterfeit product. In the event that a legitimate customer is not the first to scan the shoe, the customer can authenticate the product with the company itself.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A secure tag system, comprising:
at least one processor; and
at least one non-transitory memory containing instructions that, when executed by the at least one processor, cause the secure tag system to perform operations comprising:
receiving a request from a first user for a digital product;
generating a first secure tag associated with the digital product and the first user, generation including selection of first tag features from a superset of potential first tag features for inclusion in the secure tag and selection of second tag features, the second tag features being the presence of connections between at least a subset of the first tag features;
providing the first secure tag to the first user; and
providing the digital product.

2. The system of claim 1, wherein:
the first tag features include at least one of a rim, rim deformation, or dot.

3. The system of claim 1, wherein:
generating the secure tag further includes selecting connection widths for the connections between the first tag features, different ones of the connection widths corresponding to different numerical values.

4. The system of claim 1, wherein:
the operations further comprise:
receiving a second secure tag from the first user; and
comparing the second secure tag to the first secure tag; and
the digital product is provided to the first user based on the comparison.

5. The system of claim 4, wherein:
the comparing the first secure tag and the second secure tag comprises comparing a perceptual hash of the first secure tag and a perceptual hash of the second secure tag.

6. The system of claim 4, wherein:
the second secure tag is a mutable tag.

7. The system of claim 1, wherein:
the first secure tag is embedded into the digital product or displayed together with the digital product.

8. The system of claim 1, wherein:
the operations further comprise:
receiving a transaction request from the first user;
generating a second secure tag associated with the digital product and a second user, the second secure tag paired with the first secure tag; and
providing the second secure tag to the second user.

9. A secure tag method, comprising:
receiving a request from a first user for a digital product;
generating a first secure tag associated with the digital product and the first user, generation including selection of first tag features from a superset of potential first tag features for inclusion in the secure tag and selection of second tag features, the second tag features being the presence of connections between at least a subset of the first tag features;

providing the first secure tag to the first user; and providing the digital product.

10. The method of claim 9, wherein:

the first tag features include at least one of a rim, rim deformation, or dot.

11. The method of claim 9, wherein:

generating the secure tag further includes selecting connection widths for the connections between the first tag features, different ones of the connection widths corresponding to different numerical values.

12. The method of claim 9, wherein:

the method further comprises:
  receiving a second secure tag from the first user; and
  comparing the second secure tag to the first secure tag; and the digital product is provided to the first user based on the comparison.

13. The method of claim 12, wherein:

comparing the first secure tag and the second secure tag comprises comparing a perceptual hash of the first secure tag and a perceptual hash of the second secure tag.

14. The method of claim 12, wherein:

the second secure tag is a mutable tag.

15. The method of claim 9, wherein:

the first secure tag is embedded into the digital product or displayed together with the digital product.

16. The method of claim 9, wherein:

the method further comprises:
  receiving a transaction request from the first user;
  generating a second secure tag associated with the digital product and a second user, the second secure tag paired with the first secure tag; and
  providing the second secure tag to the second user.

17. A non-transitory, computer-readable medium containing instructions that, when executed by at least one processor of a system, cause the system to perform operations comprising:

receiving a request from a first user for a digital product;

generating a first secure tag associated with the digital product and the first user, generation including:
  selection of first tag features from a superset of potential first tag features for inclusion in the secure tag, the first tag features include at least one of a rim, rim deformation, or dot; and selection of second tag features for inclusion in the secure tag, the second tag features being the presence of connections between at least a subset of the first tag features;

providing the first secure tag to the first user;

receiving a second secure tag from the first user;

comparing the second secure tag to the first secure tag; and based on the comparison, providing the digital product to the first user.

18. The non-transitory, computer-readable medium of claim 17, wherein:

generating the secure tag further includes selecting connection widths for the connections between the first tag features, different ones of the connection widths corresponding to different numerical values.

19. The non-transitory, computer-readable medium of claim 17, wherein:

comparing the first secure tag and the second secure tag comprises comparing a perceptual hash of the first secure tag and a perceptual hash of the second secure tag.

20. The non-transitory, computer-readable medium of claim 17, wherein:

the first secure tag is presented to a first device of the first user; and the second secure tag is received from a second device of the first user.

* * * * *